US006634947B1

(12) United States Patent
Miyamoto et al.

(10) Patent No.: US 6,634,947 B1
(45) Date of Patent: Oct. 21, 2003

(54) VIDEO GAME SYSTEM AND VIDEO GAME MEMORY MEDIUM

(75) Inventors: Shigeru Miyamoto, Kyoto (JP); Takao Shimizu, Kyoto (JP); Takaya Imamura, Kyoto (JP); Kazuaki Morita, Kyoto (JP); Tsuyoshi Kihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 122 days.

(21) Appl. No.: 09/590,302

(22) Filed: Jun. 9, 2000

Related U.S. Application Data

(63) Continuation of application No. 09/065,485, filed on Apr. 24, 1998, now Pat. No. 6,261,179.

(30) Foreign Application Priority Data

Apr. 25, 1997 (JP) ................................................ 9-123273

(51) Int. Cl.[7] ................................................ H63F 9/22
(52) U.S. Cl. ............................ 463/36; 463/37; 463/38; 463/39; 463/31; 463/32
(58) Field of Search ........................ 463/31–32, 36–38, 463/39

(56) References Cited

U.S. PATENT DOCUMENTS

| | | | | |
|---|---|---|---|---|
| 5,734,807 A | * | 3/1998 | Sumi | ............................ 395/127 |
| 5,769,718 A | * | 6/1998 | Rieder | ........................... 463/31 |
| 5,807,174 A | * | 9/1998 | Fukuhara et al. | .............. 463/31 |
| 5,820,462 A | * | 10/1998 | Yokoi et al. | ................... 463/37 |
| 5,853,326 A | * | 12/1998 | Goto et al. | ..................... 463/37 |
| 5,935,003 A | * | 8/1999 | Stephens et al. | ............... 463/31 |
| 6,001,015 A | * | 12/1999 | Nishiumi et al. | .............. 463/38 |

FOREIGN PATENT DOCUMENTS

| | | |
|---|---|---|
| EP | 2 287 629 | 9/1995 |
| WO | WO 94/27677 | 12/1994 |

OTHER PUBLICATIONS

Abstract: Dialog (R) File 275 Computer Database (TM) 01903810 "Sighs of Relief all Round at Games Developers as Nintendo Delays International Ultra 64 Launch", Computergram International, n858, pcgn02230018, Feb. 23, 1996.

* cited by examiner

Primary Examiner—S. Thomas Hughes
Assistant Examiner—Carmen D. White
(74) Attorney, Agent, or Firm—Nixon & Vanderhye P.C.

(57) ABSTRACT

A video game system includes a video game machine and a controller connected thereto, wherein the game machine is further connected with a display device. A video-game memory medium, detachably attached to the game machine, generates image data for displaying a player object, a plurality of courses, and objects other than the player object. A player chooses a course of play by operating the controller. A score-giving condition is detected according to a relation of the player object to another object. Depending on the detection, a first score is counted for the course. When the player object comes under a condition satisfying a course clear, the first score is memorized in a score-register area of a RAM. If the user chooses to play a same course, an initial value is written to the score-register area.

19 Claims, 48 Drawing Sheets

F I G. 1 2
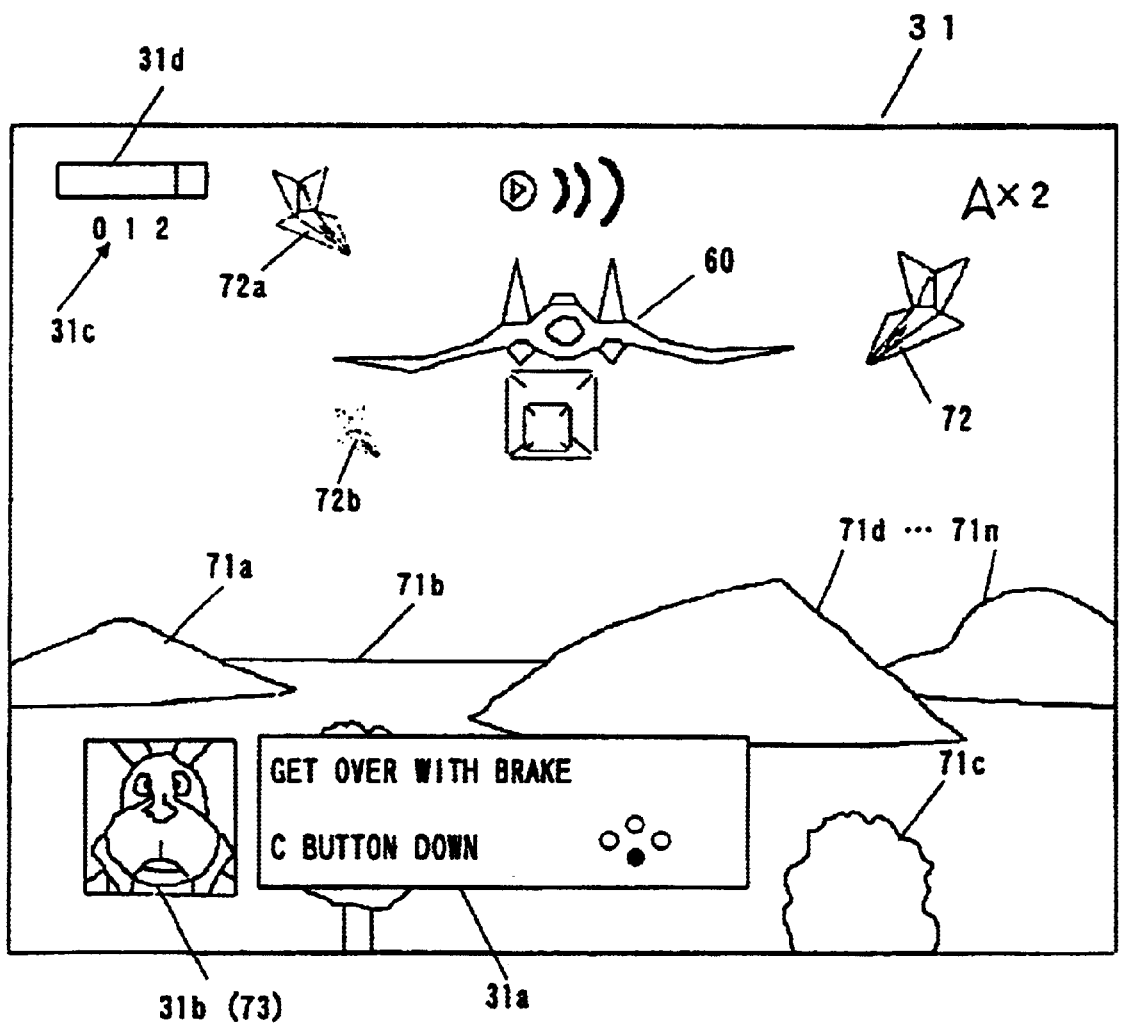

FIG. 13

|  | PERSON | PHRASE | CONDITION | PRIORITY |
|---|---|---|---|---|
| PHRASE 1 | FELLOW 1 | GET OVER WITH BRAKE C BUTTON DOWN ↓ | SITE A | 1 |
| PHRASE 2 | FELLOW 2 | PASS THROUGH BY BOOSTING C BUTTON LEFT ← | SITE B | 2 |
| PHRASE 3 | FELLOW 3 | AIM AT BACK | TIME A FROM FINDING BOSS | 2 |
| PHRASE 4 | FELLOW 4 | REPEL BY ROLLING TWICE DEPRESS Z OR R | SITE C | 1 |
| PHRASE 5 | FELLOW 5 | HELP | AIMED AT BY ENEMY | 1 |
| PHRASE 6 | FELLOW 6 | WE SURVIVED | RESCUING | 1 |
| PHRASE 7 | FELLOW 3 | TACTFULLY USE BOMB | SITE D | 1 |
| PHRASE 8 | HERO | UWAHHHH ··· | $Bd \leq 0$ | 3 |
| PHRASE 9 | BOSS | GWAHHHH ··· | ENEMY'S Ed $\leq 0$ | 0 |

FIG. 15  ENTIRE FLOWCHART

FIG. 28  ENEMY OBJECT PROCESS 2

ONE-DIRECTIONAL SCROLL MODE $\theta x1 = 0.68 * Xj$
$\theta y1 = 0.68 * Yj$
$Xs = - As * \sin\theta x1$
$Zs = - As * \cos\theta x1$
$Ys = - As * \sin\theta y1$ $\begin{cases} Xc = (Xa - X0) * 0.8 \\ Yc = (Ya - Y0) * 0.8 \\ Zc = (Za + abs(Z\alpha)) \\ \quad + 400 \\ Zc = (Za - abs(Z\beta)) \\ \quad + 400 \\ Zc = Za + 400 \end{cases}$

FIG. 37

ALL-RANGE MODE

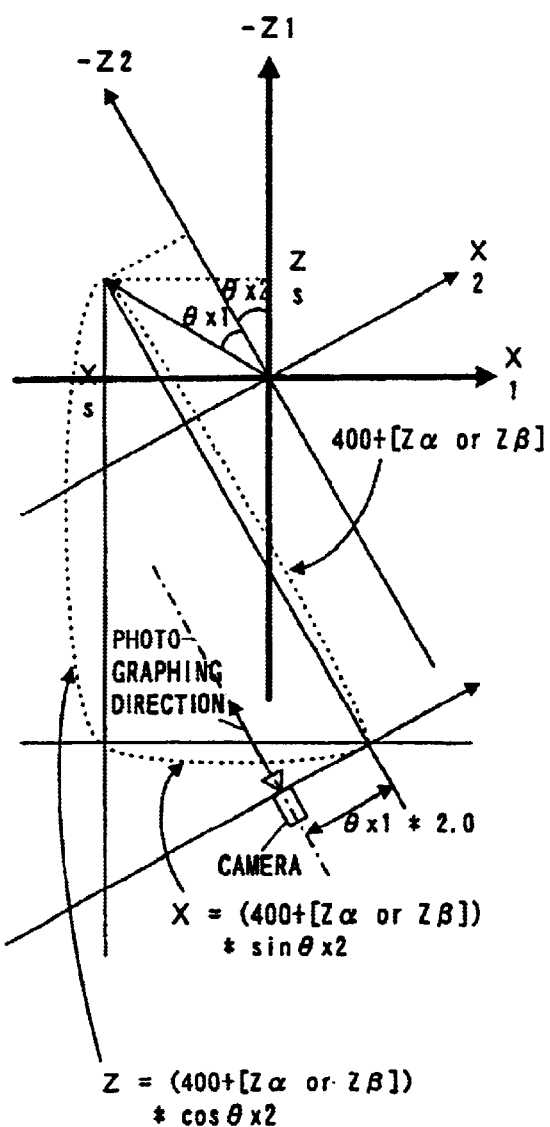

ANGLE
 $\theta x1 = 0.68 * Xj$
 $\theta y1 = 0.68 * Yj$
 $\theta x2 = 0.03 * \theta x1 + \theta x2$
   (PREVIOUS FRAME VALUE)

SPEED
 $Xs = -As * \sin(\theta x1 + \theta x2)$
 $Zs = -As * \cos(\theta x1 + \theta x2)$
 $Ys = -As * \sin\theta y1$ POSITION
 $Xa = Xa + Xs$
 $Za = Za + Zs$
 $Ya = Ya + Ys$ $Xa, Ya, Za$ : 3-D COORDINATE POSITION
$Xs, Ys, Zs$ : 3-D COORDINATE SPEED CAMERA POSITION
 $Xc = Xa + (400+[0 \text{ or } abs(Z\alpha) \text{ or } -abs(Z\beta)]) * \sin\theta x2 - Xr$
 $Zc = Za + (400+[0 \text{ or } abs(Z\alpha) \text{ or } -abs(Z\beta)]) * \cos\theta x2 + Zr$
 $Yc = Ya * 0.8$ $Xr = \theta x1 * 2.0 * \cos\theta x2$
$Zr = \theta x1 * 2.0 * \sin\theta x2$
$Z\alpha = As\alpha * \cos\theta x1$
$Z\beta = As\beta * \cos\theta x1$

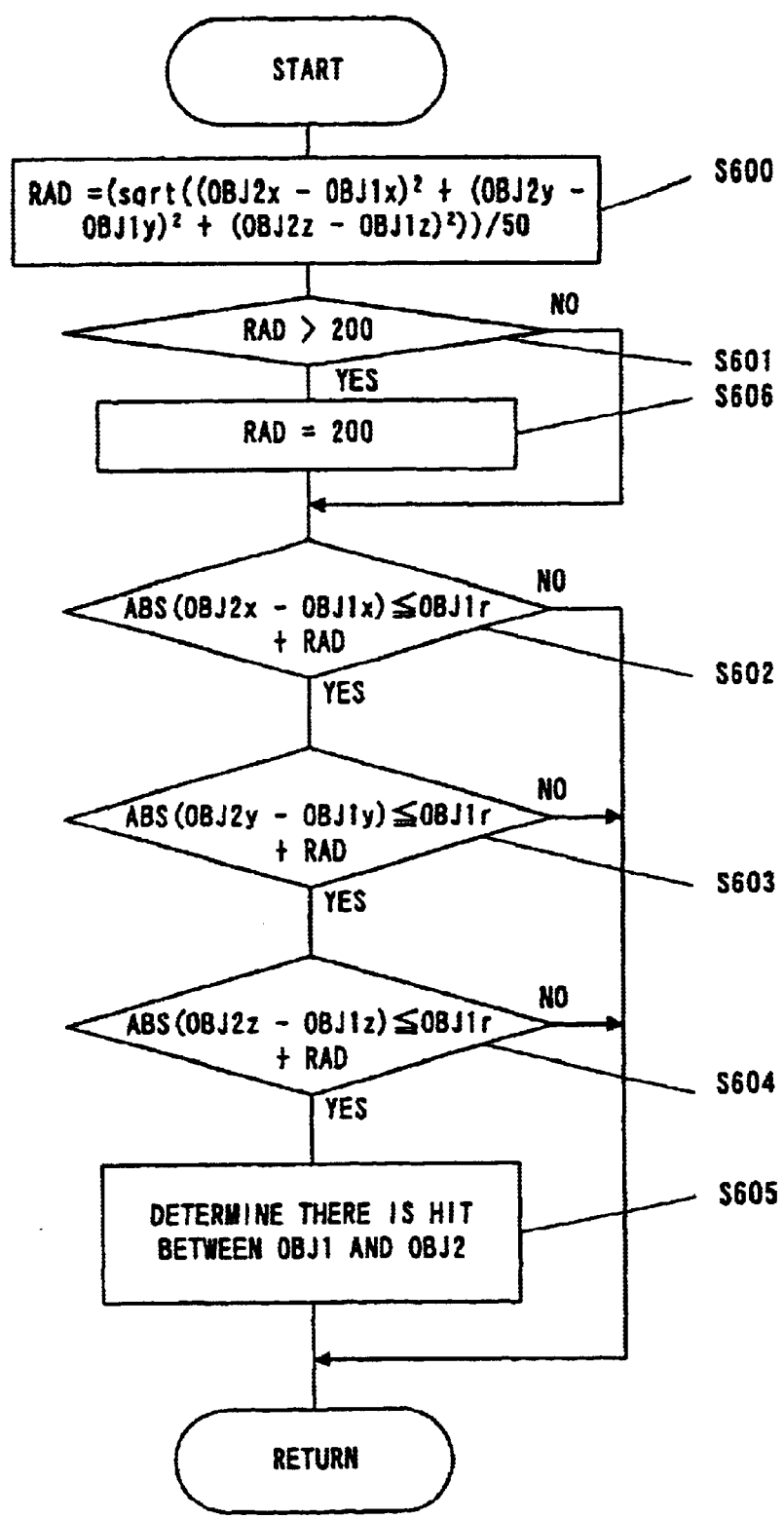

VIDEO GAME SYSTEM AND VIDEO GAME MEMORY MEDIUM

This is a continuation of application Ser. No. 09/065,485, now U.S. Pat. No. 6,261,179, filed Apr. 24, 1998, the entire content is hereby incorporated by reference in this application.

BACKGROUND OF THE INVENTION

1. Field of the Invention

This invention relates to video game systems and video-game memory mediums, and more particularly to a video game system and video-game memory medium for playing a game by choosing a course therefor or displaying a player object moving to defeat enemies, such as in a shoot game.

2. Description of the Prior Art

In the conventional video game it is impossible to replay a once-cleared course in the middle of the game. The once-cleared course cannot be replayed unless the game machine is reset to replay the game from the beginning. Furthermore, prior art video games that display a moving player object on which hit determination is made only register a hit at one point thereof.

In a game to compete with a total score of clearing courses of among a plurality of courses, when one course is cleared at a high score, and another course is cleared at a low score, the total score would still be low. Due to this, a high score is difficult for a player to achieve. Furthermore, in order to replay a course, the game machine requires resetting in order to allow the game to replay from the beginning. Thus, even if the player does not want to play a course again, he is forced to replay the game from the beginning. Accordingly, the player is burdened with unwanted labor, thereby losing his interest in the game or having a burdensome feeling during the game.

Also, games using a player object operable to determine hit at only one point thereof, it is impossible to give variation of display to each effected portion of the player object. This makes it difficult to display the player object with diversification, thus imposing limitation on image representation. As a result, interest in such a game is reduced.

SUMMARY OF THE INVENTION

Therefore it is a principal object of this invention to provide a novel video game system and game-processing memory medium.

It is another object of this invention to provide a video game system and game-processing memory medium, which makes it possible, where a plurality of courses are provided, to gain a high score even in a difficult game, and advance to a same course (i.e. replay) even after clearing a course or scene difficult to manipulate, so that the player can win a high and satisfactory score without requiring resetting of the game data, thereby enhancing game amusement and the player's feeling of achievement.

It is a further object of this invention to provide a video game system and video-game memory medium, which has a player object divided into a plurality of portions which can register hit determinations so that the display player object is changed depending upon the portion damaged, thereby providing greater display variation and improving interest in the game.

It is still another object of this invention to provide a video game system and video game memory medium, having a player object that is varied in movement in a diversified manner depending upon how the player operates an operating means, giving realistic motion to the player object and providing player interest.

It is another object of this invention to provide a video game system and video game memory medium, having a player object that is varied in movement based on each divisional portion, thereby giving realistic motion to the player object and improving player interest.

A video game system according to this invention, having an operating means to be operated by a player, and an image processing apparatus for supplying image data to a display unit to display and vary a display image according to a program and depending on operation of the operating means, wherein the operating means includes a direction designating means to designate a direction of movement of a player object, and a plurality of motion designating switches for designating a motion of the player object, comprises: a player object image data generating means for generating data to display an image of the player object; a course image data generating means for storing with a plurality of course data to display different courses through which the player object can advance, and displaying one course chosen based on an operating state of the operating means by the player; an object image data generating means for displaying an image of an object other than the player object on each of the courses through which the player object advances; a choosing-screen data generating means for displaying a course choosing screen by which a course next to play is chosen from among the courses by operation of the operating means when starting a game or clearing a course; a score-giving condition setting means for setting a condition to give an in-a-course score to the respective courses; a score-giving condition detecting means for detecting that a score-giving condition set by the score-giving condition setting means is met depending on the relationship between the player object and the other object when the player object is advancing on the course chosen; a first score count means for counting a score on the course depending on an output of the score-giving condition detecting means when the player object is advancing on the course chosen; a course-clear detecting means for detecting that a clear condition for each course is met by the player object; a course-score memorizing means for memorizing on a course-by-course basis a score that has been counted for the course of among the courses by the first score count means; a control means for writing a cleared-course score that is counted by the first score count means into a corresponding area of the course-score memorizing means to the cleared course when the course-clear detecting means detects a course clear, and resetting the first score counting means to write an initial value into a corresponding area of the course-score memorizing means for a course immediately-before cleared, based on choosing to advance to a same course; and a second score count means for determining a sum of the course-scores memorized in the course-by-course area of the course-score memorizing means.

A video game machine in accordance with the invention includes an external memory medium such as a ROM. The external memory medium comprises: a player object image data generating program for generating data to display an image of the player object; a course image data generating program for storing a plurality of course data to display different courses through which the player object can advance, and displaying one course chosen based on an operating state of the operating means by the player; an object image data generating program for displaying an image of an object other than the player object on each of the courses through which the player object advances; a choosing-screen data generating program for displaying a course choosing screen by which a course next to play is chosen from among the courses by operation of the operating means when starting a game or clearing a course; a score-giving condition setting program for setting a condition to give an in-a-course score to the respective courses; a score-giving condition detecting program for detecting that a score-giving condition set by the score-giving condition setting means is met depending on the relationship between the player object and the other object when the player object is advancing on the course chosen; a first score count program for counting a score on the course depending on an output of the score-giving condition detecting means when the player object is advancing on the course chosen; a course-clear detecting program for detecting that a clear condition for each course is met by the player object; a course-score memorizing program for memorizing on a course-by-course basis a score that has been counted for the course of among the courses by the first score count means; a control program for writing a cleared-course score that is counted by the first score count means into a corresponding area of the course-score memorizing means to the cleared course when the course-clear detecting means detects a course clear, and resetting the first score counting means to write an initial value into a corresponding area of the course-score memorizing means to a course immediately-before cleared, based on choosing to advance to a same course; and a second score count program for determining a sum of the course-scores memorized in the course-by-course area of the course-score memorizing means.

The memory medium, e.g. an external ROM, has stored therein a player object image data generating program, a course image data generating program and an object image data generating program so that the video game machine can display a player object image and other object images, according to image data provided by these programs, on the display device.

The video game machine includes a CPU and a RCP (Reality Co-Processor) by which a choosing screen is displayed on the displaying device so that the player is allowed to choose a course at the start of a game or upon clearing a course. Thus, the player can choose a course to begin the game.

During playing a game, the score condition detecting means detects whether or not a score-giving condition (hit detection) is satisfied by the relation of the player object to another object. If the condition is satisfied, the first score count means counts a score for the course. If a course clear is detected by the course-clear detecting means, a first score counted by the first score count means is written into an area of the course-score memorizing means, and the first score count means is reset.

When a course that is already cleared is again chosen by the player, an initial value is written to a relevant area of the course-score memorizing means. Therefore, this course is started, and a first score is counted. The first score is summed up by the second score count means.

According to this invention, a video game system and video game memory is provided which can enhance a realism feeling in a video game, improve a player's feeling of achievement, and increase interest in the video game.

Also, where a plurality of courses are provided, it is possible to achieve a high score even in a difficult game, and advance to the same course (i.e. replay) even after clearing the course or scene difficult to manipulate, so that the player can win a high and satisfactory score without having to re-play the entire game, thereby enhancing game amusement and satisfying the player's feeling of achievement.

In one aspect of this invention, a video game system comprises: a player-object image data generating means for generating data to display an image of the player object combined by a plurality of divided portions of the player object; an influencing object image data generating means for generating influencing object image data to display an influencing object image displayed around the player object to have an effect upon the player object; a hit determining means for determining a hit for each of the divided portions of the player object when the player object is influenced by the influencing object; an image changing means for changing the image data generated by the player-object image data generating means so as to vary the display of the divided portions of the player object hit-determined by the hit determining means; and a moving state changing means for changing a moving state of the player object depending on a position of the divided portion of the player object given change by the image changing means.

Each divisional portion of the player object may be further constituted by a plurality of sub-divisional portions. In such a case, the image changing means changes the image data generated by the player-object image data generating means in such a manner that change in display is given to a sub-divisional portion of a divisional portion of the player object on which the hit determining means has determined a hit.

Note that the player object is typically selected in symmetry in left and right as viewed in plan. The hit determining means detects which portion in left or right has been hit on the player object. The image changing means causes change to a shape on a side determined to be hit by the hit determining means. The moving state changing means causes to change the moving state in a manner different between a side changed and a side unchanged by the image changing means.

For example, if the player object is in a shape of an airplane, if the right wing is assumed hit-determined, the image changing means changes the right-wing shape. In this state, if the player object is designated to move by the joystick, the moving state changing means slows down the moving speed of the right wing as compared to the left-wing moving speed. Accordingly, the player object (airplane) begins to fly in a curved path toward the right in a natural fashion.

As a result, it is possible to realize a dramatic and interesting video game, if a divisional portion of the player object is hit-determined to change a state of display of the player object depending upon a portion damaged.

If the player object is configured to vary in movement in a diversified manner so that the player has to operate an operating means to cope with the variation, a dramatic and interesting video game is provided that has increased realistic movement of the player object.

If the player object is changed in movement depending on an amount affected for each divisional portion of the player object, a dramatic and interesting video game is provided that has realistic movement of the player object.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a view illustratively representing message output content in a communication process with fellows in the FIG. 11 game;

FIG. 13 is a view showing one example of message outputting on-screen display expressed based on the communication process with the fellows in the FIG. 11 game;

FIG. 37 is an X(–Z)-coordinate in a three-dimensional space in an all-range mode;

FIG. 48 is a subroutine flowchart of a hit determination process for enemy objects.

DETAILED DESCRIPTION OF THE PREFERRED EMBODIMENTS

Now, the preferred structures of a video game system of the present invention and a video game memory medium used therefore will be described. It is noted that, although in the below embodiments relative to an exclusive video game machine, an image processing apparatus can also be used, such as a personal computer or the like. Although the operating means is explained on a game-exclusive controller, an input device, such as a keyboard or a mouse may be employed if the video game system of the invention is with an image processing apparatus such as a personal computer.

Figure 1:
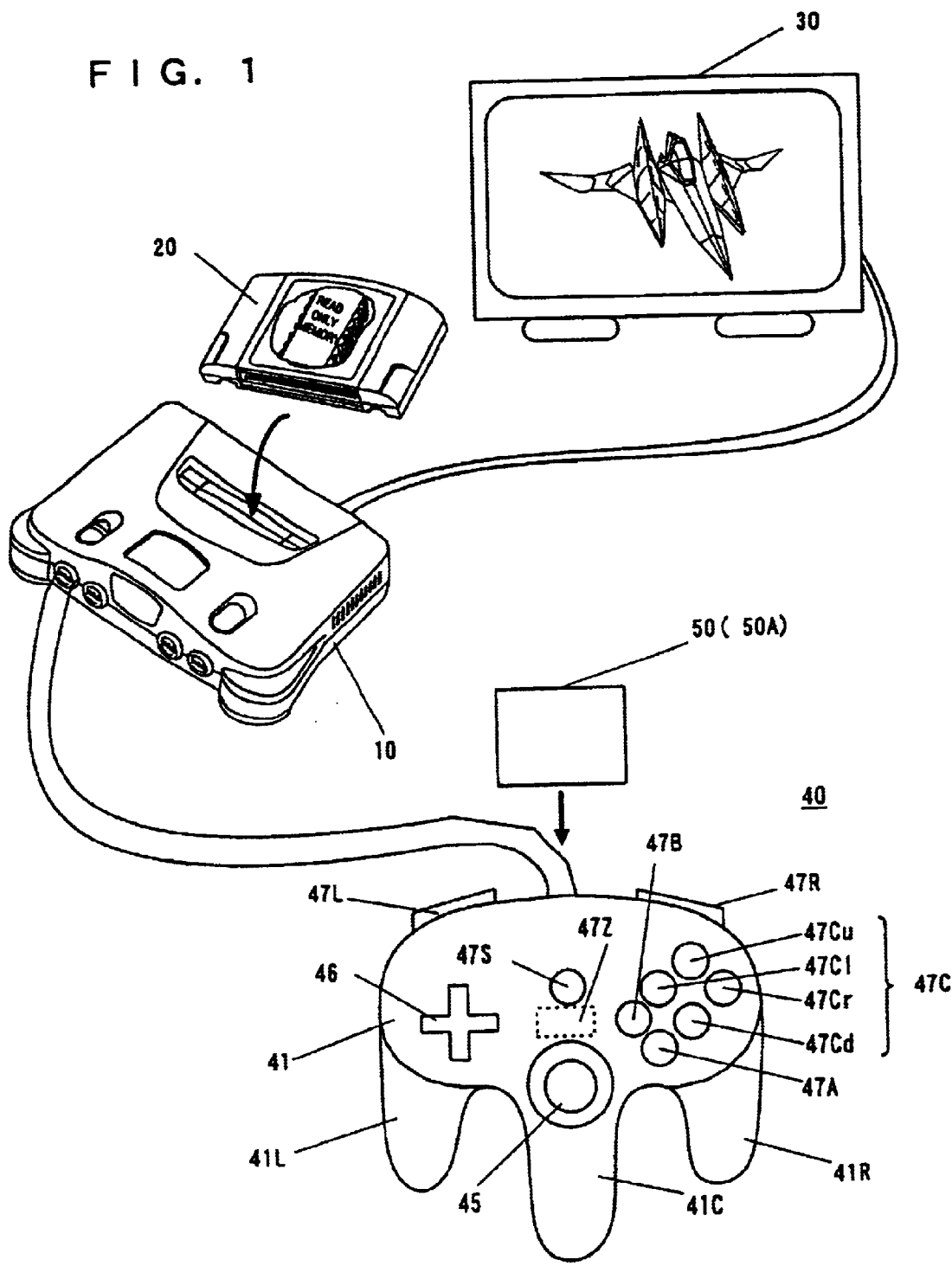
FIG. 1 is an external view showing a structure of a video game system according to one embodiment of this invention.

FIG. 1 is an external view showing a video game system according to one embodiment of the present invention. The video game system includes a video game machine main body 10, a ROM cartridge 20 as an example of an external memory device, a CRT display 30 as an example of a display device connected to the video game machine main body 10, and a controller 40 as an example of an operating means (or an operating input means). The controller 40 is detachably mounted, as required, with a RAM cartridge 50 (or a vibration cartridge 50A).

The controller 40 is provided with a plurality of switches or buttons on a housing 41 that is in a hand graspable form. Specifically, the controller 40 is provided with handles 41L, 41C, 41R at lower portions on the respective left, right and center of the housing 41, thus providing an operating area at an upper surface thereof. In the operating area, there are provided an analog-input joystick 45 at a central lower portion thereof, a cross-shaped digital direction switch (hereinafter called "cross switch") 46 on the left side, and a plurality of button switches 47A–47Z on the right side. The joystick 45 is used to designate or input a moving direction and/or moving speed (or the moving amount) of the player object based on the amount and direction of joystick inclination. The cross switch 46 is used to input a player object moving direction, in place of the joystick 45. The plurality of button switches 47 include switches 47A, 47B for designating the motion of the player object, a switch 47C for use to switch an observer's viewpoint as viewed through a camera, a start switch 47S, a motion switch 47L provided on a lateral surface of a left upper portion of the housing 41, a motion switch 47R provided on a lateral surface of a right upper portion of the housing 41, and a switch 47Z provided on a backside of the handle 41C. The switch 47C is comprised of four button switches 47Cu, 47Cd, 47Cl, 47Cr arranged at the upper, lower, left and right so that it can be used in an application other than changing the view point of the camera, such as to control the moving speed (e.g. acceleration, deceleration, etc.) in a shoot or action game. These button switches 47A–47Z can have defined functions according to a game program.

Figure 2:
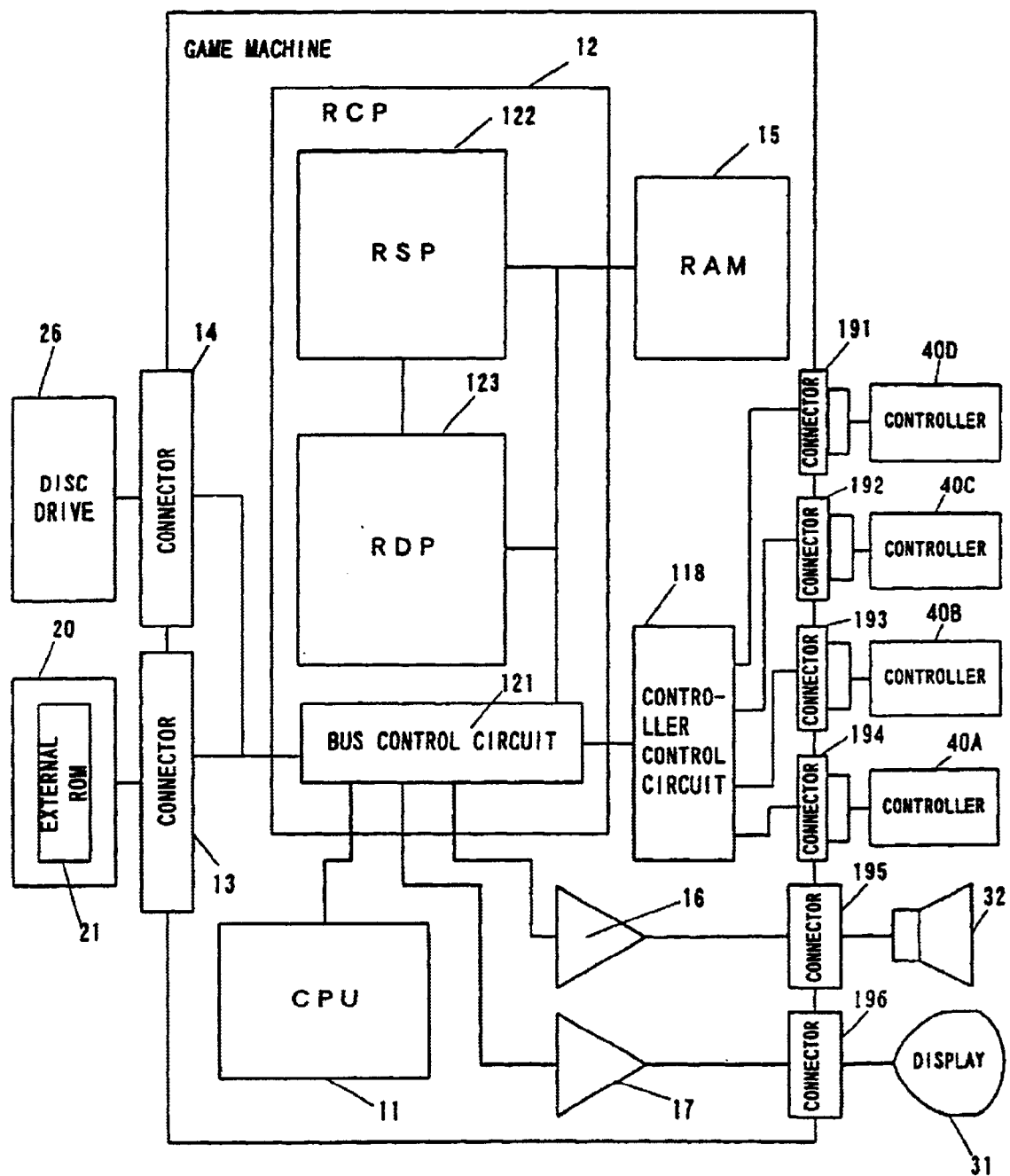
FIG. 2 is a block diagram of the video game system of the one embodiment of this invention.

FIG. 2 is a block diagram of the video game system of one embodiment of the present invention. The video game machine 10 incorporates therein a central processor unit (hereinafter abbreviated as "CPU") 11 and coprocessor (reality coprocessor: hereinafter abbreviated as "RCP") 12. The RCP 12 includes a bus control circuit 121 for controlling buses, an image processing unit (reality signal processor; hereinafter abbreviated as "RSP") 122 for performing polygon coordinate transformation, shading treatment and so on, an image processing unit (reality display processor; hereinafter abbreviated as "RDP") 123 for rasterizing polygon data into an image to be displayed and converting the same into a data form (dot data) stored on a frame memory. The RCP 12 is connected with a cartridge connector 13 for detachably mounting with a ROM cartridge 20, a disc-drive connector 14 for detachably mounting with a disc drive 26, and a RAM 15. Also, the RCP 12 is connected with an audio signal generating circuit 16 for outputting a sound signal processed by the CPU 11, and an image signal generating circuit 17 for outputting an image signal. Further, the RCP 12 is connected with a controller control circuit 18 for serially transferring operational data for one or a plurality of controllers 40A–40D and/or data for a RAM cartridge 50 for extension.

The bus control circuit 121 included in the RCP 12 parallel-serial converts the command supplied in a parallel signal from the CPU 11 via a bus so as to supply as a serial signal to the controller control circuit 18. Also, the bus control circuit 121 converts the serial signal inputted from the controller control circuit 18 into a parallel signal to give an output to the CPU 11 via a bus. The data representing an operational state read out of the controller 40A–40D is processed by the CPU 11, and temporarily stored within a RAM 15, and so on. In other words, the RAM 15 includes a storage area for temporarily memorizing the data to be processed by the CPU 11 so that it is utilized for smoothly reading and writing data through the bus control circuit 121.

The sound signal generating circuit 16 is connected with a connector 195 that is provided at a rear face of the video game machine 10. The image signal generating circuit 17 is connected with a connector 196 provided at the rear face of the video game machine 10. The connector 195 is disconnectably connected with a connecting portion of a sound generating device 32 such as a TV speaker, etc. The connector 196 is disconnectably connected with a connecting portion of a display 31 such as a TV receiver or CRT.

The controller control circuit 18 is connected with controller connectors (hereinafter abbreviated as "connectors") 191–194 that are provided at the front face of the video game machine 10. The connectors 191–194 are detachably connected with a controller 40A–40D through a connecting jack. The connection of a controller 40A–40D to a connector 191–194 in this manner places the controllers 40A–40D into electrical connection with the video game machine 10, thereby enabling transmission/reception or transfer of data therebetween.

Figure 3:
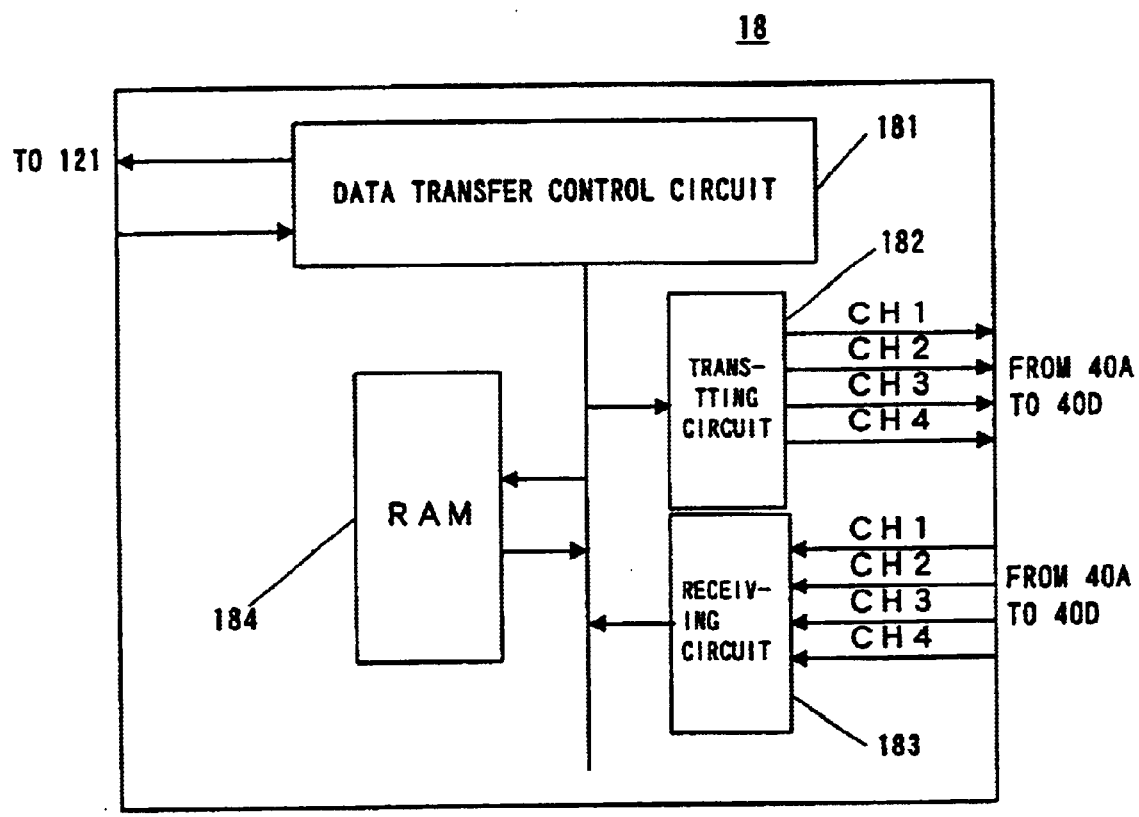
FIG. 3 is a detailed circuit diagram of a controller control circuit 18.

FIG. 3 is a detailed circuit diagram of the controller control circuit 18. The controller control circuit 18 is used for transmitting and receiving data in serial form between the RCP 12 and the controller connectors 191–194. The controller control circuit 18 includes a data transfer control circuit 181, a transmitting circuit 182, a receiving circuit 183, and a RAM 184 for temporarily memorizing transmission or reception data. The data transfer control circuit 181 includes a parallel-serial converting circuit and a serial-parallel converting circuit to convert data format during data transfer, and further performs control to write into and read from the RAM 184. The serial-parallel converting circuit converts the serial data supplied from the RCP 12 into parallel data to supply it to the RAM 184 or the transmitting circuit 182. The parallel-serial converting circuit converts the parallel data supplied from the RAM 184 or the receiving circuit 183 into serial data to supply it to the RCP 12. The transmitting circuit 182 converts the command for controlling controller-40 signal reading supplied from the data transfer control circuit 181 and the writing data (parallel data) to the RAM cartridge, into serial data to be delivered to channels CH1–CH4 respectively corresponding to the controllers 40A–40D. The receiving circuit 183 receives, in serial data, the operational state data of the controllers 40A–40D inputted through the corresponding channels CH1–CH4 and read-out data from the RAM cartridge 50 to convert them into parallel data to be delivered to the data transfer control circuit 181. The data transfer control circuit 181 serves to control writing into the RAM 184 on the data transferred from the RCP 12, the operational state data of the controller 40A–40D received by the receiving circuit 183, or the data read out of the RAM cartridge 50, and reads data out of the RAM 184 based on a command from the RCP 12 so as to transfer it to the RCP 12.

The RAM 184, though not shown, includes memory areas 184a–184h. The area 184a is stored with a command for the first channel, while the area 184b is stored with transmission and reception data for the first channel. Similarly, the area 184c is stored with a command for the second channel, while the area 184d is stored with transmission and reception data for the second channel. The area 184e is stored with a command for the third channel, while the area 184f is stored with transmission and reception data for the third channel. The area 184g is stored with a command for the fourth channel, while the area 184h is stored with transmission and reception data for the fourth channel.

Figure 4:
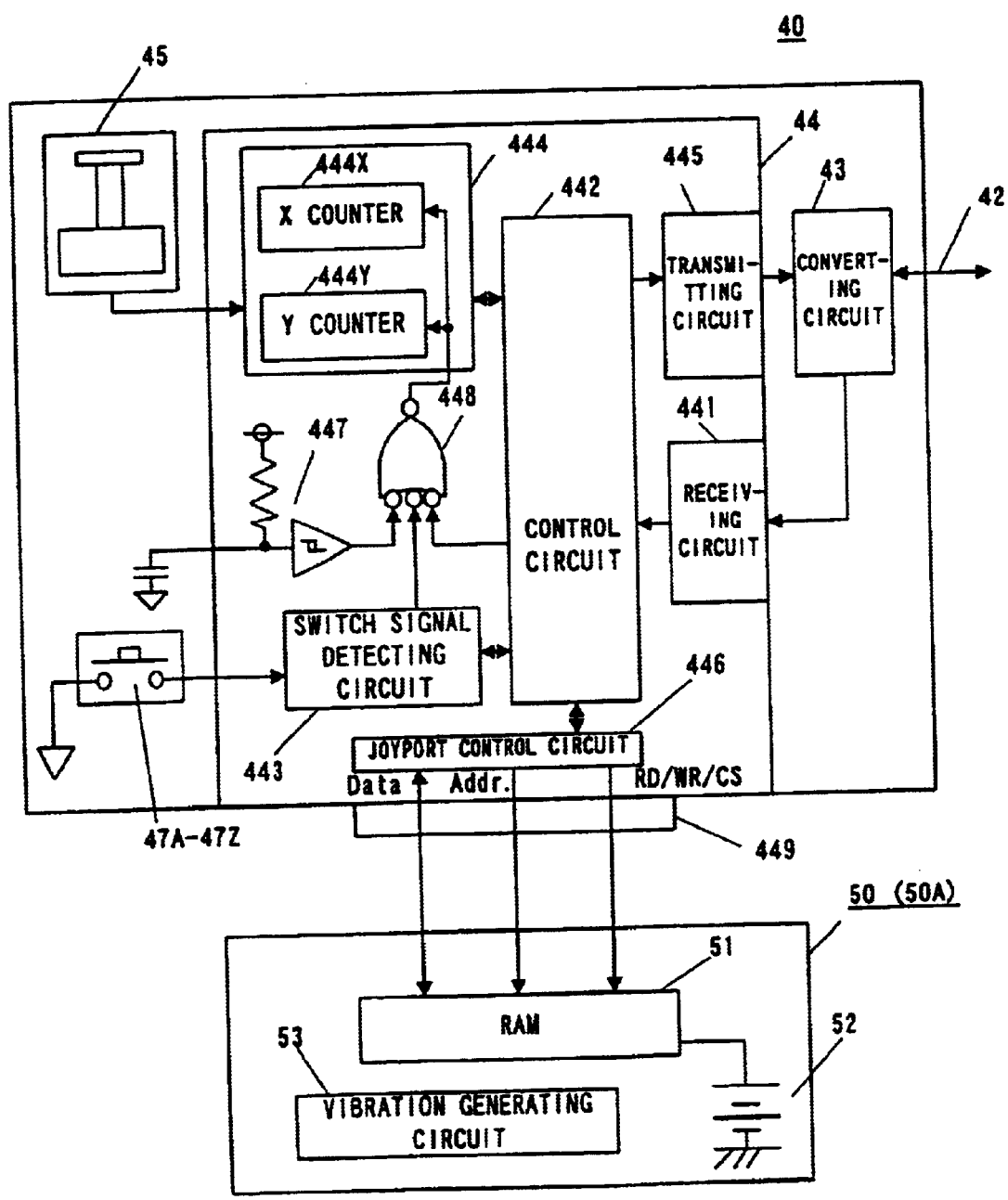
FIG. 4 is a block diagram of a controller 40.

FIG. 4 is a detailed circuit diagram of the controller 40 and the RAM cartridge 50. The housing of the controller 40 incorporates an operating signal processing circuit 44, etc. in order to detect an operational state of the joystick 45, switches 46, 47, etc. to transfer the detected data to the controller control circuit 18. The operating signal processing circuit 44 includes a receiving circuit 441, a control circuit 442, a switch signal detecting circuit 443, a counter circuit 444, a joyport control circuit 446, a reset, circuit 447 and a NOR gate 448. The receiving circuit 441 converts a serial signal, such as a control signal transmitted from the controller control circuit 18 or writing data to the RAM cartridge 50, into a parallel signal to supply it to the control circuit 442. The control circuit 442 generates a reset signal to reset (0), through the NOR gate 448, count values of an x-axis counter 444X and a y-axis counter 444Y within the counter 444, when the control signal transmitted from the controller control circuit 18 is a signal for resetting X, Y coordinates of the joystick 45.

The joystick 45 includes X-axis and Y-axis photo-interrupters in order to resolve a lever inclination into X-axis and Y-axis components to generate pulses in number proportional to the inclination so that it supplies pulse signals respectively to the counter 444X and the counter 444Y. The counter 444X counts the number of pulses generated in response to the inclination amount when the joystick 45 is inclined in the X-axis direction. The Counter 444Y counts the number of pulses generated responsive to the inclination amount when the joystick 45 is inclined in the Y-axis direction. Accordingly, the resultant X-axis and Y-axis vector that is determined by the count values of the counters 444X and 444Y serves to determine a moving direction and a coordinate position of the player object or hero character or a cursor. Incidentally, the counter 444X and the counter 444Y are also reset when a reset signal is supplied from the reset signal generating circuit 447 due to turning on the power or a reset signal is supplied from the switch signal detecting circuit 443 due to simultaneous depressing of two predetermined switches.

The switch signal detecting circuit 443 responds to an output command of a switch state supplied on a constant period (e.g. a TV frame period of a 1/30 second interval) from the control circuit 442, to read a signal varying depending upon a depression state of the cross switch 46 and the switches 47A–47Z, then delivering it to the control circuit 442. The control circuit 442 responds to a read-out command signal of the operational state data from the controller control circuit 18 to supply a predetermined data format of the operational state data on the switches 47A–47Z and the count values of the counters 444X, 444Y to the transmitting circuit 445. The transmitting circuit 445 converts the parallel signal outputted from the control circuit 442 into a serial signal, and transfer it to the controller control circuit 18 via a converting circuit 43 and a signal line 42. The control circuit 442 is connected with a port control circuit 446 via an address bus and a data bus as well as a port connector 449. The port control circuit 446 performs data input/output (or transmission/reception) control according to a command from the CPU 11, when the RAM cartridge 50 is connected to the port connector 449.

The RAM cartridge 50 is structured to connect the RAM 51 to the address bus and data bus and connect the RAM 51 with a battery 52. The RAM 51 is a RAM having a capacity of lower than a half of a maximum memory capacity accessible through the address bus (e. g. 256 k bits). The RAM 51 is used to store backup data in relation to a game, and it keeps backup data by being supplied with electric power from the battery 52 even if the RAM cartridge 50 is withdrawn from the port connector 449.

In order to represent an impact state with collisions, blasts and so on through images or sound outputting in a highly realistic manner, it is possible to use a RAM cartridge 50 incorporating a vibration generating circuit 53 or a vibration cartridge 50A comprising a vibration generating circuit 52 without RAM 51.

The ROM cartridge 20 includes an external ROM 21 mounted on a circuit board so as to accommodate the circuit board within a housing thereof. The external ROM 21 is stored with image data or program data to be image-processed for a game or the like, and sound data such as music, sound effects or messages, as desired.

Figure 5:
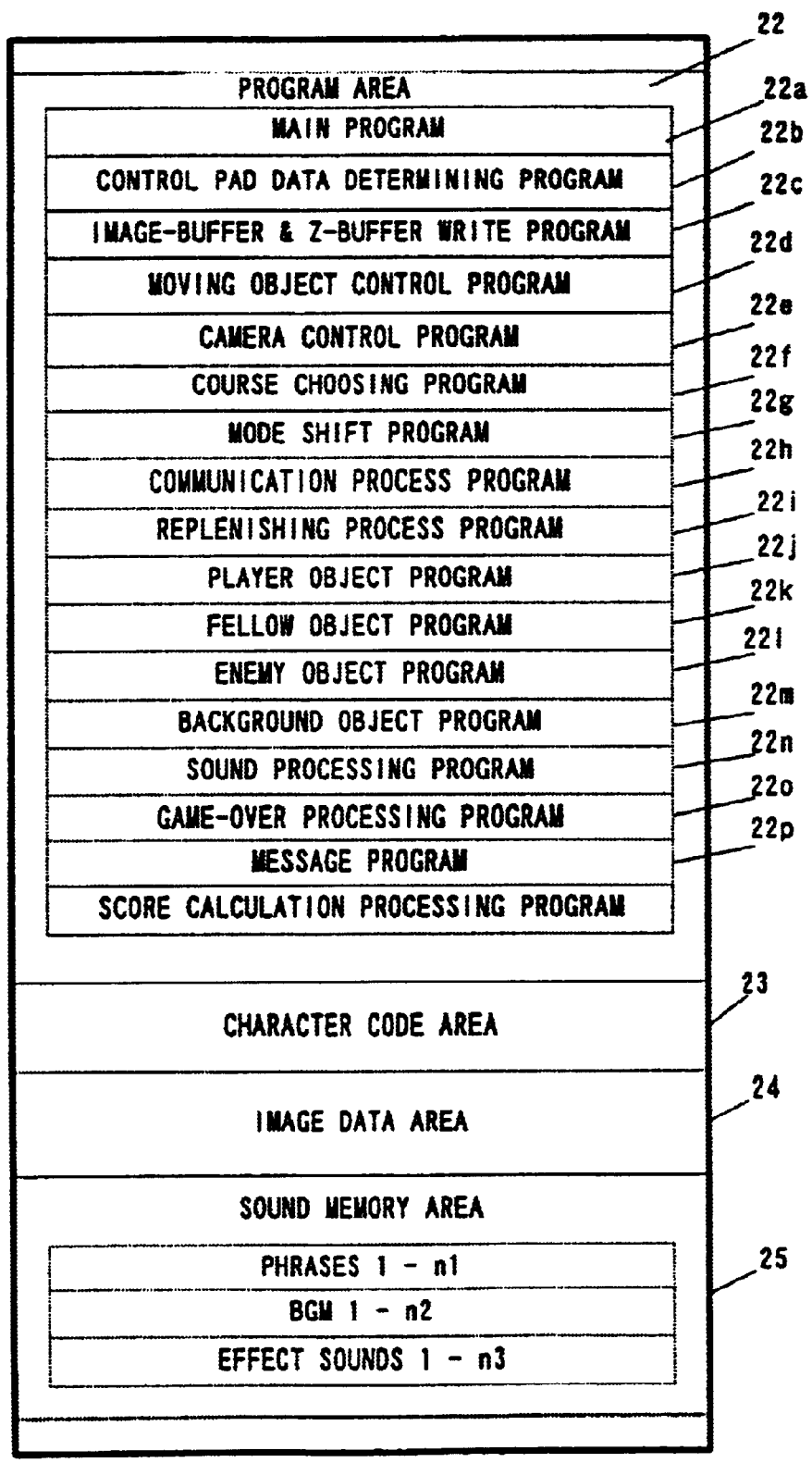
FIG. 5 is a memory map illustratively representing an entire memory space of an external ROM 21.
Figure 6:
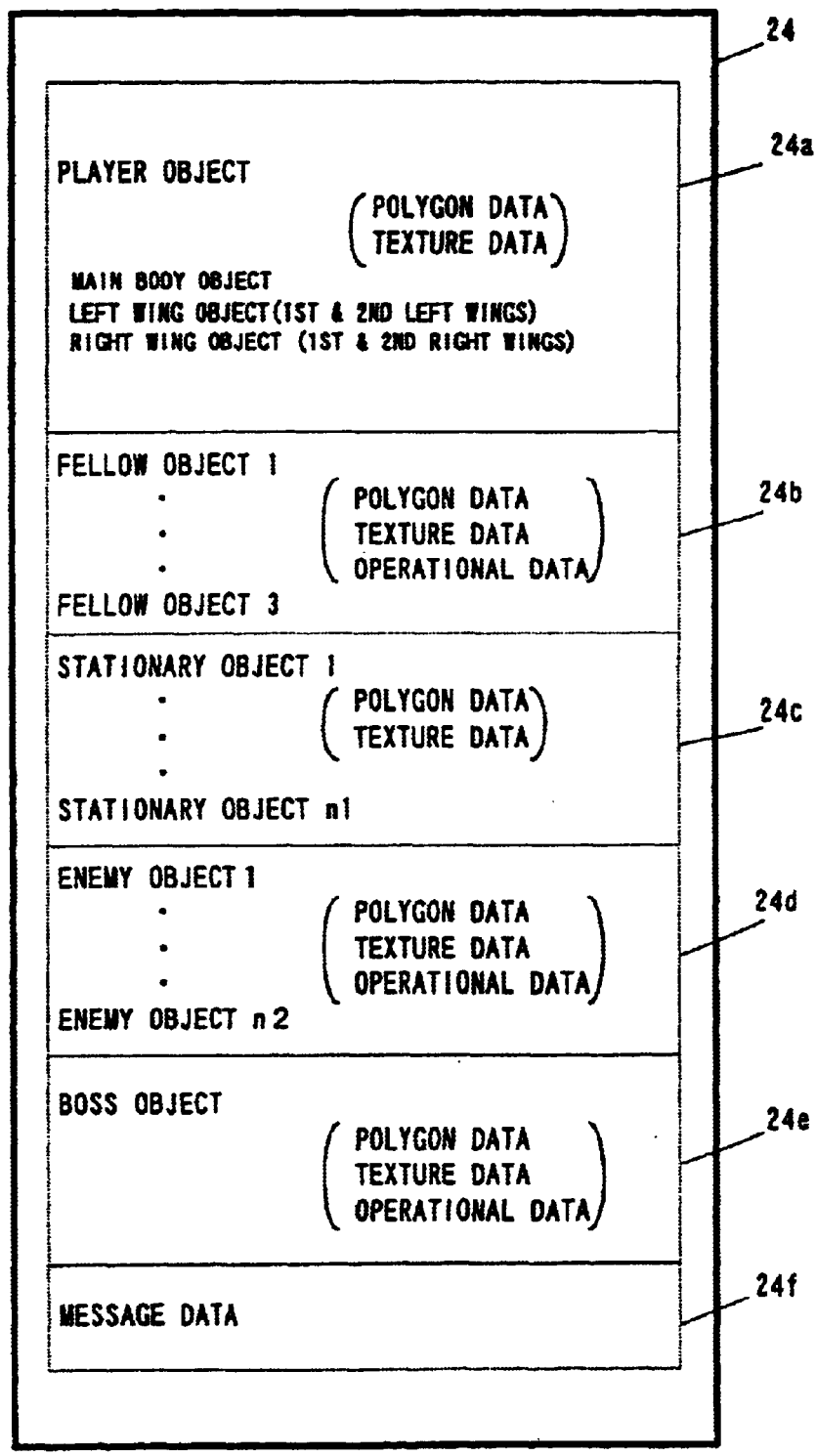
FIG. 6 is a memory map showing in detail one part of the memory space of the external ROM 21.

FIG. 5 is a memory map illustratively representing the entire memory space of the external ROM 21, while FIG. 6 is a memory map showing in detail part (image display data area 24) of the memory space of the external ROM 21. The external ROM 21 includes a plurality of memory areas (hereinafter the "memory area" is abbreviated as "area" when it is used with a data kind name put in front thereof), for example as shown in FIG. 5, a program area 22, a character code area 23, an image data area 24 and a sound memory area 25, thus memorizing various programs beforehand.

Figure 16:
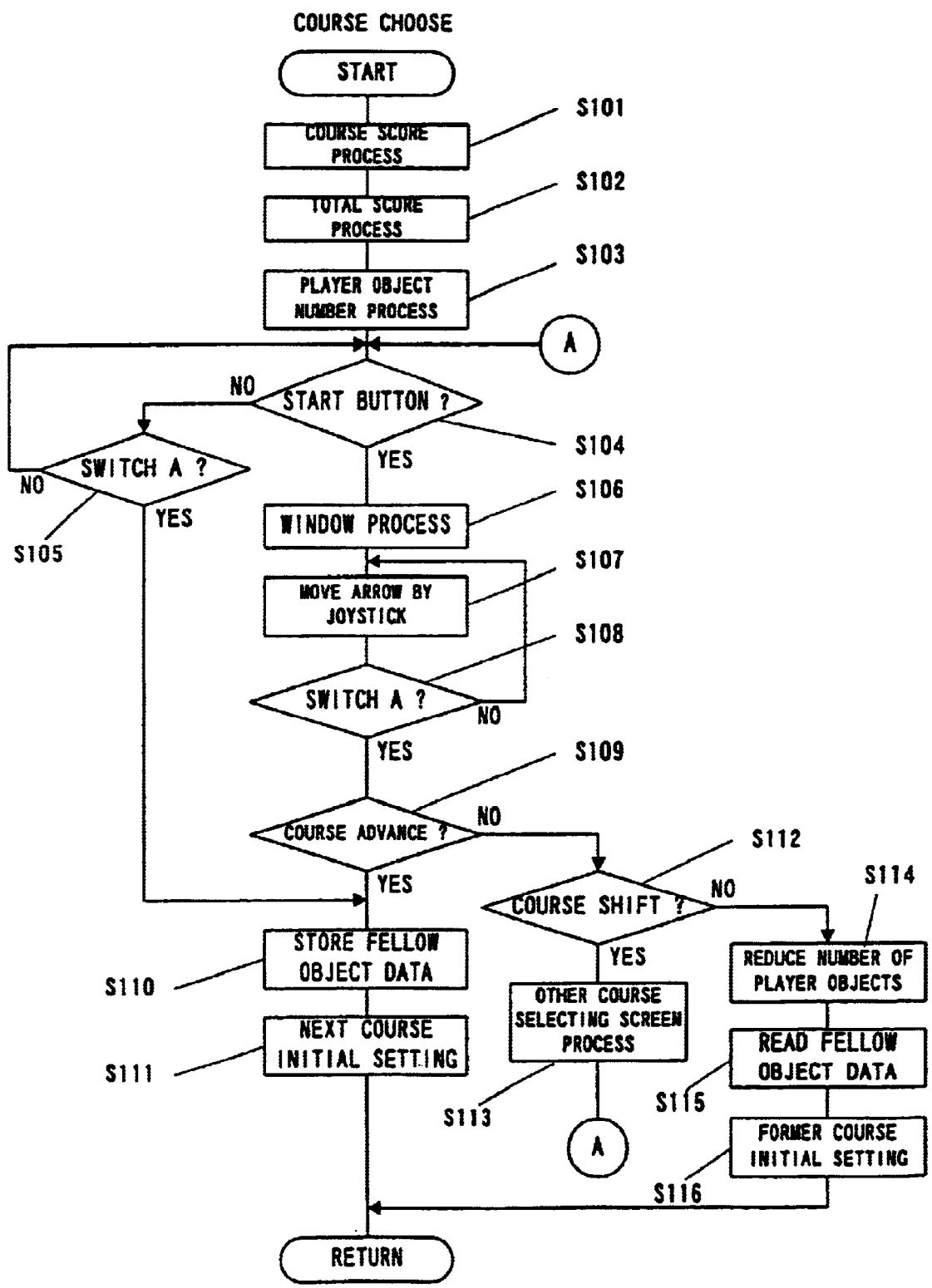
FIG. 16 is a subroutine flowchart showing a detailed process on a course choosing screen.
Figure 17:
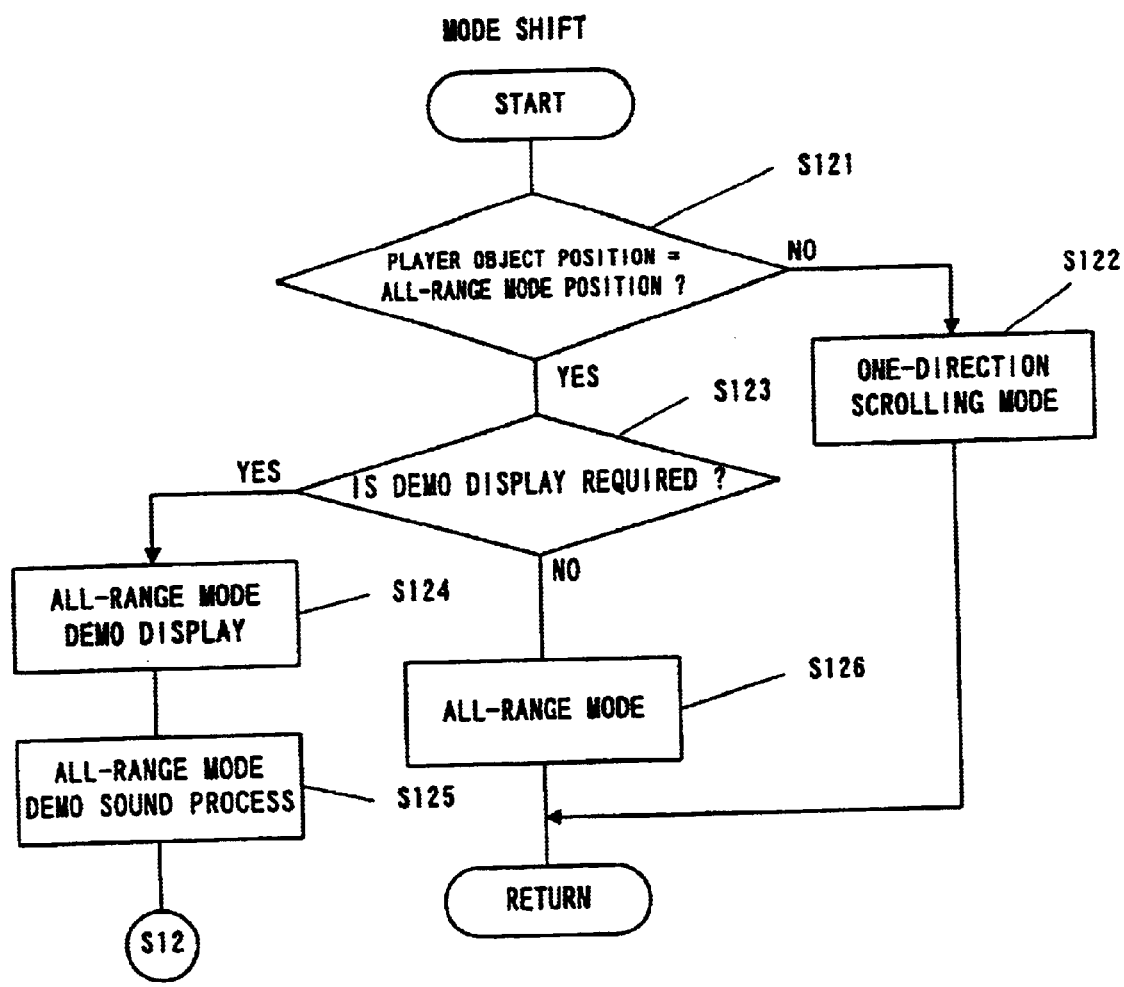
FIG. 17 is a subroutine flowchart showing a detailed process for mode shift.

The program area 22 is stored with programs required for performing image processing such as for a game (programs for realizing the functions of flowcharts shown in FIG. 15–FIG. 31 hereinafter stated or game data conforming to a game content, or the like). Specifically, the program area 22 includes memory areas 22a–22p for previously memorizing operating programs for the CPU 11 in a fixed manner. A main program area 22a is stored with a main routine processing program for a game shown in FIG. 15 hereinafter described, or the like. A control pad data (operating state) determining program area 22b is stored with a program for processing the data representative of an operating state, etc. of the controller 40. A write program area 22c is stored with a write program by which the CPU 11 causes the RCP 12 to write into a frame memory and a Z buffer. For example, the write program area 22c is stored with a program for writing chrominance data, as image data based on texture data for a plurality of movable objects or background objects displayed in one background scene, into a frame memory area (152 shown in FIG. 7) of the RAM 15, and a program for writing depth data into a Z buffer area (153 shown in FIG. 7). A movement program area 22d is stored; with a control program by which the CPU 11 causes the RCP 12 to vary the position of the movable object in a three-dimensional space. A camera control program area 22e is stored with a camera control program by which control is made as to which position and direction the movable object including the player object or the background object is photographed in the three-dimensional space. A course choosing program area 22f is stored with a course choosing subroutine program as shown in FIG. 16 to be stated later. A mode shift program area 22g is stored with a mode shifting subroutine program as shown in FIG. 17 to be described below. The program stored in the memory area 22g serves to change the direction and range of scroll, by shifting the scroll mode between one-directional scroll display and all-direction (all-range) scrolling.

Figure 19:
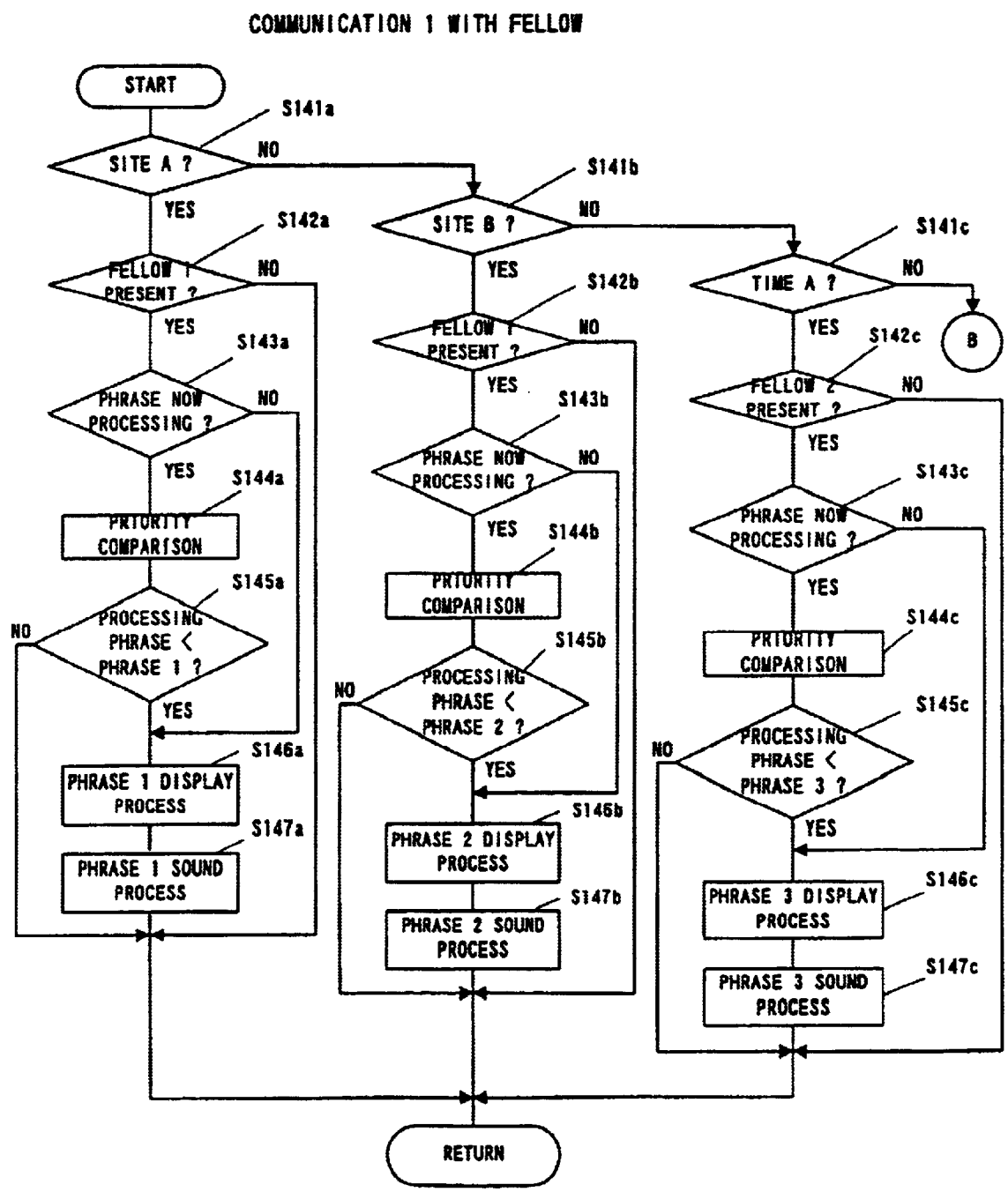
FIG. 19, FIG. 20 and FIG. 21 are subroutine flowcharts of a communication process with fellows as one example of a message outputting process for assisting game advancement.
Figure 20:
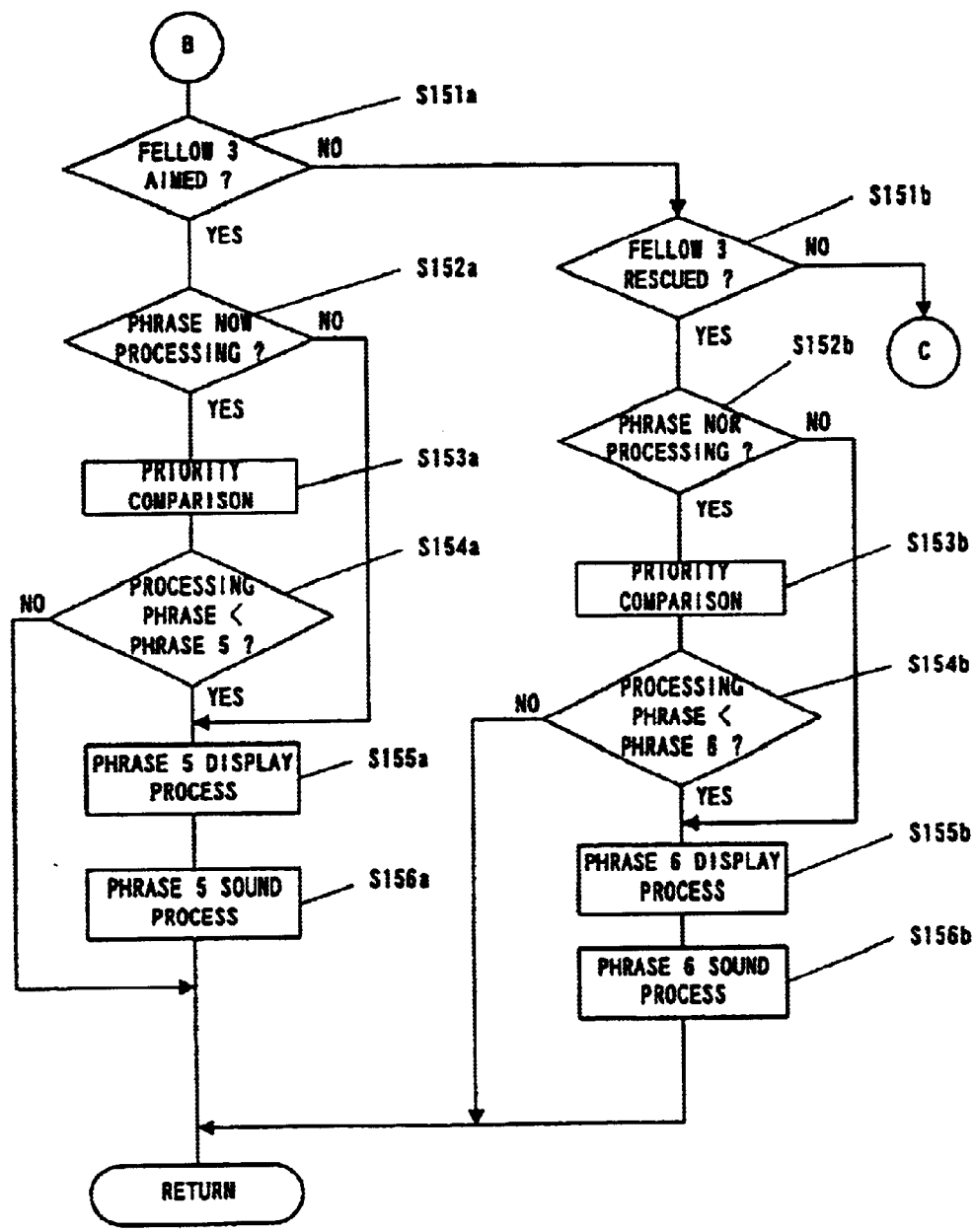
Figure 21:
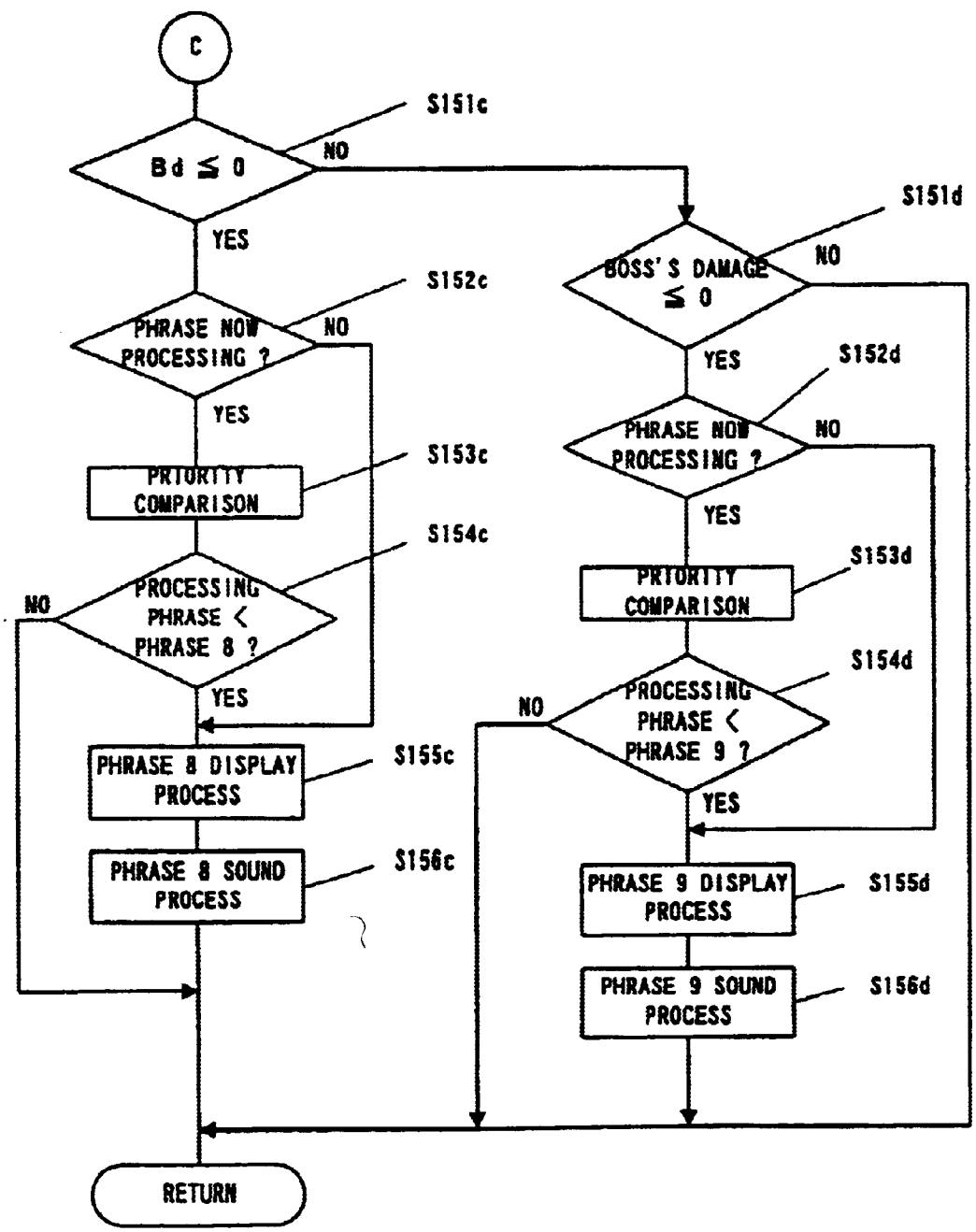
Figure 22:
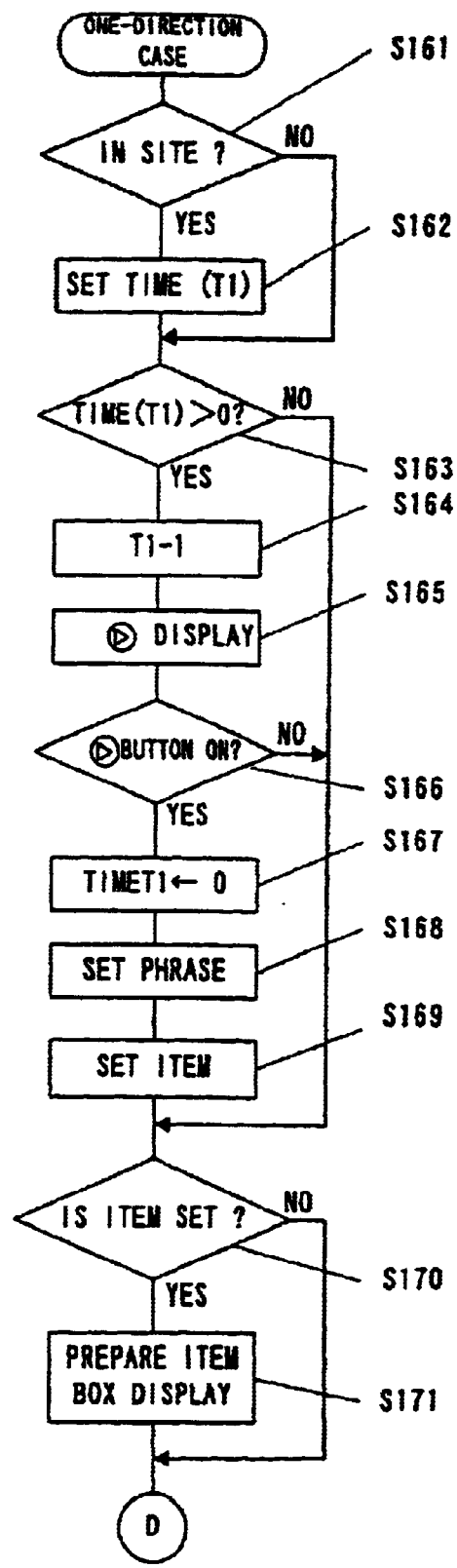
FIG. 22 and FIG. 23 are subroutine flowcharts of a replenish material supply process as another example of a message outputting process for assisting game advancement.
Figure 23:
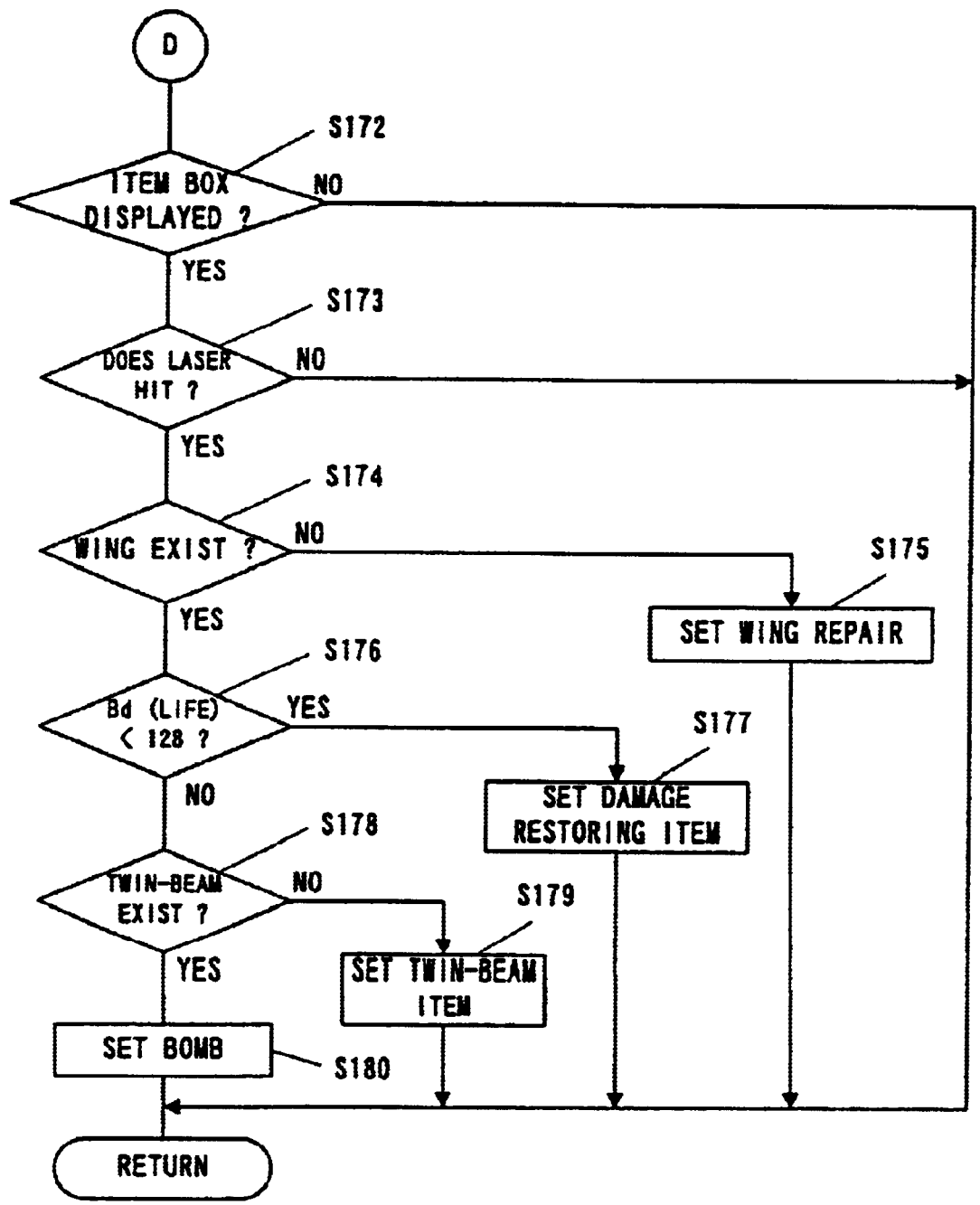

A communication process program area 22h is stored with a communication process subroutine program as shown in FIG. 19–FIG. 21 hereinafter stated. A replenishing process program area 21i is stored with a replenishing process subroutine program as shown in FIG. 22–FIG. 23 hereinafter stated. A player object program area 22j is stored with a program for display-controlling the object operated by the player. A fellow object program area 22k is stored with a program (see FIG. 24–FIG. 26) for display-controlling a fellow object that proceeds with a game in cooperation with the player object. An enemy object program area 22l is stored with a program (see FIG. 27 and FIG. 28) for display-controlling an enemy object that makes attacks on the player object. A background program area 22m is stored with a background creating program (see FIG. 29) by which the CPU 11 causes the RCP 12 to create a three-dimensional background picture (or course). A sound processing program area 22n is stored with a program (see FIG. 31) for generating a sound effect, music or voices. A game-over process program area 22o is stored with a program for a process to be carried out when a game is ended, e. g. detecting a state of a game-over or saving backup data on a state of the game up to the game-over. A message process program area 22p is stored with a subroutine program for processing a message (communication process in FIG. 19–FIG. 21, processes including a supply of replenishment materials in FIG. 22 and FIG. 23), in order to output, by displaying characters or outputting sounds, a message helpful for operation suited for the site or environment where the player object is positioned.

A literal code area 23 is an area for memorizing a plurality of kinds of literal codes, which are stored with literal dot data in plurality of kinds corresponding to a code. The literal code data stored in the literal code area 23 is utilized for displaying an explanatory note for the player during a game. In this embodiment, this area is used to display a literal message (or phrase) concerning an appropriate manipulating way or responding method at proper timing in conformity to the surrounding environment that the player object is standing (e. g. site, obstacle kind, enemy object kind) or the situation that the player object is placed in.

An image data area 24 includes memory area 24a–24f, as shown in FIG. 6. The image data area 24 is stored with respective coordinate data, texture data, etc. of a plurality of polygons for each of the background objects and/or the movable objects, and a display control program for displaying these objects stationarily at predetermined locations or moving around. For example, the memory area 24a is stored with a program for displaying the player object. The memory area 24b is stored with a fellow object program for displaying a plurality of fellow objects 1–3. The memory area 24c is stored with a background object program for displaying a plurality of background (stationary) objects 1–n1. The memory area 24d is stored with an enemy object program for displaying a plurality of enemy objects 1–n2. The memory area 24e is stored with a boss object program for displaying a boss object. The memory area 24f is stored with data for outputting a phrase or message, for example, as shown in FIG. 12 to be stated later.

A sound memory area 25 is stored with sound data, such as phrases, sound effects, and game music, for outputting a message as above in sound in a manner appropriate for the scene to cope therewith.

It is noted that the external memory device may employ other memory mediums such as a CD-ROM and a magnetic disc, in place of the ROM cartridge 20 or in addition to the ROM cartridge 20. In such a case, a disc drive (record reproducing device) 26 is provided in order to read and, if required, write various data (including program data and image display data) from an optical or magnetic disc-type memory medium, such as a CD-ROM or a magnetic disc. The disc drive 26 reads data out of a magnetic or optical disc that magnetically or optically memorizes program data similar to that of the ROM 21, to transfer the data to the RAM 15.

Figure 7:
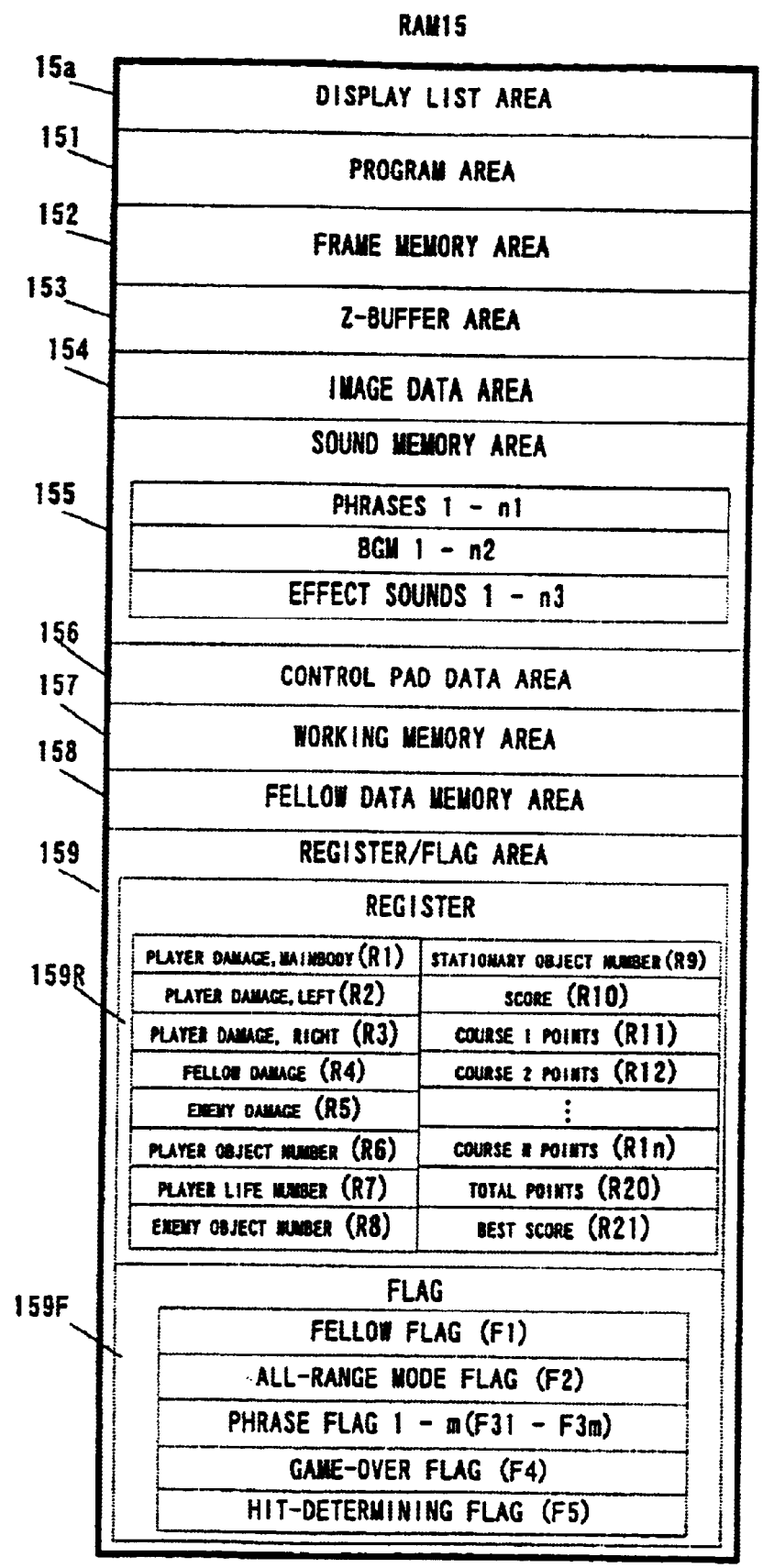
FIG. 7 is a memory map illustratively representing an entire memory space of a RAM 15.
Figure 8:
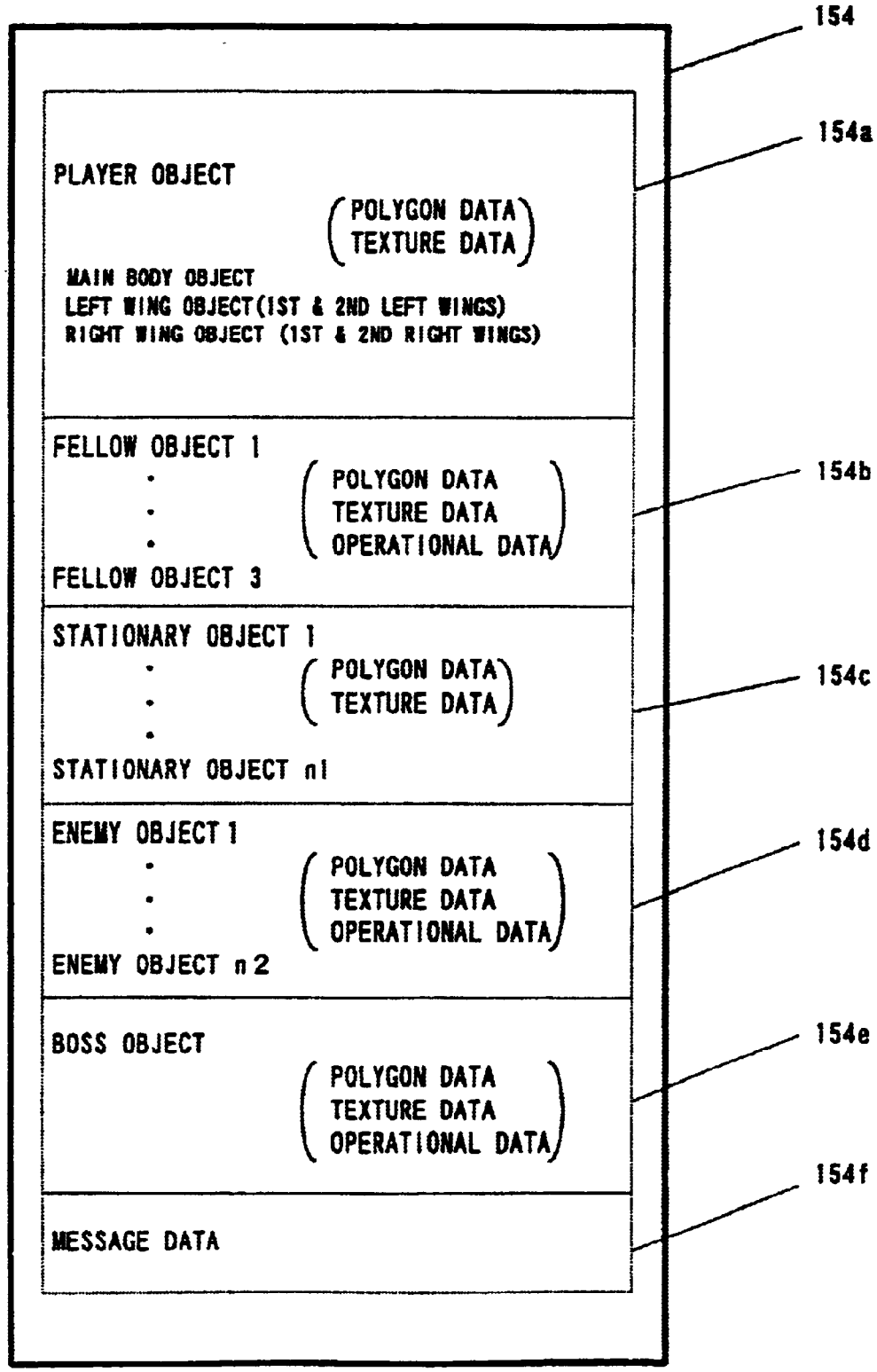
FIG. 8 is a memory map showing in detail one part of the memory space of the RAM 15.

FIG. 7 is a memory map illustratively showing an entire memory space of the RAM 15, while FIG. 8 is a memory map showing in detail part (image display data area 154) of the memory space of the RAM 15. The RAM 15 includes various memory areas 150–159. For example, the RAM 15 includes a display list area 150, a program area 151, a frame memory (or image buffer memory) area 152 for temporarily storing one frame of image data, a Z buffer area 153 for storing depth data on a dot-by-dot basis in the frame memory area, an image data area 154, a sound memory area 155, an area 156 for memorizing an operational state data on the control pad, a working memory area 157, a fellow data area 158, and a register flag area 159. The memory areas 151–159 are memory spaces that are accessible by the CPU 11 through the bus control circuit 121 or directly by the RCP 12, so that they each have an arbitrary capacity (or memory space) assigned depending upon a game being used. The program area 151, the image data area 154, and the sound memory area 155 temporarily memorize a part of the data, e. g. a game program required for a certain one course or stage, of a one-game all-scene (or stage) game program stored in the memory areas 22, 24, 25 of the ROM 21, when it is transferred thereto. If a part of program data required for a certain scene is stored in the memory areas 151, 154, 155 in this manner, the CPU 11 is enhanced in efficiency higher than the processing by directly reading out of the ROM 21 each time required by the CPU 11, thus raising the image processing speed.

Specifically, the frame memory area 152 has a memory capacity corresponding to the number of picture elements (pixels or dots) on the display 30× the number of chrominance data bits per one picture element, so that it memorizes chrominance data for each dot correspondingly to the picture elements on the display 30. The frame memory area 152 temporarily memorizes the chrominance data on a dot-by-dot basis of an object that can be seen from the observer's eye, based on the three-dimensional coordinate data for representing, in a set of a plurality of polygon, one or more of the stationary objects and/or the movable objects memorized in the image data area 154 to be displayed in one background scene in an image processing mode. The frame memory area 152 also temporarily memorizes, in a display mode, the chrominance data on a dot-by-dot basis when displaying various objects memorized in image data area 154 including the movable objects, i. e. the player object, the fellow objects, the enemy objects, the boss object, and the background (or stationary) objects, etc.

The Z buffer area 153 has a memory capacity corresponding to the number the picture elements (pixels or dots) on the display 30× the number of bits of depth data per one picture element, so that it memorizes depth data on a dot-by-dot basis corresponding in a manner to the picture elements of the display 30. The Z buffer area 153, in the image processing mode, temporarily memorizes the depth data for each dot of the object that can be seen from the observer's eye, based on the three-dimensional coordinate data for representing, in a set of a plurality of polygons, one or more of the stationary objects and/or the movable objects. The Z buffer area 153 also temporarily memorizes, in the display mode, the depth data for each dot of the movable and/or stationary objects.

The image data area 154 memorizes coordinate data and texture data for polygons, in a plurality of sets of which constitute each of the stationary and/or movable objects stored, for game display, in the ROM 21 so that at least one of course or stage data is transferred thereto from the ROM 21 prior to an image processing operation. The detail of the memorized data in the image data area 154 will be explained with reference to FIG. 8.

The sound memory area 155 is transferred by a part of sound data (data of phrases, music and sound effects) stored in the memory area of the ROM 21 which is temporarily memorized as sound data to be generated through the sound generating device 32.

The control pad data (operational state data) memory area 156 temporarily memorizes operational state data representative of an operating state read out of the controller 40.

The working memory area 157 temporarily memorizes data such as parameters, during execution of a program by the CPU 11.

The fellow data area 158 temporarily memorizes data for display-controlling the fellow object stored in the memory area 22k.

The register flag area 159 includes a plurality of register areas 159R and a plurality of flag areas 159F. The register area 159R includes registers R1–R3 for loading with the amounts of respective damages to a main body, a left wing and a right wing, a register R4 for loading with the damage to the fellow, a register R5 for loading with the damage to the enemy (boss), a register R6 for loading with the number of the player objects, a register R7 for loading with the player's life count, a register R8 for loading with the number of the enemy objects to be displayed on one scene, a register R9 for loading with the number of the stationary objects, a register R9 for loading with the score points in a course being played, registers R11–R1n for loading with score points for the course 1–n, a register R20 for loading with the total points and a register R21 for loading with a highest point. The flag area 159F is an area for memorizing a flag by which the state of the game under progress is known, and includes, for example, a fellow flag F1, a mode flag F2 for discriminating a mode of display range, phrase flags F31–F3m for memorizing whether a phrase 1–m should be outputted or not, a game-over flag F4 for discriminating the presence or absence of detection on a condition of reaching a game over, and hit determination flag F5.

Figure 9:
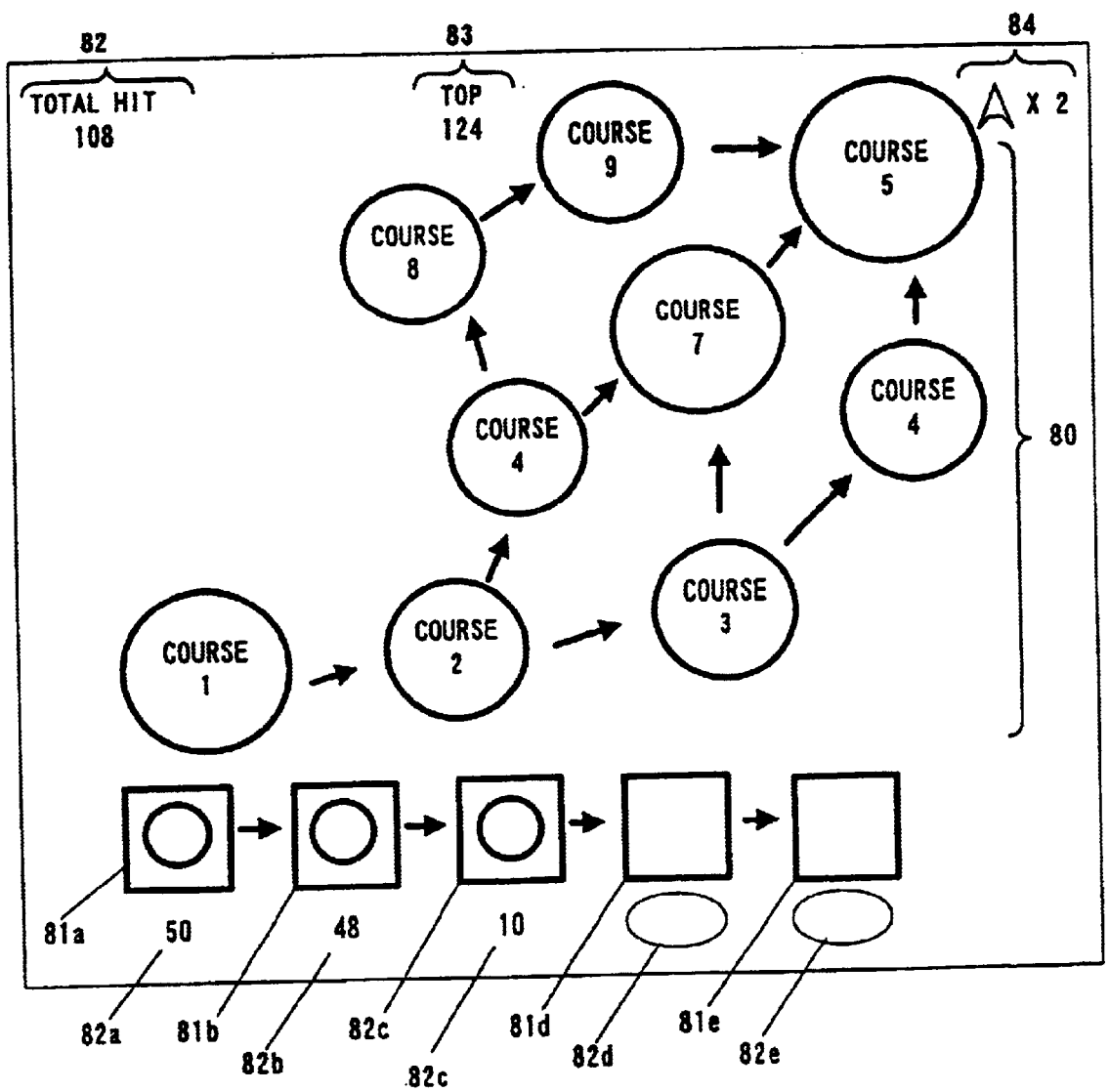
FIG. 9 is a view showing game courses as one example to which this invention is applied.
Figure 10:
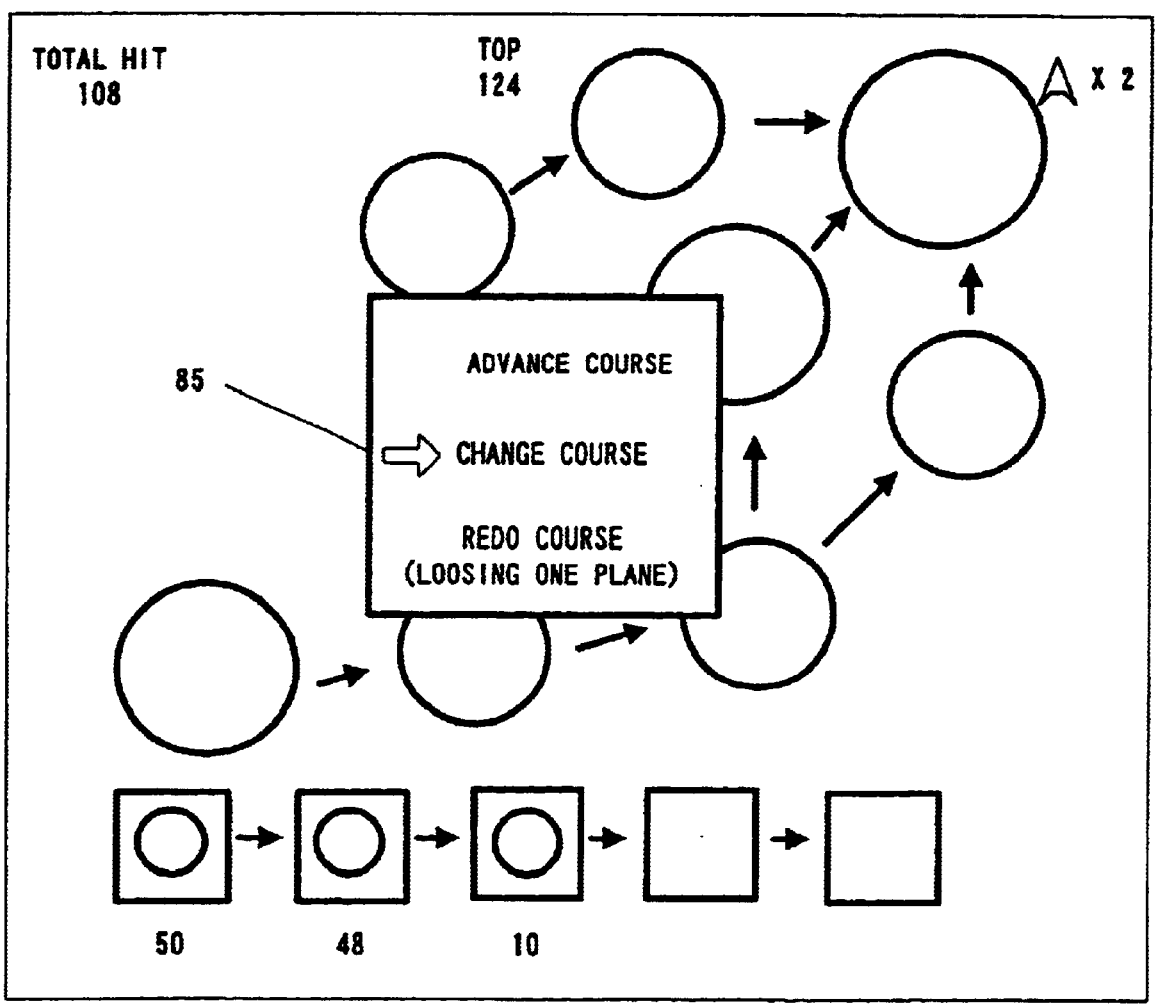
FIG. 10 is a view showing a course choosing scene of the game.
Figure 11:
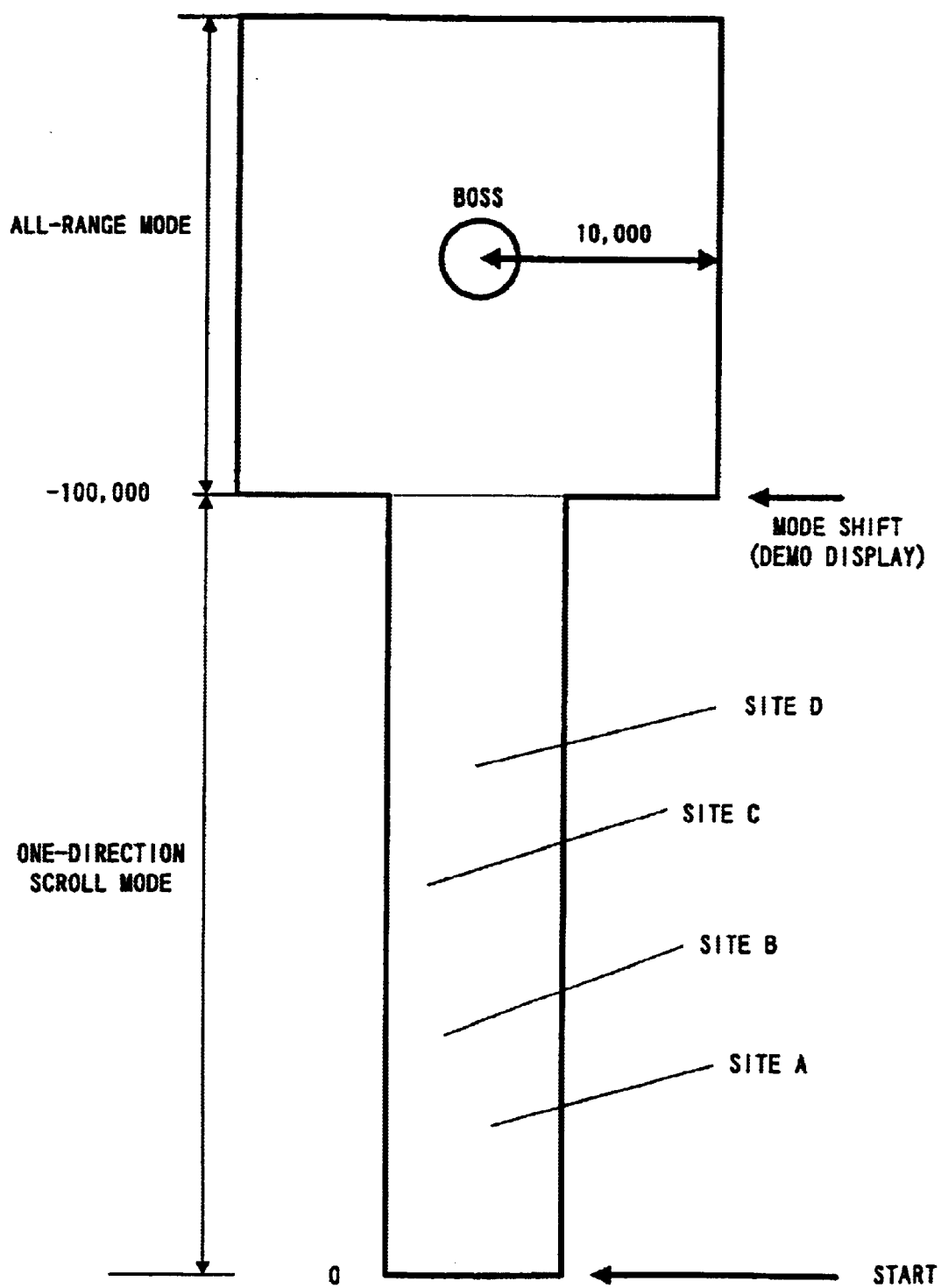
FIG. 11 is a diagram showing a game area map for explaining a game content as one example of which this invention is applied.
Figure 14:
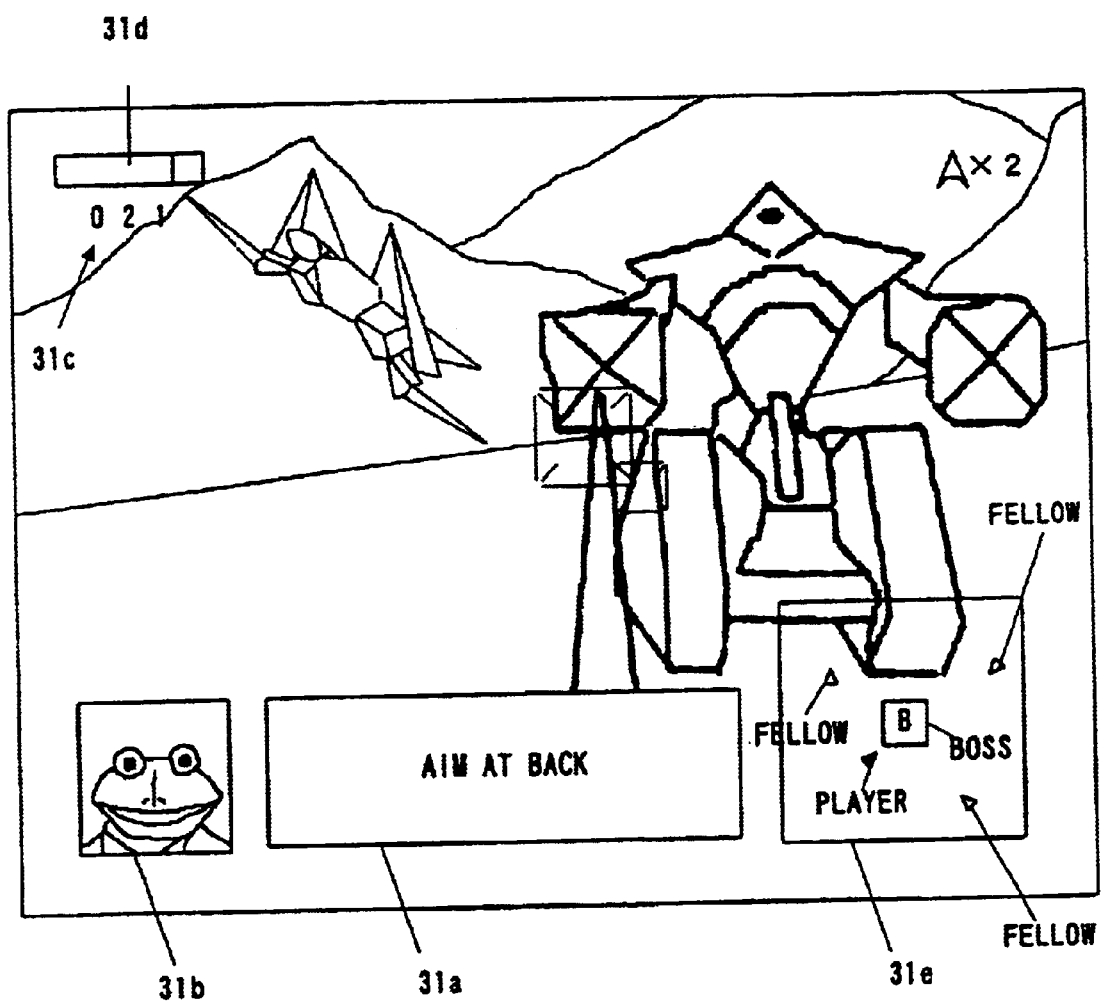
FIG. 14 is a view showing one example of on-screen display of combating against a boss character in the FIG. 11 game.

FIG. 9 is a view showing one example of game courses to which the present invention is applied. FIG. 10 is a view showing a course choosing screen for the game shown in FIG. 9. FIG. 11 is a diagram showing a game area map for explaining one example of a game content to which the present invention is applied. FIG. 12 is an illustrative view showing a message output content in a process of communication with a fellow in the FIG. 11 game. FIG. 13 is a diagram showing one example of an on-screen representation of a message output that is represented based on the communication process with the fellow in the FIG. 12 game. FIG. 14 is a view showing one example of an on-screen representation in a state of waging war against a boss character in the FIG. 11 game.

Referring to FIG. 9–FIG. 14, explanations will be made on the outline of the video game to output a message helpful for advancing the game, which constitutes a feature of the present invention. Although the game content of the video game is determined by the program stored in the ROM 21, a shoot game example will be shown in the embodiment. At a start of the game, the courses shown in FIG. 9 are displayed. In FIG. 9, display is given for clear course display areas 81a–81e below a course display area 80, indicating a cleared state on a course-by-course basis. A course score display area 82 and a high score (top points) display area 83 are displayed in an upper portion of the screen.

At an initial stage of the game, if a course 1 is selected, a scene of a start point of FIG. 11 is displayed as shown in FIG. 12. The long distance from a start point to a mode shift point, shown in FIG. 11, (e.g. a hundred thousand in a depth coordinate unit; unit arbitrary) is chosen as a display region for one-direction scroll mode. The one-direction scroll mode display region has a width selected in the same as the screen size that can be displayed on a display screen 31 of the display 30, being used for scroll display from the upper to the lower. In the one-direction scroll mode display region, display is made, in order, for the objects 71–71n (see FIG. 12) constituting background pictures, such as buildings, trees, mountains, roads, and sky, representing backgrounds or stationary objects on the course. At predetermined points A–D in the midway thereof, a plurality of enemy objects 72a–72n appear to attack a player object 60 or obstruct the player object 60 from advancing forward.

The places A, B, C, D in the course of the one-direction scroll mode display region are determined as sites to output, in display or sound, a message (or phrase) for letting the player know an appropriate manipulating way or assisting the player object 60, in order to repel away the enemy objects 72a–72n or skillfully avoid their attacks. As shown in FIG. 12, a message is displayed on the display area 31a. A fellow's face who is sending the message is displayed on the display area 31b. The score under playing is displayed in the display area 31c, and the life (amount capable of withstanding against the damage) is displayed on the display area 31d.

The messages, as concrete examples, are illustratively shown in FIG. 13. Among a plurality of messages, a message set for a site by the program is displayed in the display area 31a. In this game example, there is shown a case that phrases are outputted in sound and picture in different ways depending on the kind and scene of a person or entering character so that a message is taught by a fellow as to a manipulating method suited for the situation in relation to the phrase occurrence. The phrases 1–9 are determined in priority order so that, when detecting a condition of generating a plurality of phrases at the same timing, a higher preference order of a phrase is generated. In relation to the display of a message, a face of the fellow object 73 sending the message is displayed. The message includes a control method (a message "get over with brake" for designating deceleration) where the player object 60 is assumed to be a fighter, and a manipulating way telling as to which switch should be operated in what manner on the controller 40 for achieving the control method (a message "C button down" indicative of depression of the button 47Cd: preferably displaying a different color of lower buttons among four buttons arranged at the upper, lower, left and right). In addition to the message display, sound outputting ("get over with brake") is also made, as required. At the site C is generated a message "twice depressing either Z or R" telling on depressing the switch 47Z or 47R two times. In this manner, the message content is different by the site A–D depending upon the shape or movement of the enemy object. If the player manipulates the joystick 45 to control the position and direction of the player object 60 and operates a switch, of the switches 47A–47Z, in conformity to the message output, he can easily perform an appropriate operation even where the number of the switches is large and appropriate and quick switch operation is difficult or impossible. It is possible to easily attack the enemy or avoid crises by quickly doing the indicated operation. The player, even if unskilled, can easily proceed to forward scenes.

When the player object 60 reaches a mode shift point, the display mode is shifted into an all-range mode in which scrolling is possible in every direction. In the all-range mode, a boss character (boss object) is placed at a center of a displayable area so that the player object 60 can make attacks on the boss character 74 while turning around thereof. The range over which the player object 60 can move about is selected in a short distance (e. g. a hundred thousand) in direction of upper, lower, left and right with respect to the boss character 74. When the player object 60 comes close to a boundary of the moving range, the camera photographing the player object 60 is changed over in direction to thereby automatically change the moving direction of the player object 60. At this time, a size-reduced map is displayed in the map display area 31c in the lower right of the display screen 31 so that the player can readily know the position the player object 60 is standing. The map includes the display of symbols of the boss character 74, the player object 60 and the fellow object 73.

Figure 15:
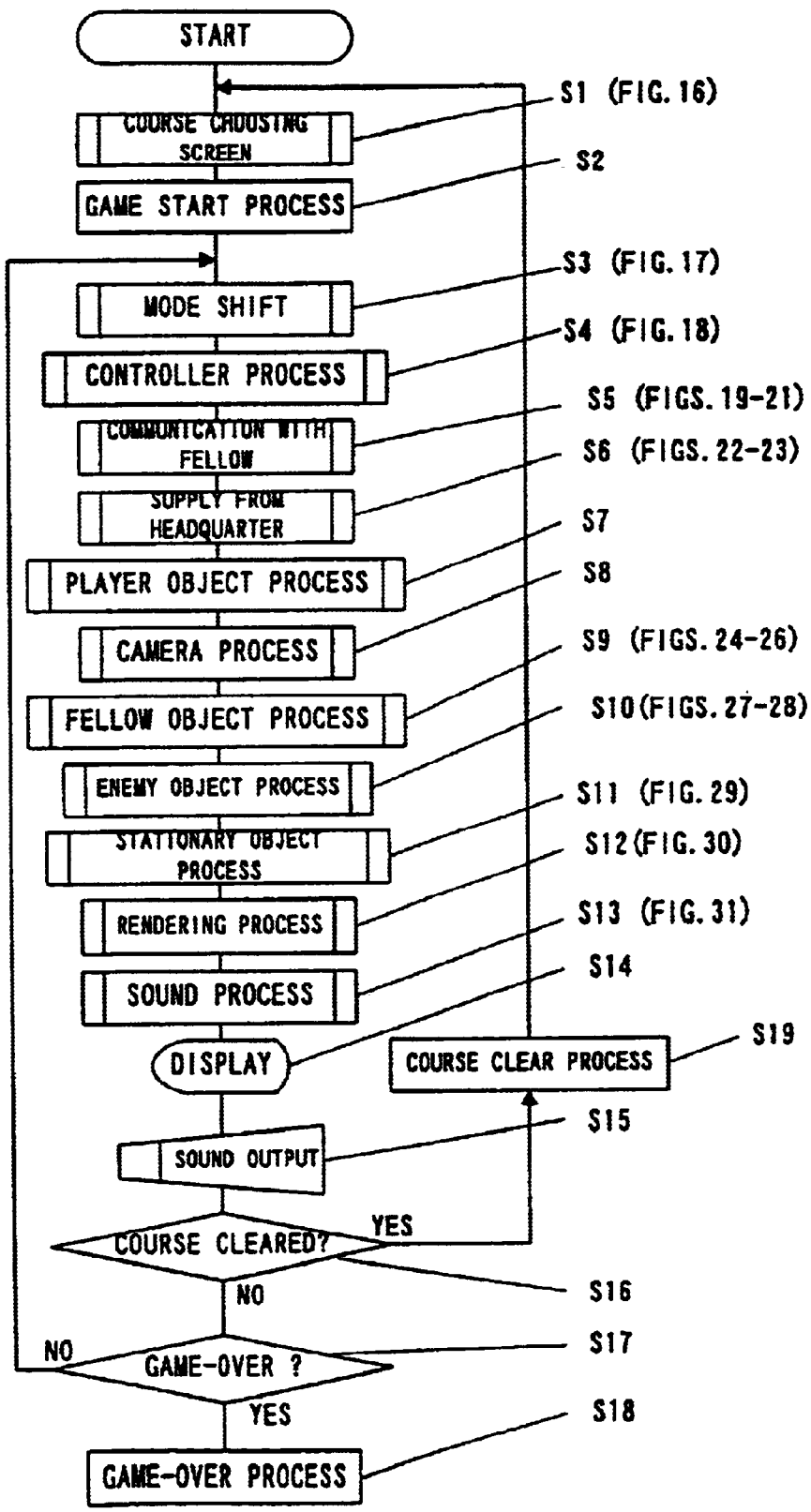
FIG. 15 is a main flowchart for processing a game according to one embodiment of this invention.

FIG. 15 is a main flow chart of a video game system of one embodiment of the present invention. Referring to FIG. 9–FIG. 15, explanations will be briefly made on the principle of this invention along the main flow chart of FIG. 15.

Upon turning on the power, the CPU 11 during starting sets the video game machine 10 to a predetermined initial state. For example, the CPU 11 transfers a start program among the game programs stored in the program area of the ROM 21 to the program area 151 of the RAM 15, to set parameters to their initial values, and thereafter execute, in order, processes of the FIG. 15 flowchart.

The flow operation of FIG. 15 is executed on every 1 frame (1/30 second). Before clearing the course, a step 1 (denoted with "S" in the Figure), a step 2, and step 3–step 17 are executed, and thereafter a step 3–a step 17 are repeated. If the game is ended without success of course clear, a game-over process of a step 18 is executed. If the course clear is successfully made, the process returns from the step 16 to the step 1.

That is, although at the step 1 display is made for the game course scene and/or course choosing scene, a course scene as shown in FIG. 9 is displayed if the game is started after turning on the power. Incidentally, after advancing to course 2 by clearing course 1 shown in FIG. 9 and the course 2 is also cleared, a course choosing screen as shown in FIG. 10 is displayed. When choosing a course on the course choosing screen, a course-choosing subroutine as shown in FIG. 16 (operations of steps 101–116) is executed. This, however, does not constitute an essential part of the present invention, and therefore a flowchart only is shown to thereby omit detailed operational explanations.

Since the game of the course 1 is performed immediately after the start, the game starting process is made for the course at the step 2. For example, the register area 159R and the flag area 159F are clear-processed (initial values are set for the registers R6, R7), and various data required for performing the game for the course 1 (or a selected course) is read out of the ROM 21 and transferred to the memory areas 151–155 of the RAM 15.

At the step 3, a mode-shift subroutine process is performed. The player object 60 is present at the start point in FIG. 11 immediately after starting the game. However, the time period between the start point (Z coordinate=0) and the mode-shift point (Z coordinate=−a hundred thousand) lies in the one-direction scroll mode. Accordingly, it is determined at a step 121 in FIG. 17 that the player object is not present at the all-range mode position, so that a flag F2 is reset at a step 122 to make shifting to the one-direction scroll mode, and then the process proceeds to the next step 4. The detailed operation thereof will be explained later with reference to FIG. 17.

At the step 4, a controller process is performed. This process is performed by detecting whether any of the joystick 45, the cross switch 46 and the switches 47A–47Z of the controller 40 are operated or not. The detected data (controller data) on the operating state is read, and the read controller data is written. The detailed operation will be explained later with reference to FIG. 18.

At the step 5, a process of communication with a fellow is performed. This process is made by displaying or sound-outputting a message telling an appropriate manipulating way, which constitutes a feature of the present invention. That is, the player is known of an appropriate manipulating way, at the site A–D in the one-direction scroll period shown in FIG. 11, by being indicated, or sound-outputted, with a message or phrase as shown in FIG. 13. The detailed operation thereof will be explained by an example below with reference to FIG. 19–FIG. 21. Incidentally, it is pointed out that the content or occurring condition of a message is merely one example and it may differ depending upon the content or kind of a game, and can be modified for the particular usage.

At the step 6, a replenishing process is performed to supply materials from a headquarter. In this process, items for assisting the player (e.g. parts for repairing a wing of a fighter, firearms, rifles, etc.) are sent from the headquarter or a fellow, even where the player object 60 is raided by an enemy and a fuselage suffers damage and normal fight is impossible. When an item is displayed on the screen, if the player performs an operation to acquire the same (overlapping the fuselage over the item, hit the item by shoot, etc.), the damaged portion can be restored to a former state or an item advantageous for attacking the enemy can be offered. In this case, since the item required by the player differs depending upon a state of the damage to the player object, the kind of items are automatically determined according to a predetermined preferential order. The detailed operation will be explained later with reference to FIG. 22 and FIG. 23.

At the step 7, a process for displaying the player object 60 is carried out. Although this process differs depending upon whether the player object 60 exists in any of the one-direction scroll region and the all-range region, it is basically a process of changing the direction or shape based on the operating state of the player-operated joystick 45 and the presence or absence of an enemy's attack. For example, the control in display of the player object 60 is made by calculating after-change polygon data that is based on the program transferred from the memory area 22j, the polygon data of the player object transferred from the memory area 24a, and the operating state of the joystick 45. The chrominance data is written to addresses in the memory area 154a corresponding to a surface of a plurality of triangles constituting a plurality of polygons thus obtained so as to put thereto a pattern or color paper designated by the texture data.

At the step 8, a camera process is made. For example, coordinate calculations are made for an angle at which the object is viewed such that the observer's eye or view site as viewed through a finder of a camera takes an angle designated by the player.

At the step 9, a fellow object process is performed. The fellow object is calculated to a predetermined positional relation to the player object in the one-direction scroll region. For example, the fellow object is not displayed when it is flying behind the player object 60, while, when the player object 60 decelerates, a calculating process is made to display as if it was flying in front thereof. In the all-range region, when the fellow object is flying in front of the player object 60, it is displayed together with the fellow's fuselage by symbols in a size-reduced map. When it is flying on a rear side, it is displayed only by a symbol in the size-reduced map. The detail will be stated later with reference to FIG. 24–FIG. 26.

At the step 10, a process of the enemy object is performed. In this process, the display position and/or shape of the enemy object 72a–72n is determined by calculation of polygon data to display a varied image such that it moves to attack the player object 60 or obstruct the advancement thereof while judging on the movement of the player object 60, based on the program partly transferred from the memory areas 221 and 24d. Due to this, the enemy object acts in a manner having a certain effect upon the player object 60. The detail will be stated later with reference to FIG. 27 and FIG. 28.

At the step 11, a process of the background (for stationary) object is performed. In this process, the display position and shape of the stationary object 71a–71n is determined by calculation based on the program partly transferred from the memory area 22m and the polygon data of the stationary object transferred from the memory area 24c. The detail will be explained later with reference to FIG. 29.

At the step 12, the RSP 122 performs a rendering process. That is the RCP 12 performs, under the control of the CPU 11, a transforming process (coordinate transforming process and frame memory rendering process) on the image data for displaying the movable object and the stationary object, based on the texture data for the movable object, such as the enemy, the player, the fellow, and the stationary object such as the background memorized in the image data area 154 of the RAM 15. Specifically, chrominance data is written into addresses in the memory area 154d corresponding to the plane of the triangle constituting a plurality of polygons for the movable object or the stationary object, in order to affix a color designated by the texture data determined for the object. The detail will be explained later with reference to FIG. 30.

At the step 13, the RCP 12 performs a sound process based on sound data such as on a message, a music and a sound effects. The detail will be explained later with reference to FIG. 31.

As a result of rendering process at the step 12 by the RCP 12, the image data stored in the frame memory area 152 is read out, whereby the player object, the movable object, the stationary object, the enemy object, etc. are displayed at the step 14 on the display screen 31.

At the step 15, a sound such as a music, sound effects or speech is outputted by reading the sound data obtained by the sound process at the step 13 by the RCP 12.

At the step 16, it is determined whether the course is cleared or not (course-clear detection). If the course is not cleared, it is then determined at the step 17 whether the game is over or not. If not game-over, the process returns to the step 3 whereby the steps 3–17 are repeated until the condition of game-over is detected. If detection is made for a condition of the game over, e. g. the number of mistakes forgiven for the player becomes a predetermined number or the life of the player object is spent by a predetermined amount, a game-over process is carried out at the following step 18 with a selective process of continuing the game or saving backup data. Incidentally, at the step 16 if the condition of clearing the course (e.g. the boss overthrown, etc.) is detected, the course-clear process is made at the step 19, and then the process returns to the step 1. Here, the course clear process involves, for example, loading a register-stored course score gained in the play immediately before onto a corresponding course-score register so as to indicate the course score as a course points in FIG. 11. If a plurality of courses are cleared, the total points are determined and displayed. Incidentally, the calculation of a course score may be added, as required, by a bonus point for a course clear.

Explanations will be made hereinbelow on the detailed operation for each subroutine.

Referring to FIG. 16, explanations will be made in detail for course choice (step 1 of the main routine) characterized by the present invention. At a step 101, the CPU 11 makes a display process for displaying course-scores, that are acquired for each course by the player and memorize in the register area 159R of the RAM 15 as shown in FIG. 9, on course-score display areas 72a–72e. Specifically, the CPU 11 enters image data representative of the scores to the display list. Hereinafter unless otherwise described, the display process refers to as entry of image to the display list. At a step 102, the CPU 11 sums over the course-score to perform a display process to display a total score in a total-score display area 72. At a step 103, the CPU 11 makes a display process to display the number of usable prior object in a fuselage count display area 74.

Incidentally, a course display process or a high-score display process and the like, though not shown in FIG. 16, are carried out, besides the display processes at the step 101, the step 102 and the step 103. The course display process is to enter such image data as shown in the course display area 80 in FIG. 9 by the CPU 11.

At a step 104, the CPU 11 determines whether the start switch 47S is depressed or not. If the start switch 47S is not depressed, the process advances to a step 105. At the step 105, the CPU 11 determines whether the button switch 47A is depressed or not. If the button switch 47A is not depressed, an image processing and a sound processing to be performed on every frame is made. After a predetermined image is displayed on the display 30 and a sound is outputted, the process returns to the step 104. If the button switch 47 is depressed, the process proceeds to a step 110.

At the step 104, on the other hand, if the start switch 47S is depressed, the process proceeds to a step 106. At the step 106, the CPU 11 performs a display process for a course choosing window 75 as shown in FIG. 10. The course choosing window 75 displays with three items "ADVANCE COURSE", "CHANGE COURSE" and "RETRY COURSE" with, a cursor (designating means) movably displayed for designating which item is to be selected. Although the cursor is expressed by an arrow in FIG. 10, the color of the chosen items may be inverted or the designation of an item may be made by a picture pattern.

At a step 107, the CPU 11 performs a moving process for vertically moving the designating means. Specifically, the CPU 11 detects whether the joystick 45 is pulled toward this or pushed reverse. If pulled, the designating means is moved downward, while if pushed the designating means is moved upward. At a step 108, the CPU 11 determines whether the button switch 47A is depressed or not. If the button switch 47A is not depressed, the image process and sound process for every frame are performed. After displaying a predetermined image on the display 30 and a sound is outputted, the process returns to the step 107. If the button switch 47A is depressed, the process proceeds to a step 109. At the step 109, the CPU 11 determines which item the designating means chooses upon depression of the button switch 47A, to determine whether the chosen item is "ADVANCE COURSE" or not. If choice item is "ADVANCE COURSE", the process advances to a step 110.

At the step 110, the CPU 11 memorizes the data about the fellow object over all the courses into a fellow data memory area 158 of the RAM 15. The data of the fellow object is in a state of the fellow object in a course cleared immediately before. In the present invention, the fellow object is configured to leave from a war front if has undergone heavy damage during a battle. In case that the fellow object leaves from the war front, if the damage is heavy, it can not participate in a next course. If the damage is low, it can take part in the next course, this state of whether possible to participate to the next course or not is a fellow object state.

At a step 111, the CPU 11 performs an initial setting for the next course including, e.g. frame resetting, various parameter setting, writing various object data to be displayed into the RAM 15, etc. Ending the step 111, the process returns to the main routine to advance to a step 2.

On the other hand, at the step 109 if the choice item is not "ADVANCE COURSE", the process proceeds to a step 112. At the step 112, the CPU 11 determines whether the choice item is "CHANGE COURSE" or not. If "CHANGE COURSE" is selected, the process proceeds to a step 113. At the step 113, the CPU 11 makes a setting to select a different course from a course next to advance, as shown in FIG. 9. For example, the setting to advance from course 3 to course 4 is changed to a setting of forwarding from course 3 to course 7, or the like. The process then returns to the step 104.

Meanwhile, at the step 112, if the choice item is not "CHANGE COURSE", the process proceeds to a step 114. At the step 114, the CPU 11 subtracts 1 from the player object count memorized in the register area 159R of the RAM 15. At a step 115, the fellow object data is read out of the fellow data memory area 158 of the RAM. At a step 116, an initial setting is made for the course cleared immediately before. When the step 111 is ended, the process returns to the former routine to advance to the step 2.

Referring to FIG. 17, the operation of a subroutine for the mode shift process (the step 3 of the main routine) will be explained. If the player object reaches the mode shift point in FIG. 11, it is determined (or detected) at a step 121 that it exists at the all-range mode position, and at a step 123 it is determined whether a demonstration (hereinafter referred to as "DEMO") process in the all-range mode is ended or not. It is determined for the first time that the DEMO process is not ended, and an image process for DEMO display in all-range mode is performed at a step 124. A sound process is executed a step 125 for generating a DEMO sound in the all-range mode, and then the process proceeds to the aforesaid rendering process at the step 12.

On the other hand, if it is determined at the step 123 that the DEMO process is ended, a shift process to the all-range mode (changing a mode flag F2 to the all-range mode) is made at a step 126, and then the process returns to the main routine.

This provides an advantage that the scroll range can be shifted over without giving such a strange impression that the screen scroll direction is abruptly changed upon shifting from the one-direction scroll mode to the all-range mode. Also, the shift of the scroll range releases the burden from the CPU during the one-direction scroll period, as compared to the case that the scroll range is placed in the entire range over the entire course duration. It is also possible to give scroll display in a diversified way as compared to the one-direction scroll over the entire course period. Thus, a variety of image representations are possible for a game, providing an advantage of further enhancing player's interests.

Figure 18:
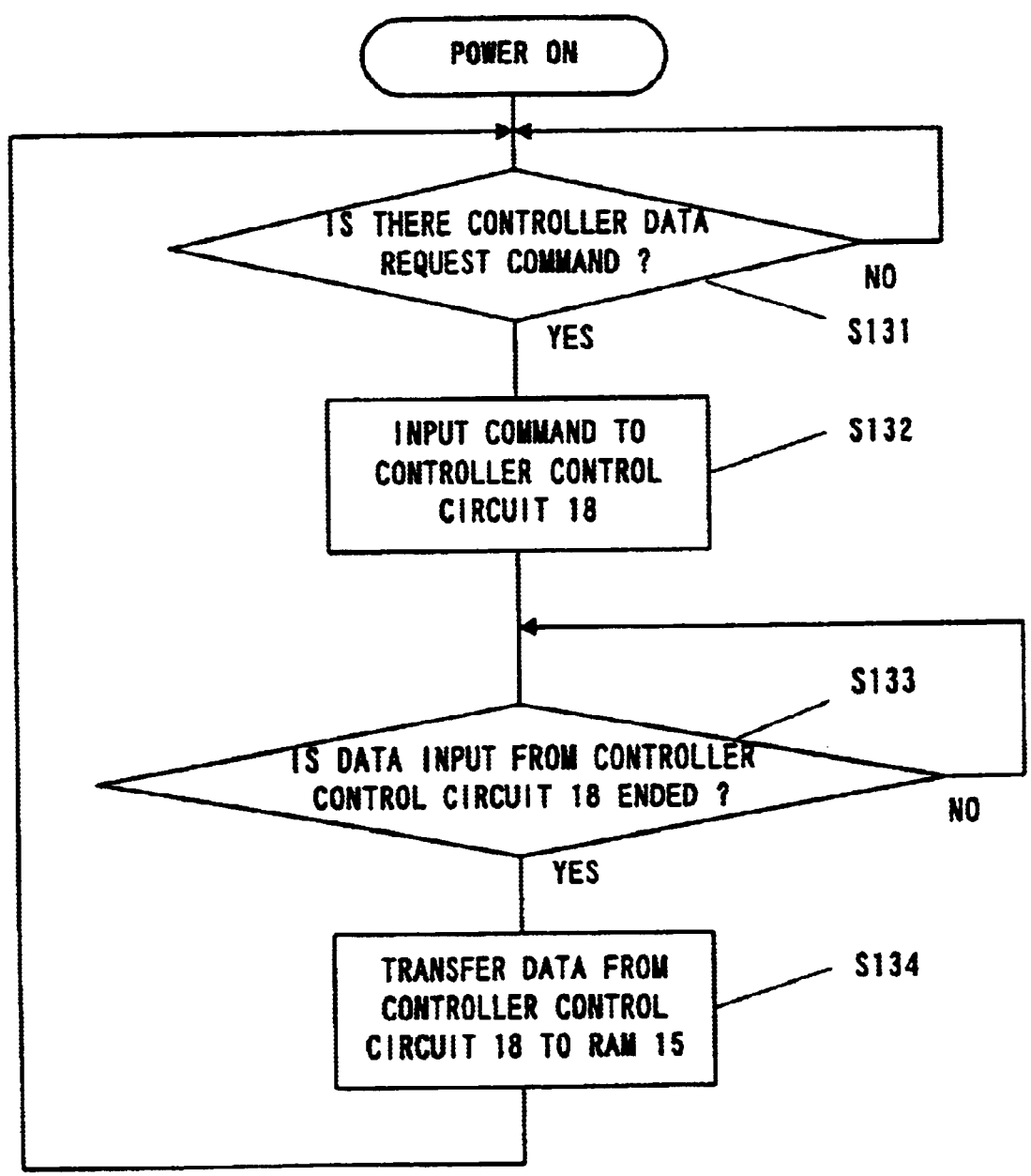
FIG. 18 is a flowchart for explaining data transfer between the controller control circuit 18 and the video game machine main body.

Referring to FIG. 18, explanations will be made on the operation of a subroutine for the controller process (step 4). It is determined at a step 131 whether there has been a read request command for the controller data or not. If nothing, a read request command waits, at the step 131, for its generation. If the presence of a read request command is determined, a command is supplied to the controller control circuit 18 at a step 132. In response thereto, the controller control circuit 18 performs a process of reading the operating state data on the controller 40A–40D. At a step 133 it is determined whether or not the reading of the operating state data by the controller control circuit 18 has been ended for all the controllers 40A–40D. If not ended, the ending is waited for. If ending is detected, the operating state data for each controller 40A–40D is written, at a step 134, into the memory area 156 in the RAM 15 via the bus control circuit 121 from the controller control circuit 18.

Referring to FIG. 19–FIG. 21, explanations will be made on the operation of a subroutine for the communication process (step 5) with the fellow. It is determined at a step 141a whether the player object has reached the site A or not. If not reaching the site A is determined, the process returns to the main routine after processing at steps 141b, 141c, 151a, 151b, 151c, 151d. Meanwhile, if the player object has reached the site A is determined at the step 141a, then it is determined at a step 142a whether a fellow 1 exists or not. If the first fellow exists, it is then determined at a step 143a whether a phrase or message is now under processing or not. If it is determined that a phrase is under processing, a corresponding flag among the phrase flags F31–F3n to the phrase is turned on, and comparison in priority order is made, at a step 144a, due to the necessity of selecting any one of a plurality of phrases. It is determined at a step 145a whether the priority order of a phrase 1 is higher than the phrase currently under processing at a step 145a. If higher, the process advances to a step 146a. At the step 146a a display process for the phrase 1 is carried out. For example, the phrase 1 is a message (get over with brake) from the first comrade to the player object so that it averts from attacks by an enemy appearing at the site A. A message is displayed to instruct the depression of the lower button (switch 47Cd) of the switch 47C as an operating way therefor. At a step 147a a process is made for outputting the phrase 1 in sound. Incidentally, if it is determined at the step 143a that no phrase is under processing, there is no necessity of judging on the preference order so that the process proceeds to the step 146a. If the absence of a first fellow is determined the step 142a or the phrase under process has a lower preference order than the phrase 1 is determined at the step 145a, the process returns to the main routine.

On the other hand, if it is determined that the player object exists at the position B instead of the position A, the operations at the steps 141b–147b are carried out. The steps 141b–147b are for outputting a phrase 2, which are similar to the operations for the steps 141a–147a. Accordingly, the corresponding step No. is represented followed by a symbol "b" in place of the symbol "a", omitting explanations in detail thereof.

Meanwhile, where the phrase output condition is dependent on time, e.g. where it depends on a time period A from finding the boss, the time period A is determined at a step 141c. When a second comrade is present near is determined at a step 142c, the operations of steps 143c–147c are executed. These steps 143c–147c are concerned with the operation that the second comrade sends a message (phrase 3 in FIG. 13) telling on how to overthrow the boss (assaulting way), the operations of which are the same as the operations of the steps 142a–147a except for the difference in fellow and phrase, and the detailed explanations are omitted.

In relation to the phrase output condition, a third fellow is kept an eye on by an enemy, the same is determined at a step 151a to thereby effect the operations of steps 152a–156a. The steps 152a–156a are for the operation to output a message (phrase 5 in FIG. 13) that a fellow teaches how to defeat the boss, and their operations are the same as the operations of the steps 142a–146a except for the difference in phrase.

When the phrase outputting condition is that the third fellow has been rescued, the same is determined at a step 151b to thereby carry out the operation of steps 152b–156b. The steps 152b–156b are the operation to generate a phrase 6 when the third fellow is rescued, and the operations are similar to the operations of the steps 152a–156a excepting the difference in phrase.

Meanwhile, where the phrase outputting condition is to output a phrase 8 by the player object that has been raided by an enemy, the same is determined at a step 151c to effect the operations of steps 152c–156c. If the phrase outputting condition is concerned with outputting a phrase 9 on which the boss is defeated, the same is determined at a step 151d to perform the operations of steps 152d–156d.

As stated above, a message (phrases 1–4 in the FIG. 13 example) is outputted in display or sound so that the player is assisted to perform appropriate manipulations. With an appropriate operating method of an advice, the game is easy to advance thereby providing the player with an achievement or satisfactory feeling even if the operating way is difficult. Thus, the scenes or courses are easy to clear over. If a proper message (phrases 5–9 in the FIG. 13 example) is outputted in display and/or sound in conformity to a scene or situation of the game, highly realistic expressions are available in the progress of the game, further enhancing amusement in the game.

Incidentally, the display or sound message generated for helping the player manipulate properly in conformity to a message or situation is not limited to the FIG. 13 embodiment, but can be appropriately modified depending upon the kind or content of a game. Thus, it is not limited to the description of the embodiment. For example, although the operating method on the switch was explained on the case that any one of a plurality of switches is depressed in order to simplify the explanation, it is also possible to determine so as to depress a same switch in plurality of times or depress a predetermined combination of a plurality of switches.

Referring to FIG. 22–FIG. 23, explanation will be made on the operation of a subroutine for the material replenishing process (step 6). Before the player object comes to a predetermined site or position where an item is available, it is determined at a step 161 that the player object has not entered the site. At a step 163, it is determined that a time period (T1) for displaying an item is not set (T1=0). It is determined at a step 170 that it is not under a condition of representing a mark (item box) representing of having a right to acquire an item. At a step 172 it is determined that no item is set, and then the process returns to the main routine. Thereafter, the process of the main routine is carried out on a frame period.

When the player object comes to a place where it can get an item, the same is determined at a step 161. At a step 162, a constant time period (T1) is set to a timer register, as a time period for which display is made for a mark of telling that it is under a condition that an item is obtainable. It is determined at a step 163 that the time period T1 is greater than 0. At a step 164 subtraction (T1−1) is made by a unit time (e.g. 1 second). At a step 165, display is made for a mark by which the player can request an item if he depresses an item display request switch (e.g. 47Cr). It is determined at a step 166 whether or not the item request switch is depressed. If no depression is determined, then steps 170, 172 are executed, and then the process returns to the main routine. The steps 161, 163–166, 170, 172 are repeated for each frame period, whereby the switch 47Cr is waited for being depressed within a predetermined time period.

During the repetition of the waiting operation as above, if it is determined at the step 166 that the display request switch is depressed, 0 is set (reset) to the timer register, and preparation is made at a step 168 for outputting a phrase representing that an item is requested by a fellow. This phrase is outputted at the steps 14 and 15 in image and sound. At a step 169, a process (item set process) is performed for displaying a mark (item box) showing of under a condition that an item is possible to obtain. At a step 170, it is determined at the condition that an item box can be displayed. At a step 171, a process is performed for displaying an item box. When it is determined at a step 172 that the display of the item box is being made, it is determined at a next step 173 whether or not the player performed an operation for obtaining the item box (e. g. operation of firing at the item box or operation of overlapping the player object over the item box, or the like). If it is determined that the item box has obtained, a process is made at steps 173–180 for supplying an item required depending upon a state of the player object. For example, if the player object is a fighter in a shoot game, it is determined at a step 174 whether the wing is in a predetermined state. If a predetermined wing does not exist, a wing is offered as a replenishing item at a step 175. If a predetermined wing exists, it is determined at a step 176 whether or not the life or a damage-withstanding amount is not greater than a constant value (128). If the not greater is determined, an item for restoring the life is provided at a step 177. If the life is greater than the constant value (128), it is determined at a step 178 whether or not there are two beam artilleries (twin beam). If an existence is determined, a twin beam is provided at a step 179. If the presence is determined, a bomb is offered for at a step 180.

In this manner, the item effective for advancing the game by the player is supplied depending upon the state of the player object so that the player is facilitated to continue the game to forward scenes or clearing over the course. Thus, the player easily obtains an achievement or satisfaction feeling in the game. Also, the player can play with a feeling as if he receives instructions while actually controlling a fighter or makes a flight while receiving assistance, with game interest raised. Incidentally, the supply item is different depending on the kind or content of the game so that the game software developer could make various modifications with reference to the technical idea described in this embodiment.

Referring to flowcharts in FIG. 32, FIG. 33, FIG. 36, FIG. 38, FIG. 39 and FIG. 42, a subroutine of processing the player object will be explained. First, at a step 301, the CPU 11 reads out the joystick data stored in the control pad data area, and correct the data. Specifically, the data for a central portion of the joystick is deleted so that the data is at "0" when the stick comes to a position at and around the center (e.g. 10 counts in radius). This enables the joystick data to accurately assume "0", even where there is an error due to manufacture of the joystick or when a player's finger delicately trembles. Also, correction is made for a predetermined range at an outer peripheral portion in a joystick operable range. Specifically, correction is made not to output an unwanted portion of data in playing a game.

At a step 302, the CPU 11 determines joystick data Xj, Yj to be used for a game. Since the data determined at the step 301 is a value of the counter 444, it is converted into a form easy to process in the game. Specifically, Xj becomes "0" when the stick is not tilted, "+60" when tilted maximally in an −X-axis direction (leftward), and "−60" when tilted maximally in an +X-axis direction (rightward). Yj becomes "0" when the stick is not tilted, "+60" when tilted maximally in a +Y-axis direction (frontward), and "−60" when tilted maximally in a −Y-axis direction (rearward).

At a step 303, the CPU 11 sets a basic speed As0 of the player object in a three-dimensional game space. As0 is a game space distance that the player object advances in 1 frame. This As0 can be freely set in accordance with a course or a scene being played. At a step 304, the CPU 11 reads out button-switch C1 data stored in the control pad area, to determine whether or not the player is depressing the button switch C1. This button switch C1 is used as a boost switch to raise an advancing speed of the player object in the game. When the button switch C1 is depressed, the player object, where it is e.g. an airplane, is image processed for intensifying jet ejection, intensifying a jet roar. If it is determined that the player is depressing the button switch C1, the process proceeds to a step 305. At the step 305, the CPU 11 processes to supply a vibration generating signal to the vibration generating circuit 53 of the controller. As a result, when the button switch C1 is being depressed, the controller vibrates. When the button switch C1 is not depressed, the vibration is stopped. The vibration of the controller during boost in this manner enhances a game realism feeling, attracting much more of the player's interest.

At a step 306, the CPU 11 makes a computation As=As0+Asα. As is a speed of the player object, while Asα is an increased speed of the player object during boost. This computation increases a moving distance in a three-dimensional position of the player object in a next frame. Then the process proceeds to a step 309.

On the other hand, if it is determined at the step 304 that the player is not depressing the button switch C1, the process proceeds to a step 307. At the step 307, the CPU 11 reads out the data about button switch 47Cd stored in the control pad data area, to determine whether the player depressed the button switch 47Cd or not. This button switch 47Cd is used as a brake switch to slow down the advancing speed of the player object in the game. When the button switch 47Cd is depressed, the player object, where it is e.g. an airplane, is image-processed such as for retro-firing, generating a retro-fire roar. If it is determined that the player is depressing the button switch 47Cd, the process proceeds to a step 308. At the step 308, the CPU 11 makes vibration processing similarly to the step 305.

At the step 309, the CPU 11 makes a computation As=As0−Asβ. As β is a decreased speed of the player object during applying a brake. This computation decreases the moving distance in three-dimensional positions of the player object in the next frame. The process then proceeds to a step 310.

Meanwhile, at the step 307, if it is determined that the player is not depressing the button switch 47Cd, the process proceeds to the step 310. At the step 310, the CPU 11 determines whether it is in the all-range mode or not. Specifically, the CPU 11 detects whether an all-range mode flag in the flag area 159f of the RAM 15 is on (set) or (reset). If the all-range mode flag is set, the current game mode is determined in the all range mode. If the all range mode flag is in a reset state, the current game mode is determined as the one-directional scroll mode. If the determination is not the all-range mode, the process proceeds to a step 320.

At the step 320, the CPU 11 operates on the following equations. Note that multiplication is denoted by "*" in the present specification.

$$\theta x1 = 0.68*Xj$$

$$\theta y1 = 0.68*Yj$$

$$Xs = -As*\sin \theta x1$$

$$Zs = -As*\cos \theta x1$$

$$Ys = -As*\sin \theta y1$$

Here, the meanings of θx1, θy1, Xs, Zs, Ys will be explained in detail with reference to FIG. 34. θx1 is an angle of an As directional vector of the player object 60 with respect to a −Z-axis direction on an XZ coordinate (a planer coordinate system of the player object 60 as viewed from above), and has a value increased in a + direction when the stick of the joystick is inclined leftward and increases in a − direction when tilted rightward. From the equations, the value θx1 increases and decreases from −40.8 (0.68θ*60) to 40.8 (0.68*(−60)) in proportion to an inclination of the stick. Since the player object 60 advances toward an As direction, it is changed of direction in a range of right and left in a range of −40.8 (0.68*60) to 40.8 (0.68*(−60)) degrees. For example, this direction is a fuselage nose direction where an airplane as in FIG. 35 is used as the player object 60. It may be a direction of a gun where a tank is used, while it may be a direction of a face where an animal is used.

θy1 is an angle of the As directional vector of the player object 60 with respect to a −Z-axis direction on a YZ coordinate (a planer coordinate system when the player object 60 is viewed in plan from the left toward the right), which has a value increasing in the + direction when the stick of the joystick is inclined frontward and decreases in the − direction when inclined rearward. From the equations, the value θx1 increases and decreases from −40.8 (0.68*60) to 40.8 (0.68*(−60)) in proportion to a inclination of the stick. Because the player object 60 advances toward the As direction, it is changed of direction vertically in a range from −40.8 (0.68*60) to 40.8 (0.68*(−60)) degrees.

Xs, Zs and Ys are respectively an X-axis component, a Y-axis component and a Z-axis component of As.

At a step 321, the CPU 11 determines whether there exists a left portion of the player object 60 or not. Since in this embodiment an airplane is used as one example of the player object for explanation, the presence or absence of a left wing is determined. Note that, where a tank is used as the player object, it is a caterpillar instead of the wing. If an animal is used, it will be a limb. If it is determined that the left portion of the player object 60 is present, the process proceeds to a step 322. At the step 322, the CPU 11 determines whether or not there exists a right portion of the player object 60 or not. If it is determined that the right portion of the player object 60 is present, the process proceeds to a step 323.

At the step 323, the CPU 11 operates on the following equations.

$$Xa = Xa + Xs$$

$$Ya = Ya + Ys$$

$$Za = Za + Zs$$

This computation adds a speed (Xs, Ys, Zs) of the player object 60 to the coordinate (Xa, Ya, Za) (on the right side of the above equations) on the preceding frame. Thus a coordinate (Xa, Ya, Za) (left side of the above equations) for a succeeding frame is determined. The process then proceeds to a step 330 in FIG. 36.

On the other hand, when it is determined at the step 321 that there is no left portion of the player object 60, the process proceeds to a step 324. The CPU 11 operates at the step 324 on the following equations.

$$Xs=Xs-2.5$$

$$Ys=Ys-2.5$$

This computation reduces the speed in the X-axis direction and the speed in the Y-axis direction. Therefore, the player object 60 when advancing the game is displayed as if it was pulled in a left downward direction. For example, even when the joystick is not tilted, the player object 60 is displayed as if it gradually moves toward the left downward as viewed facing the screen.

Meanwhile, if it is determined at the step 322 that the player object 60 has no right portion, the process proceeds to a step 325. At the step 325, the CPU 11 operates on the following equations.

$$Xs=Xs+2.5$$

$$Ys=Ys-2.5$$

This computation increases the speed in the X-axis direction, but decreases the speed in the Y-axis direction. Accordingly, the player object 60 when advancing the game is displayed as if it was pulled in a right downward direction as viewed facing the screen. For example, even where the stick is not inclined, the player object 60 is displayed in a manner gradually moving toward the right downward direction. Then the process proceeds to the step 323.

On the other hand, if it is determined at the step 310 that the CPU 11 is not in the all-range mode, the process proceeds to a step 330.

First stated is the difference between the one-directional scroll mode and the all range mode. The one-directional scroll mode has one coordinate system as shown in FIG. 34, while the all-range mode has two coordinate systems as shown in FIG. 37. Explaining in detail on the respective coordinate systems for the all-range mode, an X1 direction (−Zi) coordinate of FIG. 37 is a coordinate for representing a three-dimensional space where a variety of objects exists, which is always provided in a fixed manner during playing a game. (In this embodiment, this coordinate is referred to as a "game space coordinate".) An X2 (−Z2) coordinate is a coordinate varied based on movement of the player object. Since the −Z2-axis direction corresponds to a camera photographing direction as explained later for camera processing, the Z2-axis represents a direction perpendicular to the display screen. (In the present embodiment, it is referred to as a "player coordinate".) The player object 60, in this player ordinate, performs an operation generally similar to that in the one-directional scroll mode. The use of the two coordinate systems in this manner makes it possible to architect an all-range mode system that can scroll in every direction while using a one-directional scroll mode system. Therefore, even when the mode is changed, the operating manner is almost unchanged. Therefore the player can easily to enjoy a game.

At a step 330, the CPU 11 operates on the following equations.

$$\theta x1=0.68*Xj$$

$$\theta y1=0.68*Yj$$

$$\theta x2=0.03*\theta x1+\theta x2 \ (0.03*\theta x1 \ increased \ per \ 1 \ frame)$$

$$Xs=-As*\sin(\theta x1+\theta x2)$$

$$Zs=-As*\cos(\theta x1+\theta x2)$$

$$Ys=-As*\sin \theta y1$$

With reference to FIG. 37, explanations will be made on $\theta x1$, $\theta y1$, $\theta x2$, Xs, Zs and Ys. $\theta x1$ is an angle of the As directional vector of the player object 60 with respect to the −Z2-axis direction on an XZ coordinate (a player ordinate system as the player object 60 is viewed in plan from the above), and has a value that increases in the + direction when the stick of the joystick is inclined leftward and decreases in the step when tilted rightward.

$\theta y1$ is an angle of the As directional vector of the player object with respect to the −Z2-axis direction on a YZ coordinate (a player coordinate system as the player object 60 is viewed in plan from the left toward the right), and has a value that increases in the + direction when the stick of the joystick is tilted forward and decreases in the − direction when tilted rearward.

$\theta x2$ is an angle between the −Zi-axis direction and the −Z2-axis direction of the player object 60 on an XZ coordinate (a player coordinate system as the player object 60 is viewed in plan from the above), and has a value that increases and decreases in proportion to $\theta x1$ on each frame. That is, it increases in the + direction when the stick of the joystick is inclined leftward and increases in the − direction when inclined rightward. From the equations, the value $\theta x2$ varies in proportion to the inclination of the stick, and increases and decreases in a range of from −224 (=0.03*0.68*(−60)) to 1.224 (=0.03*0.68*60) on each 1 frame.

Xs, Zs and Ys are respectively an X-axis component, a Y-axis component and a Z-axis component of As in the game space coordinate.

At a step 332, the CPU 11 determines whether or not there exists a left portion of the player object 60. If the left portion of the player object 60 is determined present, the process proceeds to a step 333.

At the step 333, the CPU 11 determines whether a right portion of the player object 60 is present or not. If the right portion of the player object 60 is determined present, the process proceeds to a step 334. At the step 334, the CPU 11 operates on the following equations similarly to the step 323.

$$Xa=Xa+Xs$$

$$Ya=Ya+Ys$$

$$Za=Za+Zs$$

This computation adds a speed (Xs, Ys, Zs) of the player object 60 in the game space coordinate system to the game space coordinate (Xa, Ya, Za) on the preceding frame, thereby determining a game space coordinate (Xa, Ya, Za) on the succeeding frame. The process then proceeds to a step 350 in FIG. 38.

On the other hand, if it is determined at the step 332 that the left portion of the player object 60 is not present, the process proceeds to a step 335. The CPU 11 operates at the step 335 on the following equations.

$$Xs=Xs-2.5*\cos \theta x2$$

$$Zs=Zs-2.5*\sin \theta x2$$

$$Ys=Ys-2.5$$

This computation decreases the speed in the X-axis direction and the speed in the Y-axis direction in the player space.

Accordingly, the player object 60, when advancing the game, is displayed as if it was pulled in the left downward direction as viewed facing to the screen. For example, even when the stick is not inclined, the player object 60 is displayed gradually moving toward the left downward direction as viewed facing to the screen.

Then if it is determined at the step 333 that the right portions of the player object 60 is absent, the process proceeds to a step 336. At the step 336, the CPU 11 operates on the following equations.

$$Xs = Xs + 2.5 * \cos \theta x2$$

$$Zs = Zs - 2.5 * \sin \theta x2$$

$$Ys = Ys - 2.5$$

This computation increases the speed in the X-axis direction and decreases the speed in the Y-axis direction in the player space. Accordingly, the player object 60, when advancing the game, is displayed as if it was pulled in the right downward direction as viewed facing to the screen. For example, even where the stick is not inclined, the player object 60 is displayed gradually moving toward the right downward direction. The process then proceeds to the step 334.

Incidentally, although it was described in the figure for simplification such that the angle in the controller is directly reflected on the player object for each frame, more specifically a filtering process is performed during deducing θx1 from 0.68*Xj. Similarly, filtering processing is done during reducing θy1 from 0.68*Yj. Explaining this filtering process in detail, the CPU 11 causes the θx1 value to gradually approximate to 0.68*Xj over on a plurality of frames so as to obtain θx1=0.68*Xj at a time that the frames have been processed, without making the value 0.68*Xj immediately become θx1 on one 1 frame. For example, 0.68*Xj is divided by Nf (predetermined natural number) and 0.68*Xj/Nf is added to θx1 during an Nf frame period, to thereby obtain θx1=0.68*Xj. The filtering processing for reducing θy1 from 0.68*Yj is similar to the filtering process of deriving θx1 from 0.68*Xj. By this filtering process, it is possible to prevent the player object 60 from terribly moving due to abrupt operation of the joystick and horribly varying the scenes that impose burdens on player's eye or make control difficult.

At a step 350, the CPU 11 performs a hit determination for the player object 60. The detail on this hit determination will be explained by using steps 351–354. The steps 351–354 are a normal hit determination. The hit determinations on the fellow objects, stated later, are similar thereto.

Figure 39:
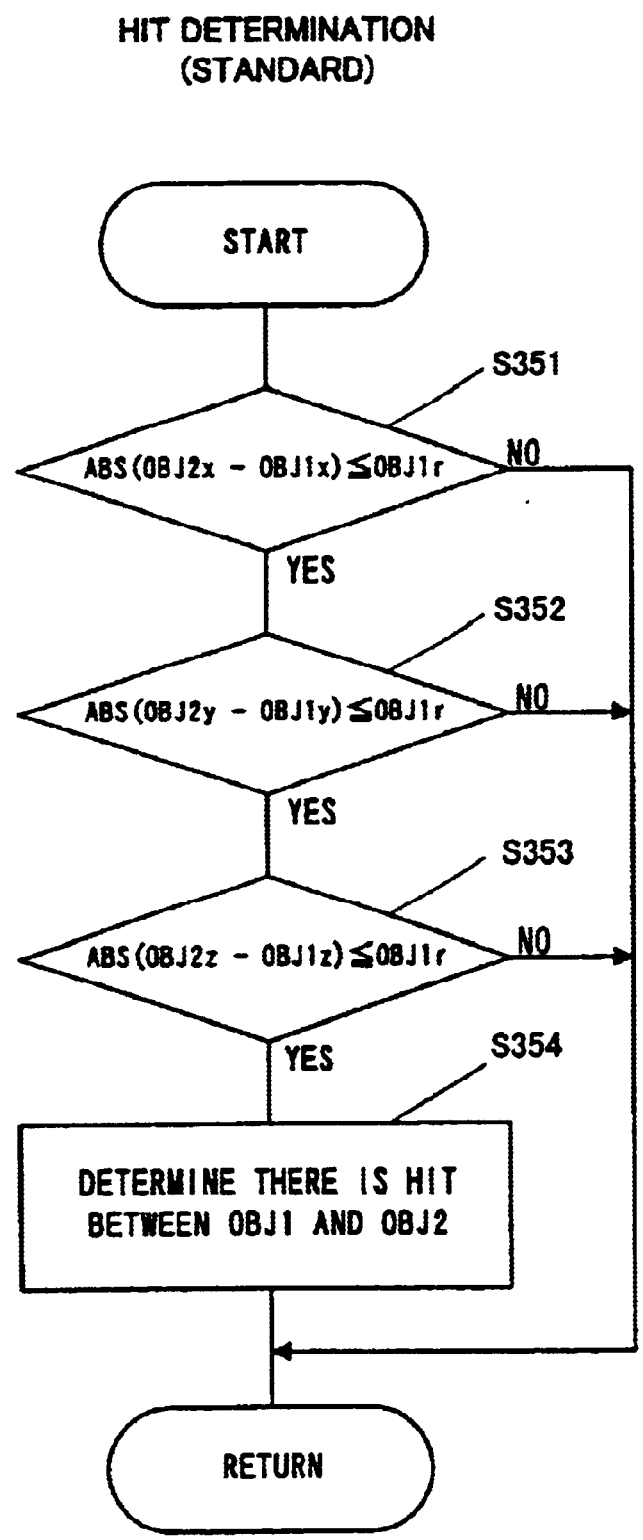
FIG. 39 is a subroutine flowchart of a hit determination process.

At a step 351 in FIG. 39, the CPU 11 determines whether ABS (OBJ2x−OBJ1x)≦OBJ1r or not. OBJ1 is an object to be determined of hit, and refers in this embodiment to the player object 60. OBJ2 is an object coming toward OBJ1, and refers in this embodiment to an attacking object, such as a fellow object, an enemy object, a stationary object, a laser object launched by an enemy object. OBJ1x is an X coordinate value of OBJ1, while OBJ2x is an X-coordinate value of OBJ2. OBJ1x and OBJ2x may be on a game space coordinate or a player coordinate, provided that they are X-coordinate values on a common coordinate system. ABS ( ) denotes an absolute value of a numeral given within 0. OBJ1r is a value representing a half length of one side of a cube where OBJ1 is considered as a cube. In other words, OBJ1r is a value representative of a hit-determination range of OBJ1. If ABS (OBJ2x−OBJ1x)≦OBJ1r stands, the progress proceeds to a step 302.

At the step 352, the CPU 11 determines whether ABS (OBJ2y−OBJ1y)≦OBJ1r or not. OBJ1y is a Y coordinate value of OBJ1, while OBJ2y is a Y coordinate value of OBJ2. OBJ1y and OBJ2y may be on a game space ordinate or a player coordinate, provided that they have Y coordinate values on a common coordinate system. If ABS (OBJ2y−OBJ1Y)≦OBJ1r stands, the process proceeds to a step 353. At the step 353, the CPU 11 determines whether or not ABS (OBJ2z−OBJ1z)≦OBJ1r stands. OBJ1z is a Z-coordinate value of OBJ1, and OBJ2z is a Z-coordinate value of OBJ2. OBJ1z and OBJ2z may be on a game space ordinate or on a player coordinate, provided that they have Z-axis coordinate values on a common coordinate system. If ABS (OBJ2z−OBJ1z)≦mOBJ1r stands, the process proceeds to a step 354.

At the step 354, the CPU 11 determines OBJ2 and OBJ1 are hit on, and sets a hit-determination flag in the flag area 159F of the RAM 15. The player object 60 in this embodiment is constituted by three objects, a main body object 61 (hereinafter, main body 61), a left wing object 60L and a right wing object 60R. The respective object can be displayed on the display 30 by entry to a display list. Also, the player object 60, as shown in FIG. 35, has totally 4 determination points located at an upper portion of the main body 61, a lower portion of the main body 61, a portion of a left wing 62 close to the main body, and a portion of left wing 63 close to the main body so that they respectively have 1 point. These respective points are subjected to hit determination in the steps 351–354, to determine whether a hit-determination flag should be set for each point or not. The process then returns to the former routine.

Meanwhile, if the determination at the step 351 is not ABS (OBJ2x−OBJ1x)≦OBJ1r, the process returns to the former routine.

On the other hand, if the determination at the step 352 is not ABS (OBJ2y−OBJ1y)≦OBJ1r, the process returns to the former routine.

On the other hand, if the determination at the step 353 is not ABS (OBJ2z−OBJ1z)≦mOBJ1r, the process returns to the former routine.

On the other hand, if the step 350 is ended, the process proceeds to a step 360.

At a step 360, the CPU 11 determines whether the player object 60 is hit at the lower portion of the main body 61 by another object or not. Specifically, the CPU 11 detects whether or not a hit-determination flag is set at the flag area 159F of the RAM 15. If the lower portion of the main body 61 is hit by another object, the process proceeds to a step 361. The CPU 11 operates at the step 361 on the following equation.

$$R1 = R1 - 40$$

R1 represents a magnitude of damage to which the main body 61 withstands, and has an initial value 255 in this embodiment. When the lower portion of the main body 61 suffers a damage, R1 is subtracted by 40. For example, the suffering damages of 7 times gives R1<0.

At a step 362, the CPU 11 operates on the following equation.

$$R2 \text{ (or } R3) = R2 \text{ (or } R3) - 15$$

R2 represents a magnitude of damage to which the left wing 62 can withstand, and has an initial value 60 in this embodiment. Similarly, R3 denotes a magnitude of damage to which the right wing 63 can withstand, and has an initial value 60. At this step, the left and right are chosen at random so as to provide a greater damage to a chosen wing. When the left wing 62 or the right wing 63 suffers a damage, R2 or R3 is subtracted by 15. For example, the damages of 4 times gives R2 (or R3)=0.

At a step 363, the CPU 11 determines whether or not the upper portion of the main body 61 of the player object 60 is hit by another object. If the upper portion of the main body 61 is hit by another object, the process proceeds to a step 364.

The CPU 11 determines at the step 364 whether R1≦0 or not. In other words, it is determined whether or not the damage to the player object 60 is in an extent that the play is possible to continue. If not R1≦0, the process proceeds to a step 365.

At the step 365, the CPU 11 enters the main body 61 to the display list. The main body 61 is an object constituting a center portion of the player object 60.

At a step 366, the CPU 11 determines whether R2 and R3≦0 or not. In other words, it is determined whether or not the damage to the left wing 62 is in an extent that the left wing is sustainable and the damage to the right wing 63 in an extent that the right wing be sustainable. If not R2 and R3<0, the process proceeds to a step 367.

At the step 367, the CPU 11 determines whether R2≦0 or not. In other words, it is determined whether or not the damage to the left wing 62 is in an extent that the left wing is sustainable. If not R2≦0, the process proceeds to a step 368.

At the step 368, the CPU 11 determines whether R3≦0 or not. In other words, it is determined whether the damage to the right wing 62 is in an extent to sustain the right wing. If not R3≦0, the process proceeds to a step 369.

At the step 369, the CPU 11 enters a complete left wing object 60L and a complete left wing object 60L to the display list. With this registration, the display 30 can display a player object 60 as shown in FIG. 35. The process then returns to the former routine to proceed to a step 8.

Figure 40:
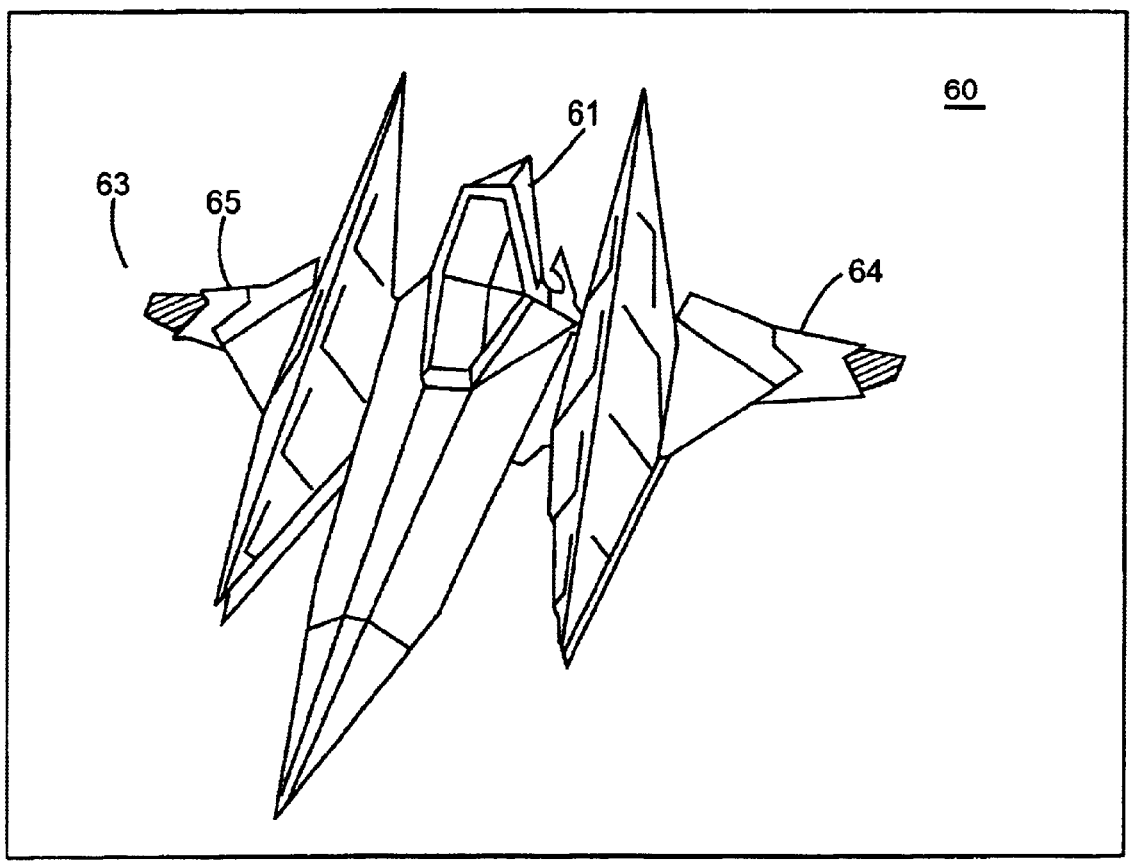
FIG. 40 is an external view of the player object 60 losing a part of both wings.

On the other hand, if R2 and R3≦0 at the step 366, the process proceeds to a step 370. At the step 370, the CPU 11 enters a left wing object 60L having no left wing 62 and a right wing object 60R having no right wing 63 to the display list. With this entry, the display 30 displays a player object 60 losing the left wing 62 and the right wing 63 as parts of the left wing and the right wing, as shown in FIG. 40. The process then returns to the former routine to proceed to the step 8.

Figure 41:
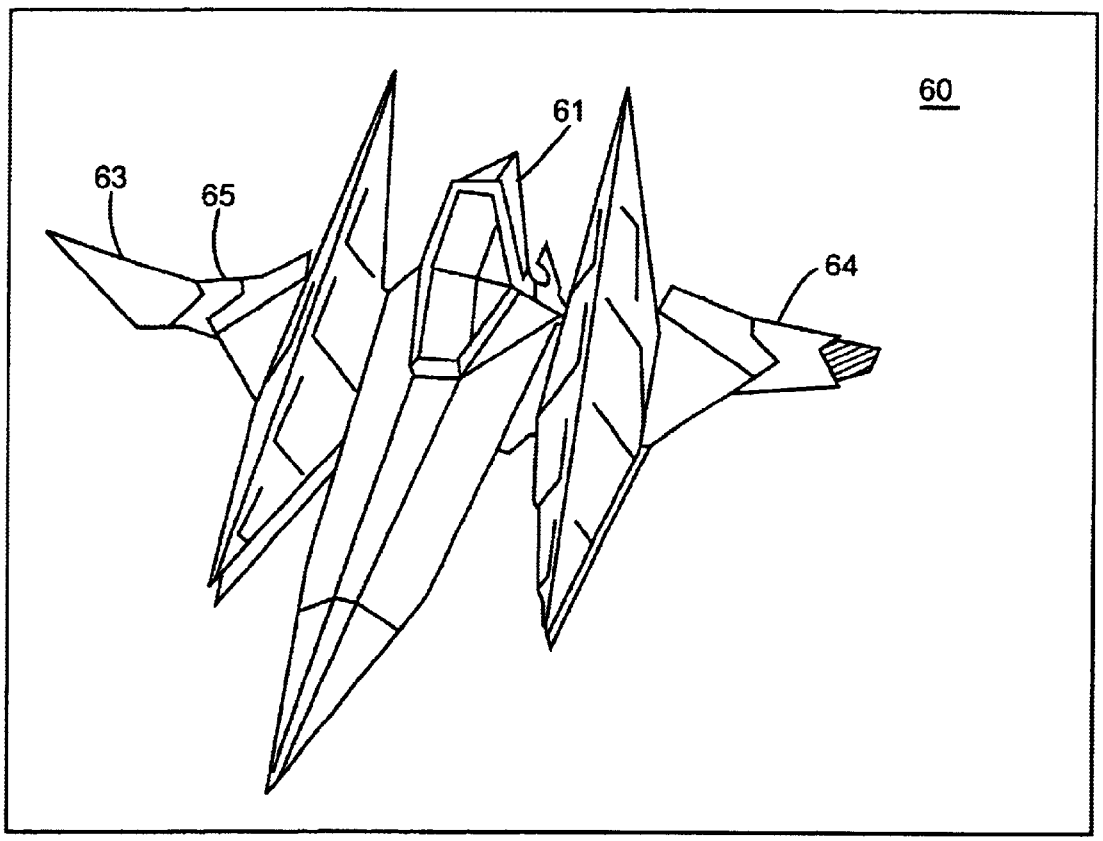
FIG. 41 is an external view of the player object 60 losing a part of a left wing.
Figure 42:
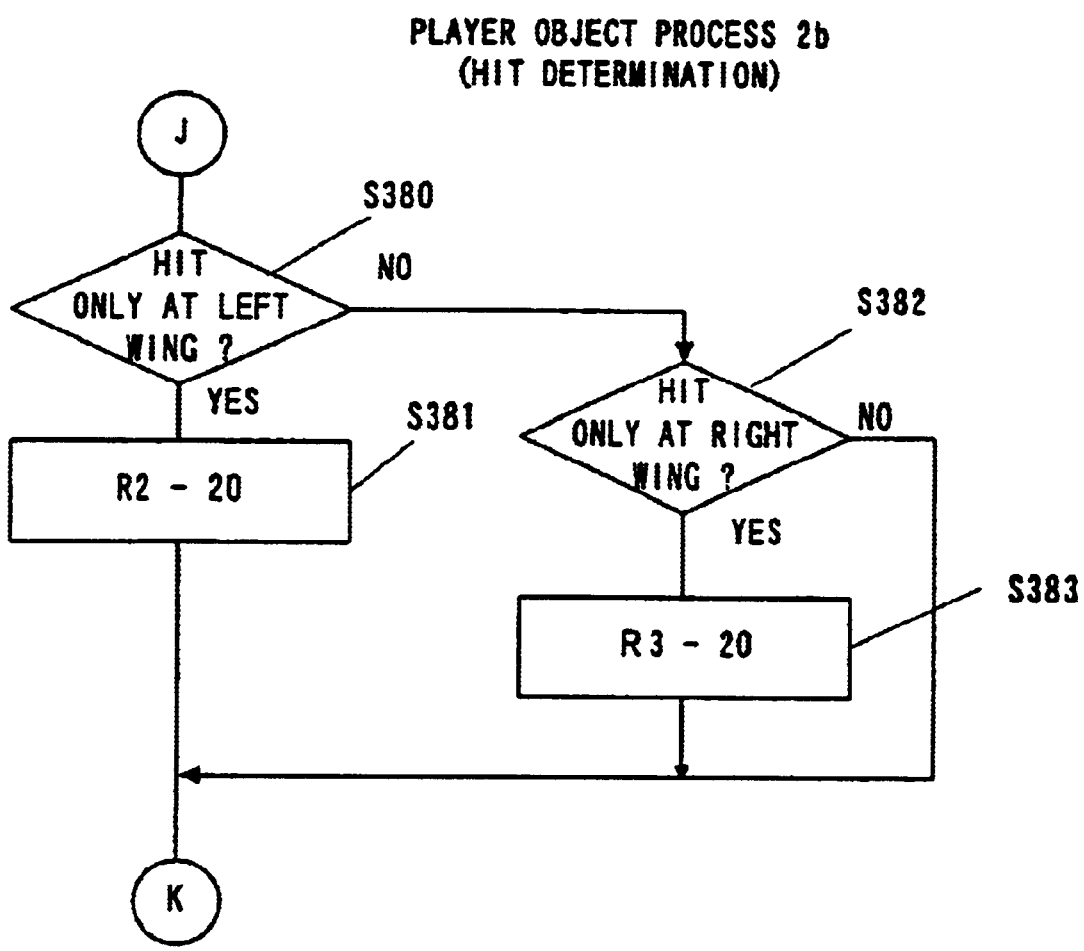
FIG. 42 is a subroutine flowchart of the player object process.

Meanwhile, if R2≦0 at the step 367, the process proceeds to a step 371. At the step 371, the CPU 11 registers a left wing object 60L losing left wing 62 and a complete right wing object 60R to the display list. This registration causes the display 30 to display a player object 60 losing the left wing 62 as a part of the left wing but having the normal right wing, as shown in FIG. 41. The process then returns to the former routine to proceed to the step 8.

On the other hand, if R3≦0 at the step 368, the step proceeds to the step 372. At the step 372, the CPU 11 enters a right wing object 60R losing a right wing 63 and a complete left wing object 60L to the display list. This entry causes the display 30 to display a player object 60 losing the right wing 63 as a part of the right wing but having the normal left wing, conversely to the player object 60 in FIG. 41. The process then returns to the former routine to proceed to the step 8.

On the other hand, if R1≦0 at the step 364, the process proceeds to a step 373. At the step 373, the CPU 11 executes a detonation process for the player object 60. In executing the detonation process, other processes are skipped over a plurality of frames to display a scene exploding the player object 60 on the display 30. Thereafter, the value of the register area 159 in the RAM 15 is subtracted by 1, and the process proceeds to a step 17. If not in a game over, the game is resumed from a predetermined position in the game space.

Meanwhile, if the upper portion of the main body 61 is not hit by another object at the step 363, the process proceeds to a step 374.

At the step 374, the CPU 11 performs a process to move the player object 60 toward the upward over a plurality of frames. This process enables a representation of as if the lower portion of the player object 60 comes to collision with another object and is bumped off. The process then advances to the step 364.

On the other hand, if at the step 360 the lower portion of the main body 61 is not hit by another object, the process proceeds to a step 370.

At the step 375, the CPU 11 determines whether or not the upper portion of the main body 61 of the player object 60 is hit by another object or not. If the upper portion of the main body 61 is hit by another object, the process proceeds to a step 376. At the step 376, the CPU 11 operates on the following equation.

$$R1=R1-40$$

At a step 377, the CPU 11 operates on the following equation.

$$R2 \text{ (or } R3)=R2 \text{ (or } R3)-15$$

At a step 378, the CPU 11 processes to move the player object 60 downward over a plurality of frames. This process enables a representation as if the upper portion of the player object 60 collides with another object and is bumped off. Then the process proceeds to the step 364.

On the other hand, if another object does not hit against the upper portion of the main body 61 at the step 375, the process proceeds to a step 380. At the step 380, the CPU 11 determines whether or not the main body 61 and the right wing object 60R of the player object 60 are not hit by another object but the left wing object 60L only is hit by another object. If the left wing object 60L only is hit by another object, the process proceeds to a step 381. At the step 381, the CPU 11 operates on the following equation.

$$R2=R2-20$$

Then the process advances to a step 365.

On the other hand, if the left wing object 60L only is not hit by another object at the step 380, the process proceeds to a step 382. At the step 382, the CPU 11 determines whether or not the main body 61 and the left wing object 60L of the player object 60 are not hit by another object but the right wing object 60L only is hit by another object. If the right wing object 60R only is hit by another object, the process advances to a step 383.

At the step 383, the CPU 11 operates on the following equation.

$$R3=R3-20$$

The process then proceeds to a step 365.

Meanwhile, if at the step 382 the right wing object 60R only is not hit by another object, the process proceeds to the step 365.

Figure 33:
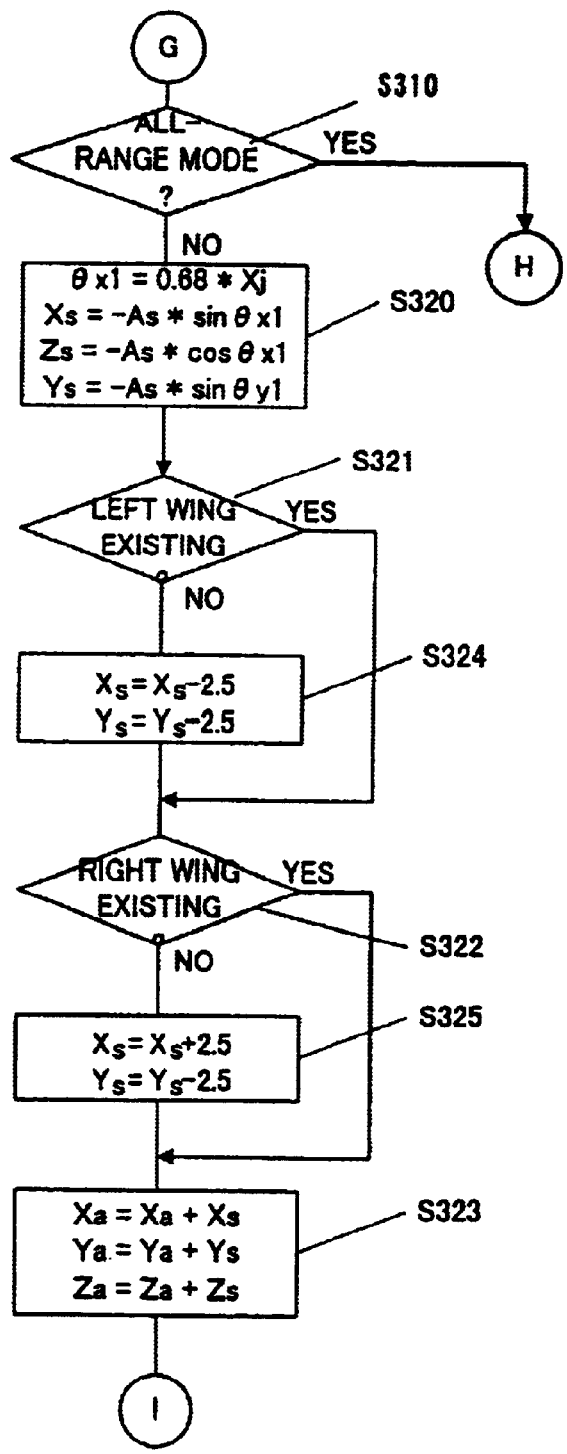
FIG. 33 is a subroutine flowchart of a player object process.
Figure 36:
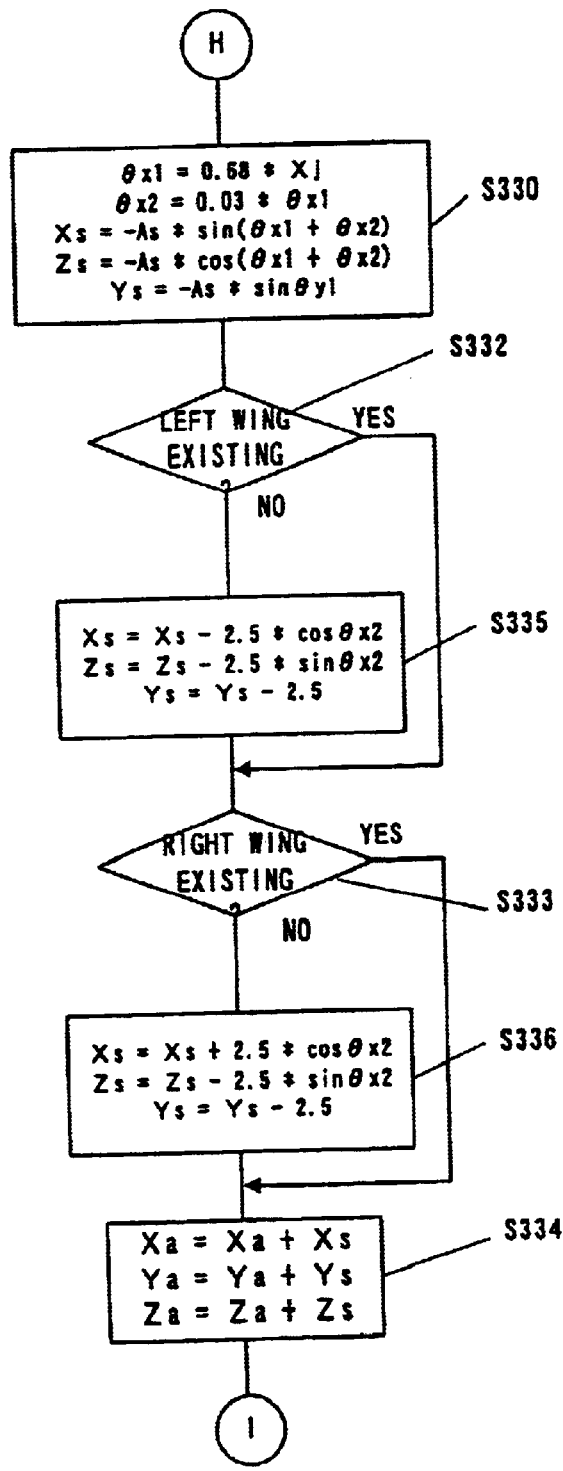
FIG. 36 is a subroutine flowchart of a player object process.
Figure 38:
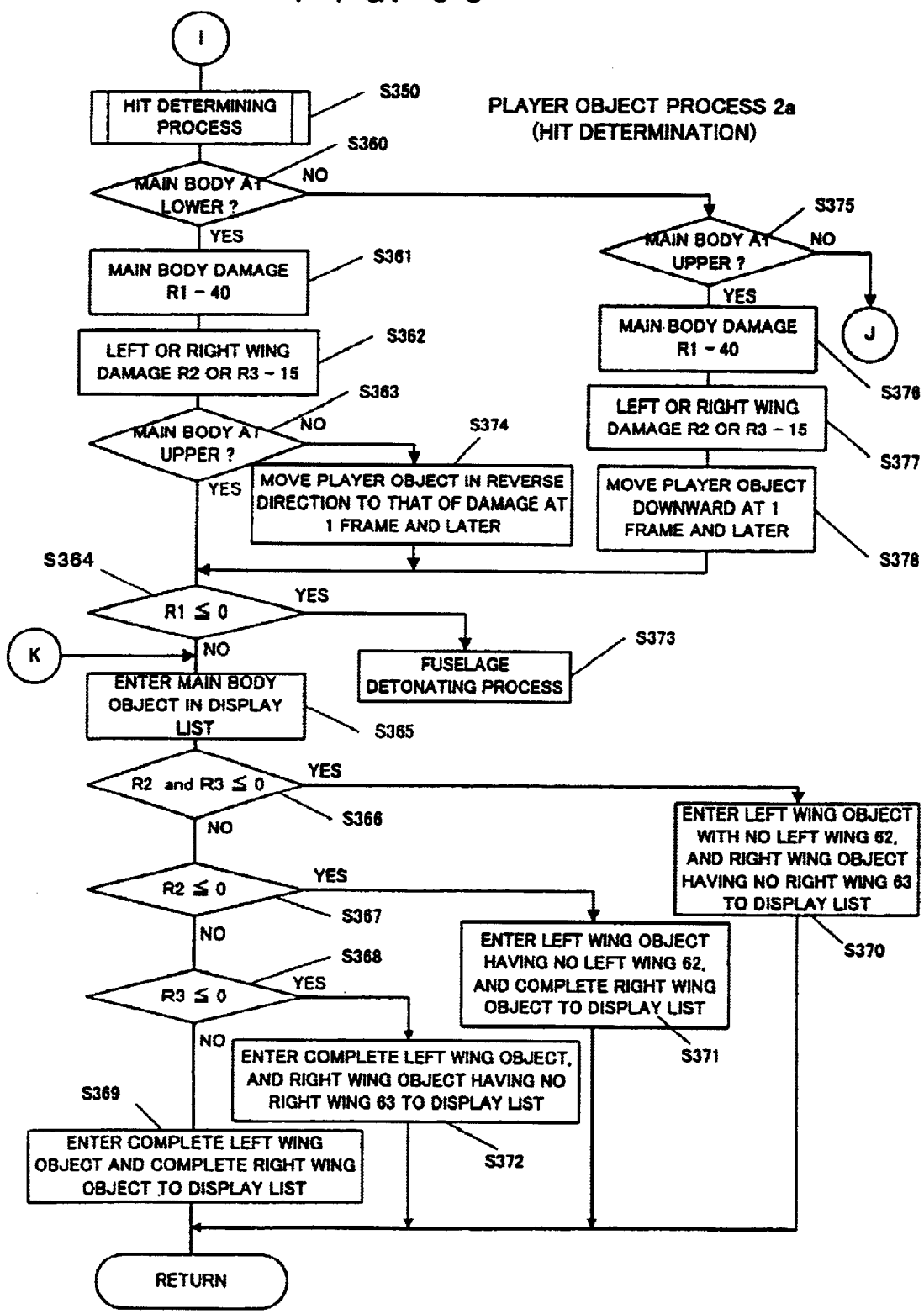
FIG. 38 is a subroutine flowchart of the player object process.
Figure 43:
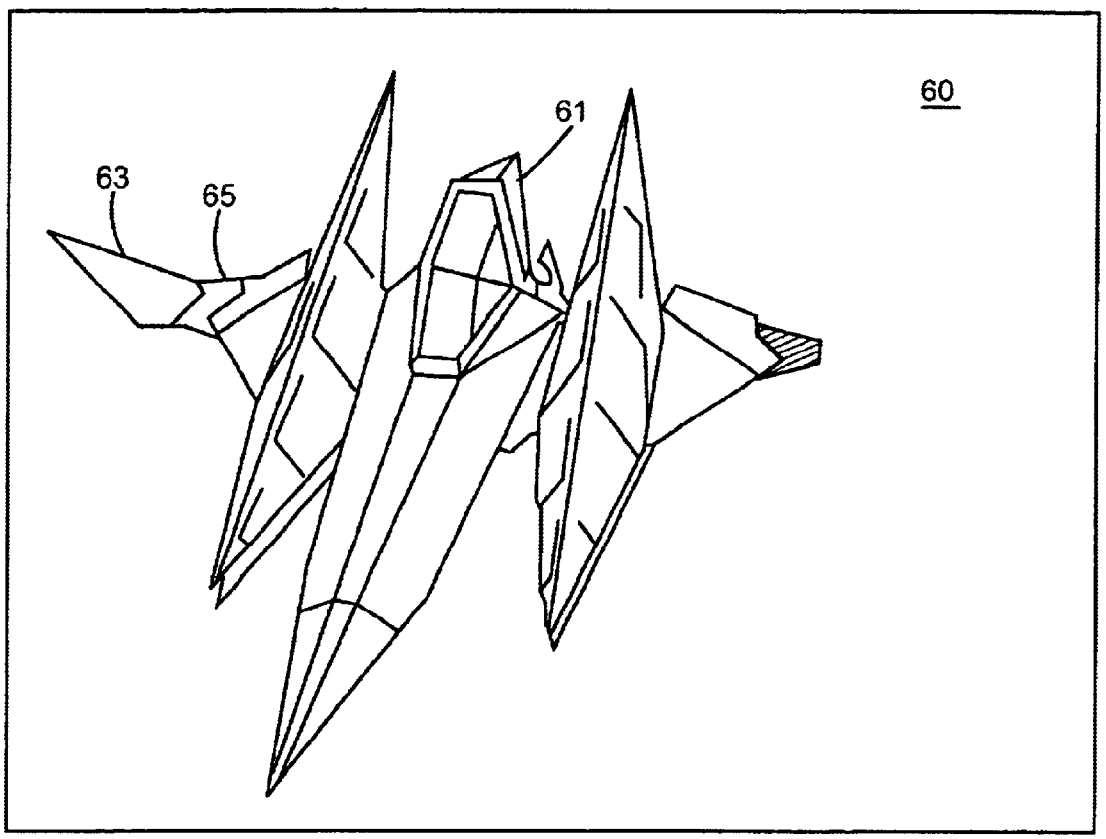
FIG. 43 is an external view of the player object 60 losing greater part of the left wing.

Now, explanations will be made on another embodiment for processing the player object. This embodiment is an example having a left wing object 60L and a right wing 60R each constituted by three portions instead of two portions. Specifically, the left wing and the right wing are each formed by three portions so that they can be displayed on the display 30 as if they were broken and lost from an outer portion by a damage. As shown in FIG. 35, the left wing object 60L and the right wing object 60R respectively include a left wing 62 and left wing 64, and right wing 63 and right wing 65. For example, image display is made on the display 30 such that the left wing object 60L, when suffering a little damage e.g. $0 \leq R2 \leq 30$, loses the left wing 62 as shown in FIG. 41, and loses the left wing 64 as shown in FIG. 43 when suffering a more serious damage (e. g. $R2 \leq 0$). This process is similarly performed for the right wing 63 and the right wing 65.

Where executing the steps 321–325 in FIG. 33 and the steps 332–336 in FIG. 36, the player object 60 can be controlled of movement in a diversified manner by providing two stages of movement control to the respective left and right of the player object 60 depending on a state of the left wing object 60L and the right wing object 60R, Accordingly, a further realism feeling or achievement feeling on the game is offered to the player.

Figure 44:
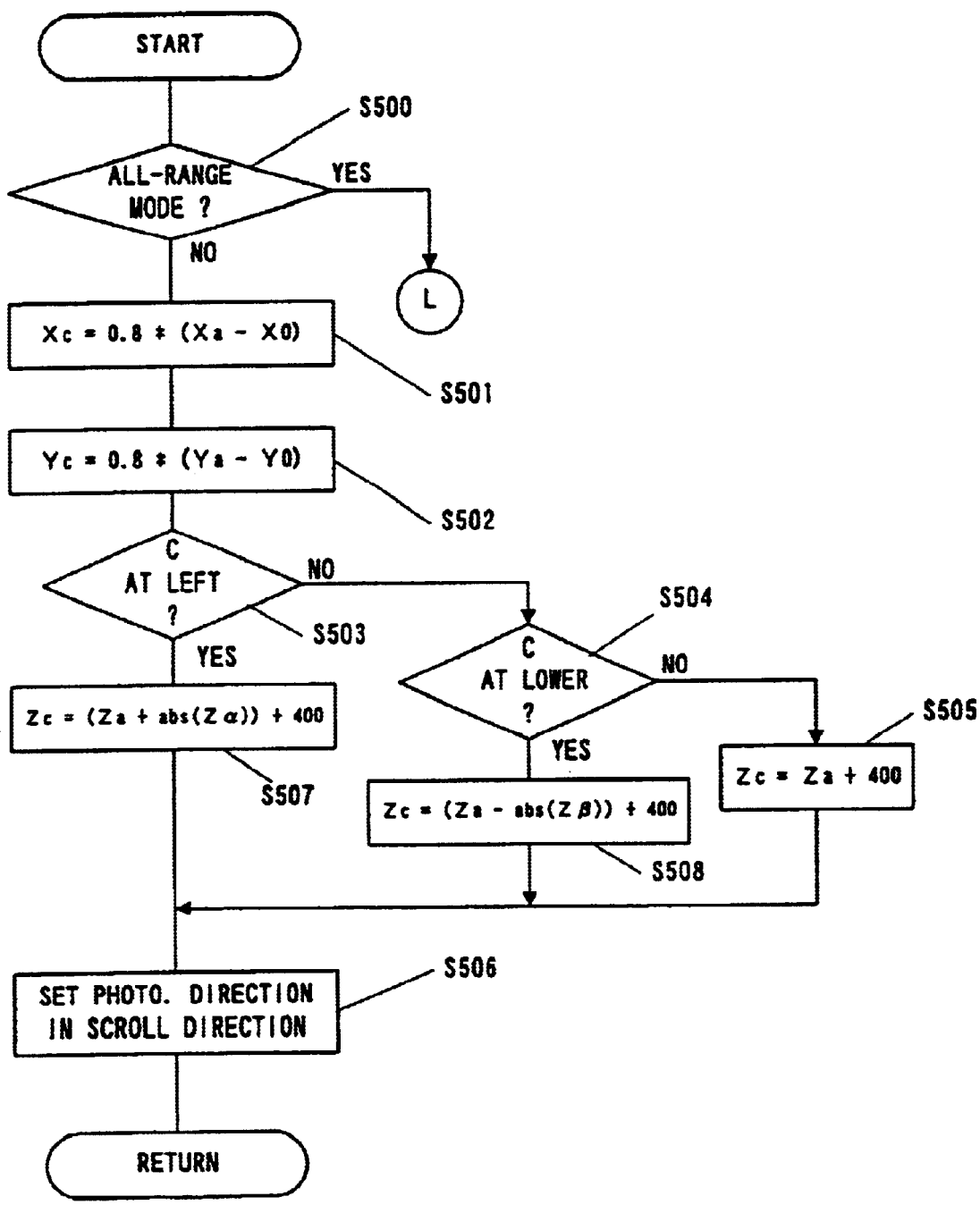
FIG. 44 is a subroutine flowchart of a camera process.
Figure 45:
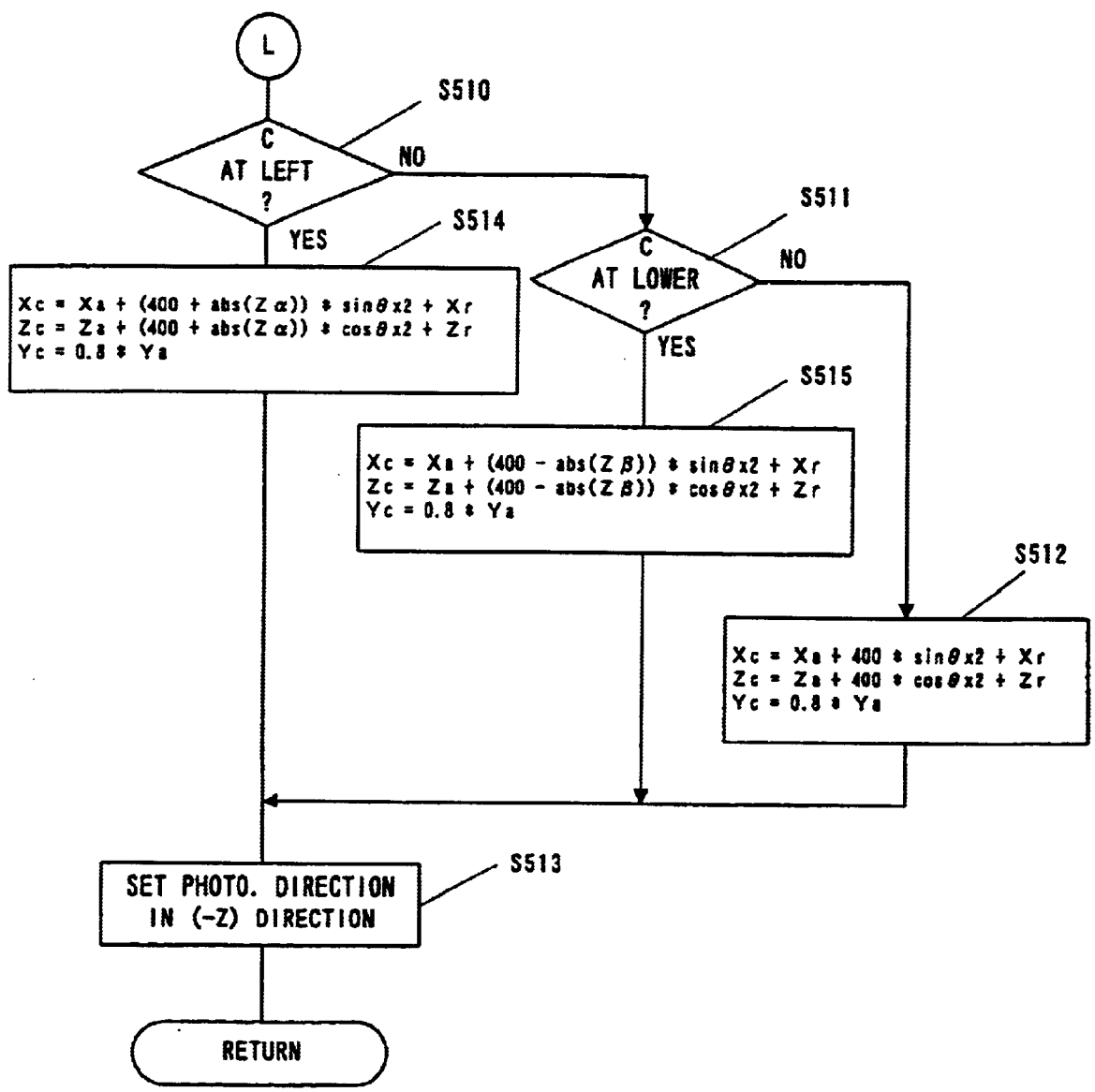
FIG. 45 is a subroutine flowchart of the camera process.

Now, detailed explanation will be made on FIG. 44 and FIG. 45 illustrating subroutine flowcharts of the step 8 of FIG. 15. At a step 500, the CPU 11 determines whether or not the all-range mode flag in the flag area 159F of RAM 15 is set. If the all-range mode flag in the flag area 159F is not set, the process proceeds to a step 501. At the step 501, the CPU 11 operates on the following equation.

$$Xc=(Xa-XO)*0.8$$

Figure 34:
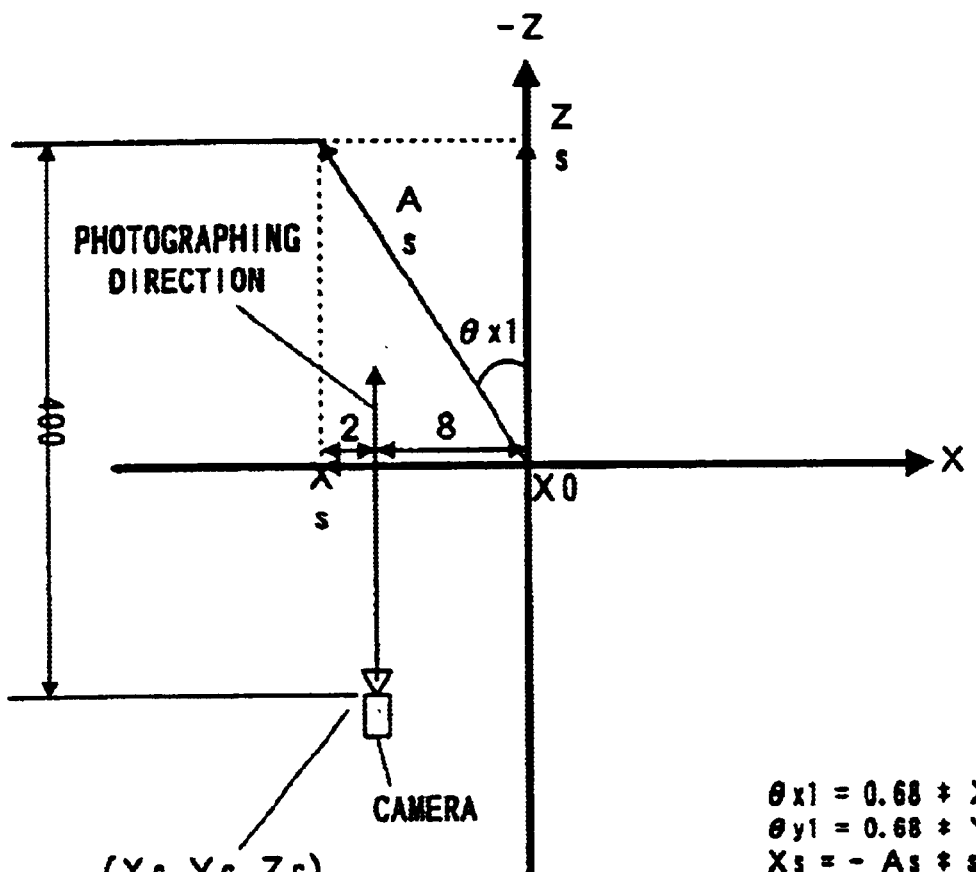
FIG. 34 is an X(–Z)-coordinate in a three-dimensional space in a one-direction scroll mode.
Figure 35:
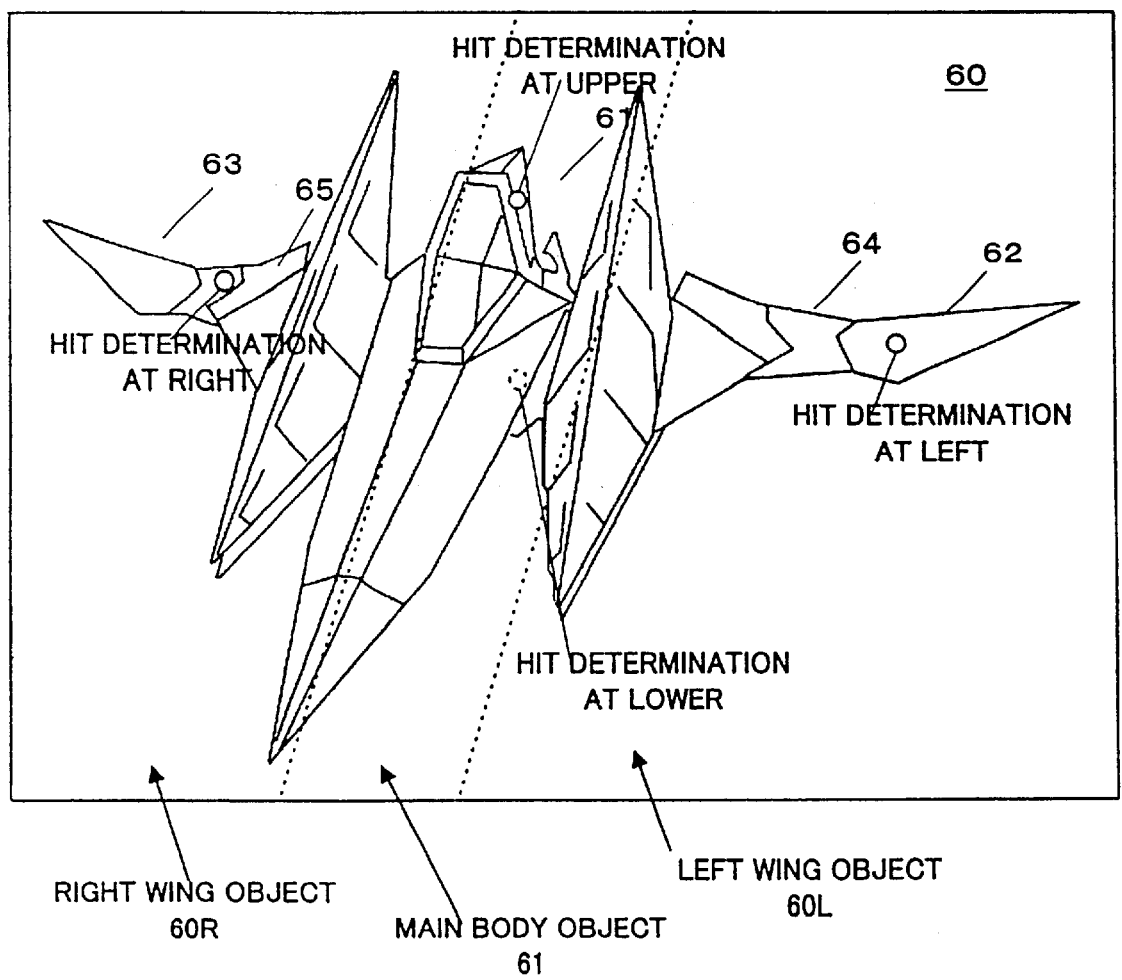
FIG. 35 is an external view of a player object 60.

Xc is an X-coordinate position of a camera photographing the player object 60, similarly to FIG. 34. This camera is a hypothetical camera that determines at which angle an object in the three-dimensional space is to be displayed on the display 30. X0 is a deviation value when there is a deviation between a center of the X coordinate on which the player object 60 is moving and an origin of the X coordinate of the three-dimensional space. This value is utilized principally when the course is branched. In this embodiment X0 is taken 0.

At a step 502, the CPU 11 operates on the following equation.

$$Yc=(Ya-Y0)*0.8$$

Yc is an Y-coordinate position of the camera photographing the player object 60. Y0 is a deviation value when there is a deviation between a center of the Y-coordinate on which the player object 60 is moving and an origin of the Y-coordinate of the three dimensional space. This value is utilized mainly when the course is branched. In this embodiment Y0 is taken 0.

At a step 503, the CPU 11 determines whether the player is depressing the button switch C1 or not. If the player is not depressing the button switch C1, the process proceeds to a step 504.

At the step 504, the CPU 11 determines whether the player is depressing the button switch 47Cd or not. If the player is not depressing the button switch 47Cd, the process proceeds to a step 505. At the step 505, the CPU 11 operates the following equation.

$$Zc=Za+400$$

Zc is a Z-axis value of the camera photographing the player object 60. Accordingly, Zc represents a Z-coordinate position moved by 400 in the Z-axis direction from the position of the player object.

At a step 506, the photographing direction of the camera is set in a scroll direction. It is set in a −Z-axis direction as shown in FIG. 34.

On the other hand, when the player is depressing the button switch C1 at the step 503, the process proceeds to a step 507. At the step 507, the CPU 11 operates the following equation.

$$Zc=(Za+abs(Z\alpha))+400$$

abs( ) represents an absolute value of a numeral given within ( ). $Z\alpha$ is a value by which the player object 60 goes away from the camera. The addition of abs($Z\alpha$) for Zc in this manner provides a display as if the player object, displayed on the display 30, went flying rapidly in the depth direction of the screen. The process then advances to the step 506.

Meanwhile, when the player is depressing the button switch 47Cd at the step 504, the process proceeds to a step 508.

At the step 508, the CPU 11 operates the following equation.

$$Zc=(Za-abs(Z\beta))+400$$

$Z\beta$ is a value by which the camera approaches the player object 60 when the player object 60 applies a brake. The subtraction of abs($Z\beta$) from Zc in this manner provides a display as if the player object 60, displayed on the display 30, was rapidly pulled back toward the screen. The process proceeds to the step 506.

On the other hand, at the step 500 if the all-range mode flag in the flag area 159F is set, the process proceeds to a step 510 in FIG. 55.

At the step 510, the CPU 11 determines whether the player is depressing the button switch C1 or not. If the player is not depressing the button switch C1, the process proceeds to a step 511.

At that step 511, the CPU 11 determines whether the player is depressing the button switch 47Cd or not. If the player is not depressing the button switch 47Cd, the process proceeds to a step 512. At the step 512, the CPU 11 operates the following equations.

$$Xr=2.0*\theta x1*\cos \theta x2$$

$$Zr=2.0*\theta x1*\sin \theta x2$$

$$Xc=Xa+400*\sin \theta x2-Xr$$

$$Zc=Za+400*\cos \theta x2+Zr$$

$$Yc=0.8*Ya$$

Figure 32:
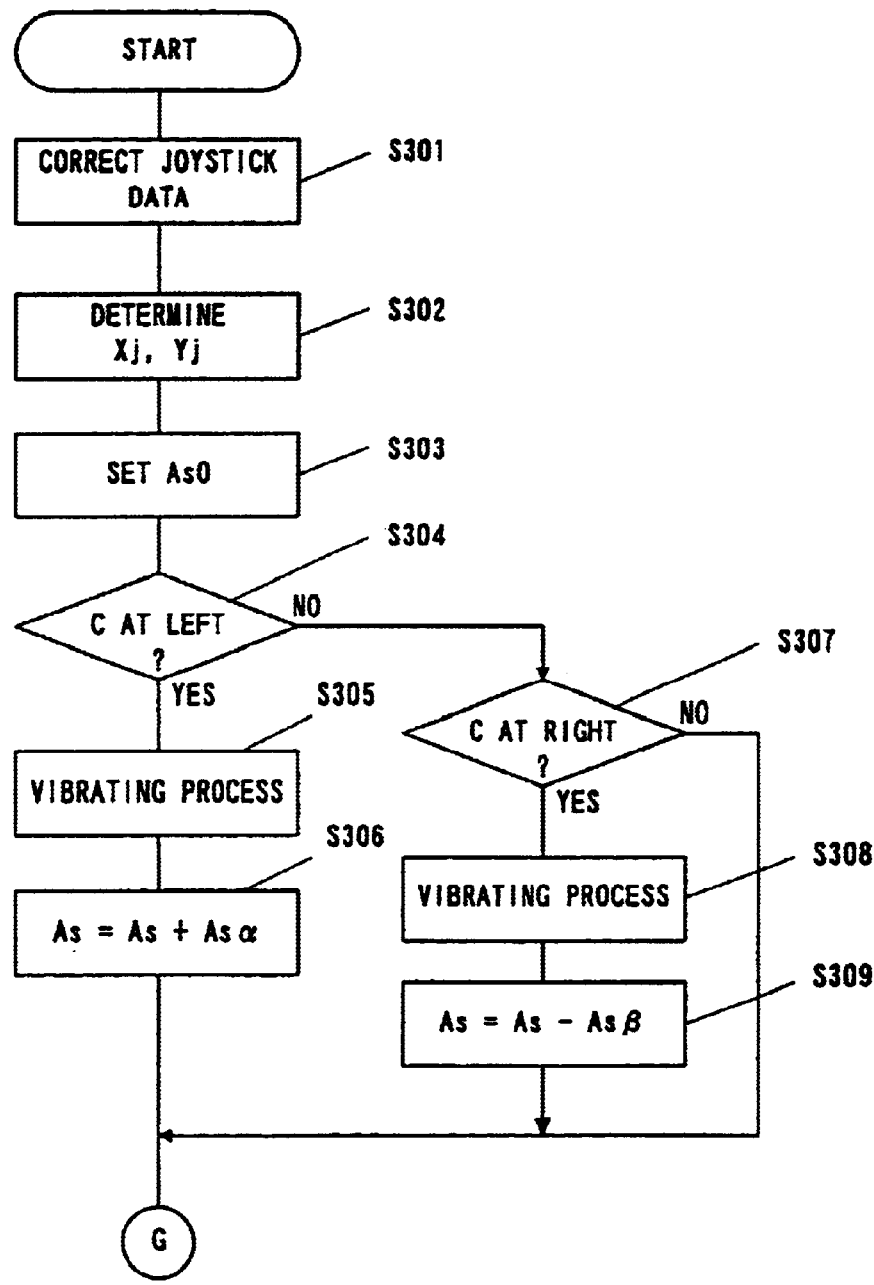
FIG. 32 is a subroutine flowchart of a player object process.
Figure 46:
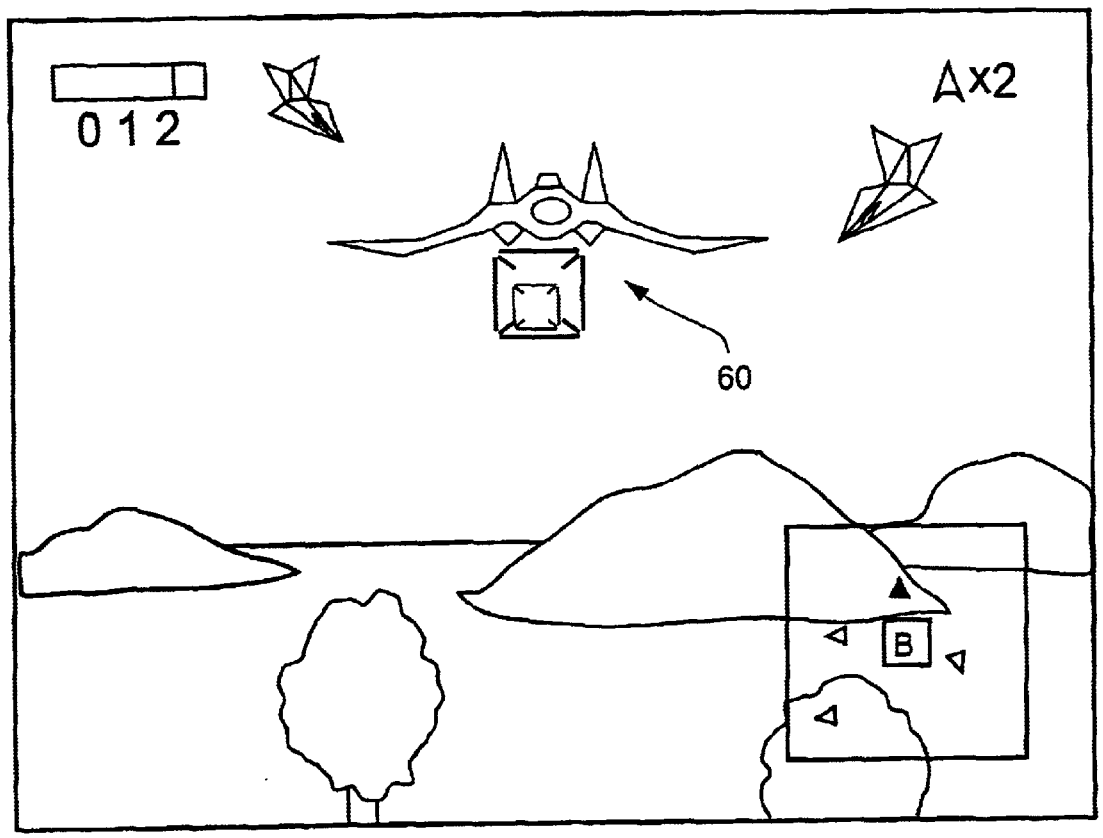
FIG. 46 is a view showing one example of on-screen display of the player object.
Figure 47:
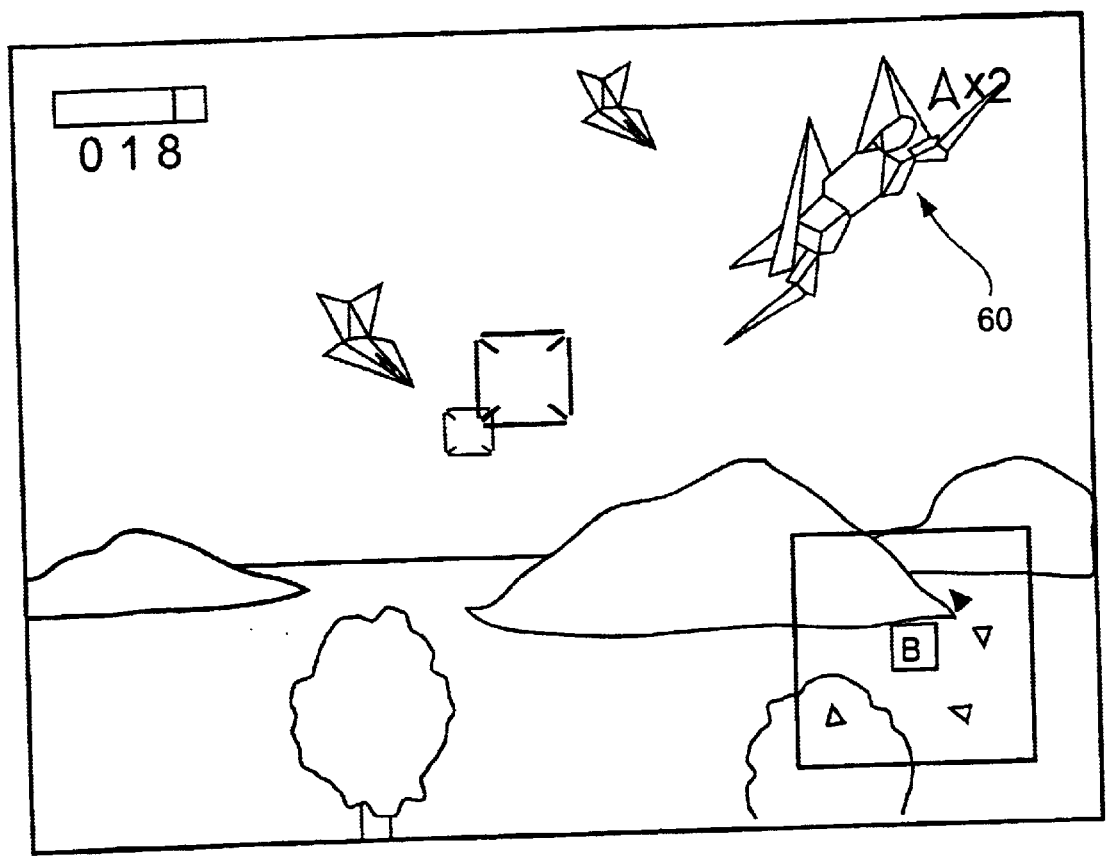
FIG. 47 is a view showing another example of on-screen display of the player object 60.

Similarly to FIG. 37, $2.0*\theta x1$ is a value for deviating the camera in the (−X)-axis direction from a behind of the player object 60 in the player space. Xr is a value of a game-space X-coordinate value converted from a player-space X-coordinate value. Zr is a value of a game-space Z-coordinate value converted from a player-space Zcoordinate value. In this manner, the camera can be moved of position in a direction toward which the player object 60 is inclined, in proportion to inclination of the player object 60. Demonstrating an example displayed on the display 30, the player object 60, when flying straight, is displayed at a center in the left and right directions of the screen, as shown in FIG. 46. However, as the player object 60 is moved leftward as in FIG. 47, it is displayed on the right in the left and right directions of the screen. Also, the player object 60 is displayed on the left in the left and right directions of the screen, as it moves in the right direction. The display like this facilitates to take a sight at an enemy. Accordingly, player is easy to aim at an enemy, enjoying a game with comfort. At a step 513, the CPU 11 sets the camera photographing direction to a −Z2-axis direction, as shown in FIG. 32.

At the step 510, on the other hand, where the player is depressing the button switch C1, the process proceeds to a step 514. At the step 514, the CPU 11 operates on the following equations.

$$Xr=2.0*\theta x1*\cos \theta x2$$

$$Zr=2.0*\theta x1*\sin \theta x2$$

$$Xc=Xa+(400+\text{abs}(Z\alpha))*\sin \theta x2-Xr$$

$$Zc=Za+(400+\text{abs}(Z\alpha))*\cos \theta x2+Zr$$

$$Yc=0.8*Ya$$

The process then advances to the step 513.

Meanwhile, when the player is depressing the button switch 47Cd at the step 511, the process proceeds to a step 515. At the step 515, the CPU 11 operates on the following equations.

$$Xr=2.0*\theta x1*\cos \theta x2$$

$$Zr=2.0*\theta x1*\sin \theta x2$$

$$Xc=Xa+(400-\text{abs}(Z\beta))*\sin \theta x2-Xr$$

$$Zc=Za+(400-\text{abs}(Z\beta))*\cos \theta x2+Zr$$

$$Yc=0.8*Ya$$

Then, the process proceeds to the step 513.

Figure 24:
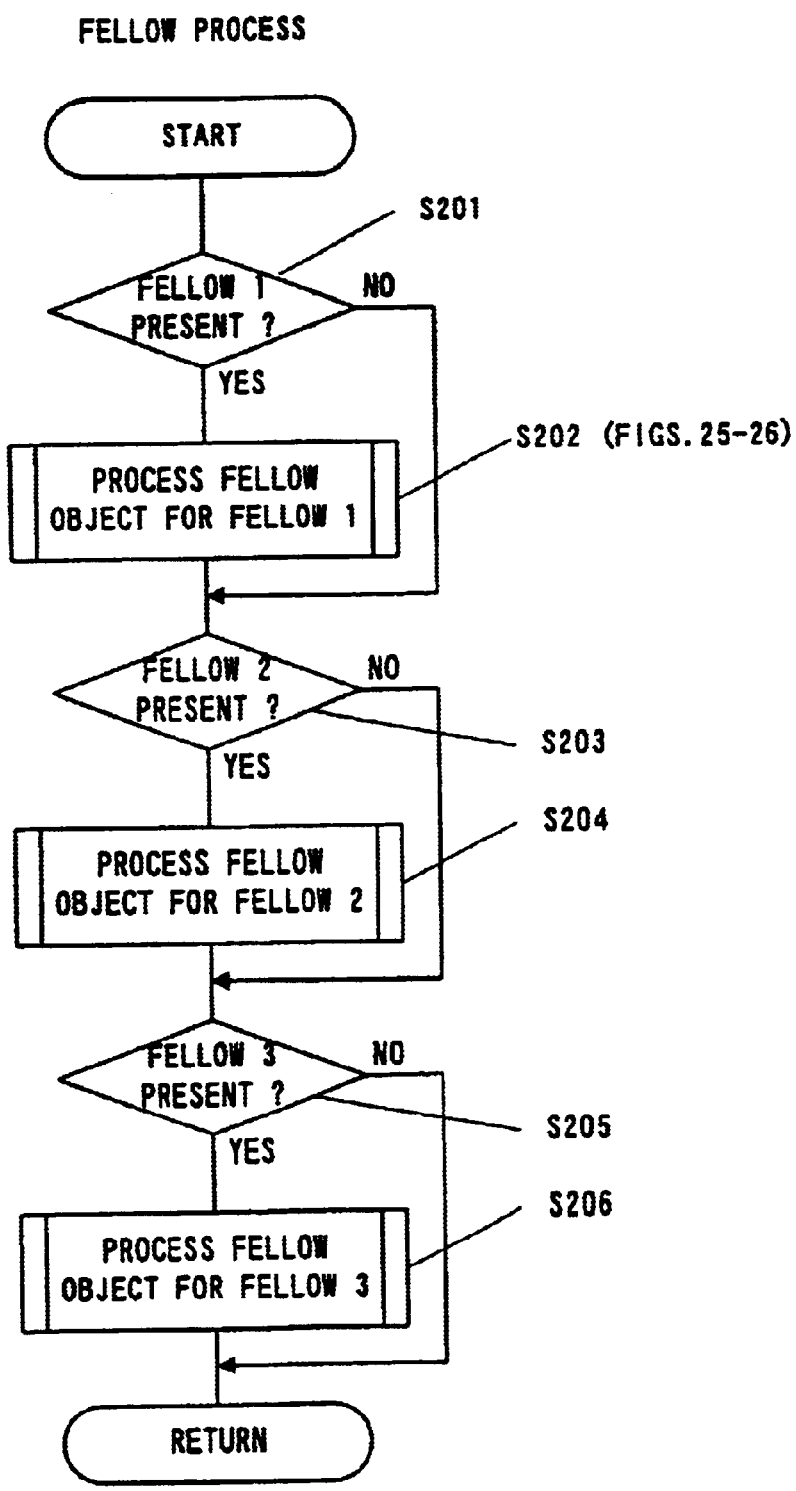
FIG. 24, FIG. 25 and FIG. 26 are subroutine flowcharts of a fellow object process.
Figure 25:
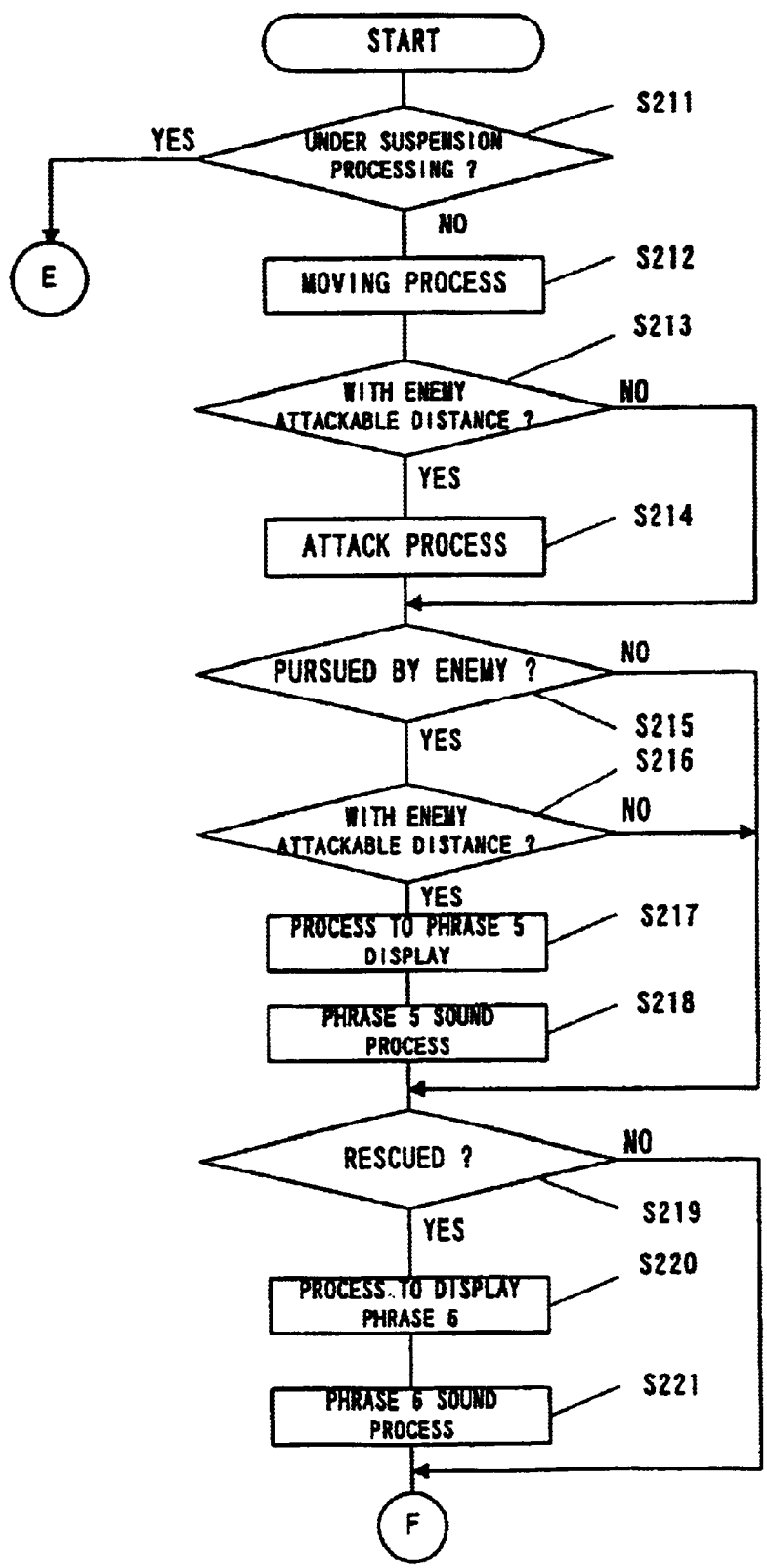
Figure 26:
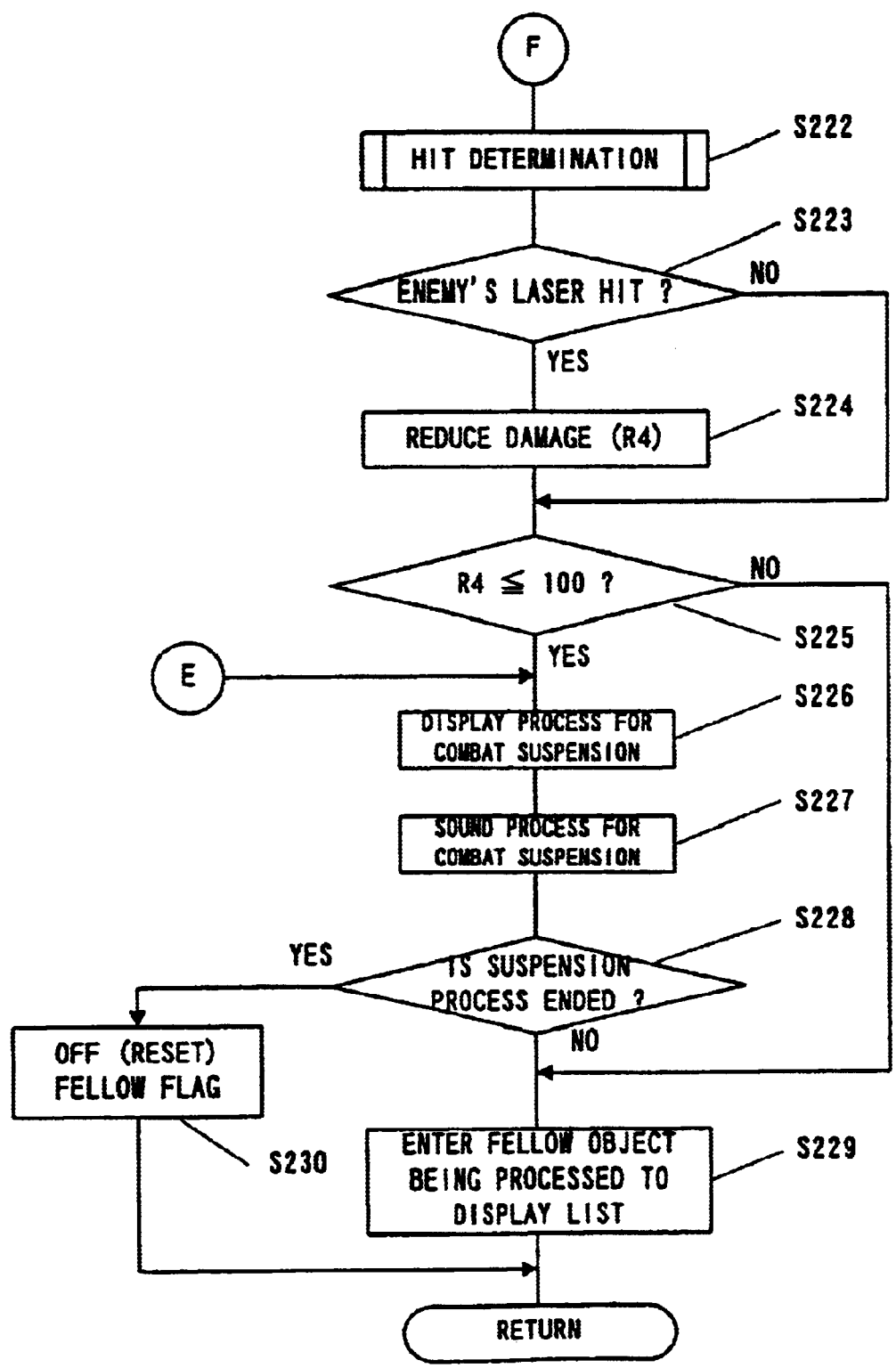

With reference to FIG. 24–FIG. 26, explanations will be made for the operation of a subroutine for the fellow object process. It is determined at a step 201 whether a first fellow is present or not. If the fellow is present, a process is made at a step 202 for the first fellow object. Thereafter, it is determined at a step 203 whether a second fellow exists. If the fellow exists, a process is performed at a step 204 for the second fellow object. Similarly, a determination is made on the presence or absence of a third fellow and the process for the third fellow object are carried out, at steps 205, 206. Here, the processes for the first to third fellow objects shown in the steps 202, 204, 206 are the same except for the difference in fellow kind, and they are realized in concrete by a subroutine process (steps 211–230) of FIG. 25 and FIG. 26.

That is, it is determined at a step 211 that the process is not in a suspension process, and a moving process is performed at a step 212 for moving any of the first to third fellows. Determination is made at a step 213 whether the distance is within a range attackable on the enemy. If within an attackable distance range, a process of making attack on the enemy object (process of calculation and display for launching a beam bomb) is performed at a step 214. It is determined whether any comrade is being pursued by an enemy at a step 215. If pursuit is determined, determination is made whether or not he is within a distance attackable by the enemy. If the enemy is within the attackable distance, a process for indicating the phrase 5 (e.g. "help") is performed at a step 217, and a sound output process for the phrase 5 is made at a step 218. Incidentally, if the determination at the step 215 and/or 216 is different one (No.), it is then determined at a step 219 whether or not any of the fellow objects was helped by the player object. If helped is determined, a display process for the phrase 6 (e.g. "We've helped!") is made at a step 220. A sound output process for the phrase 6 is made at a step 221.

At a step 222, a hit determination (e.g. determination whether or not a fellow is hit by an attack at a step 254 to be stated later) is performed when the fellow is attacked by the enemy. It is determined at a step 223 whether or not he is hit by an enemy's bullet. If he is hit, a process for reducing the fellow's damage subtraction of value from the register R4 is made at a step 224. It is determined at a step 225 whether or not the damage withstanding amount of the register R4 is 100 or below. If the above, the process proceeds to a step 229, while if not greater the process proceeds to a step 226. At the step 226 is performed a display process for a message that the comrade damaged by a certain amount or greater ceases the combat to return to a base, and a sound outputting process therefore is performed at a step 227. It is determined at a step 228 whether or not a cease fire process is ended. If not ended, at a step 229 is made a process for entering the comrade object being processed to the display list. If ended, the fellow flag F1 is turned off, and then the process returns to the main routine.

Figure 27:
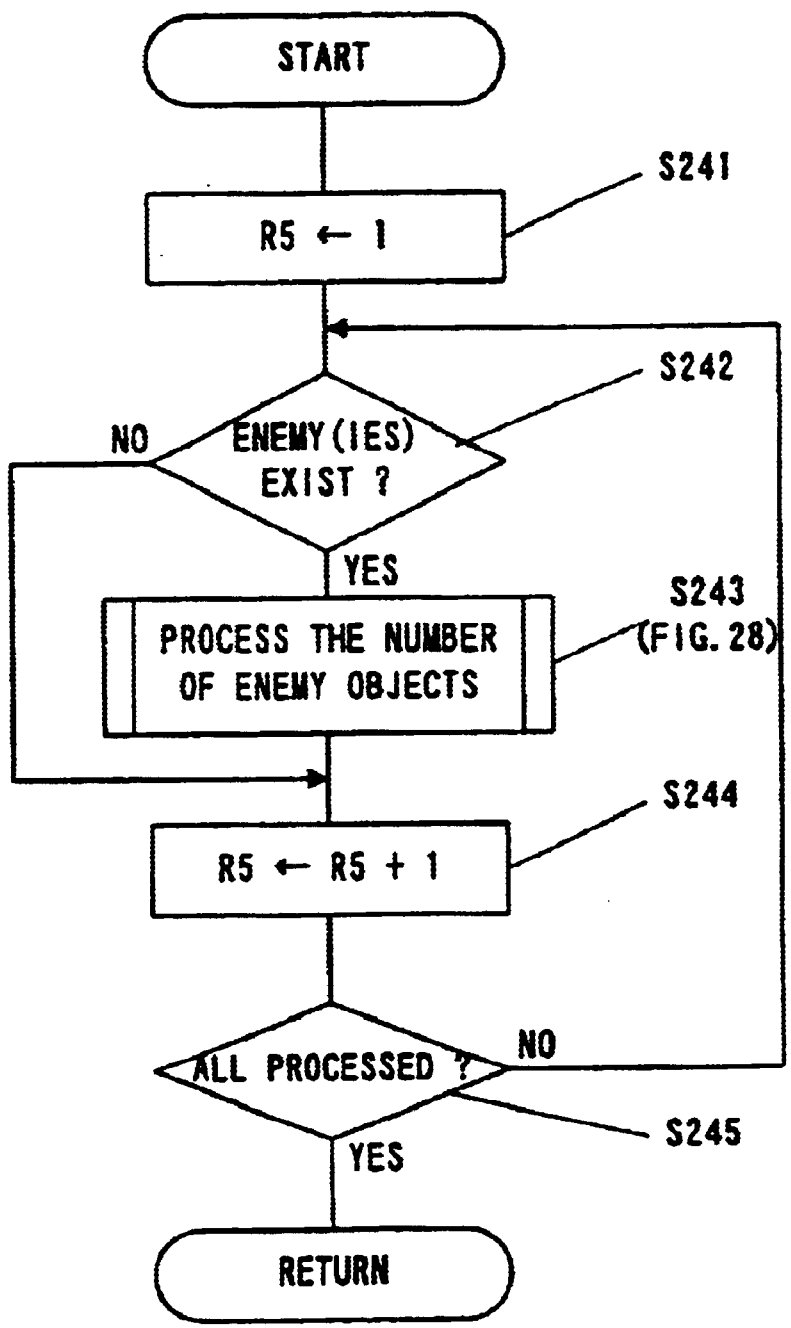
FIG. 27 is a subroutine flowcharts of an enemy object process.

Referring to FIG. 27, explanations will be made on the operation of a subroutine for the enemy object process (step 10). At a step 241, the register R5 is set to 1 to temporarily memorize the number of enemy objects. It is determined at a step 242 that there is an enemy object based on the value of the register R5. At a step 243 is performed a subroutine (FIG. 28 hereinafter stated) for processing as to what the number the enemy object is. Then, 1 is added to the register R5 at a step 244. It is determined at a step 245 whether or not ended is a process of displaying all the enemy objects in the number set by the program. If all the processes are not ended, the process returns to the step 242 to repeat the processes of the steps 242–245.

Figure 28:
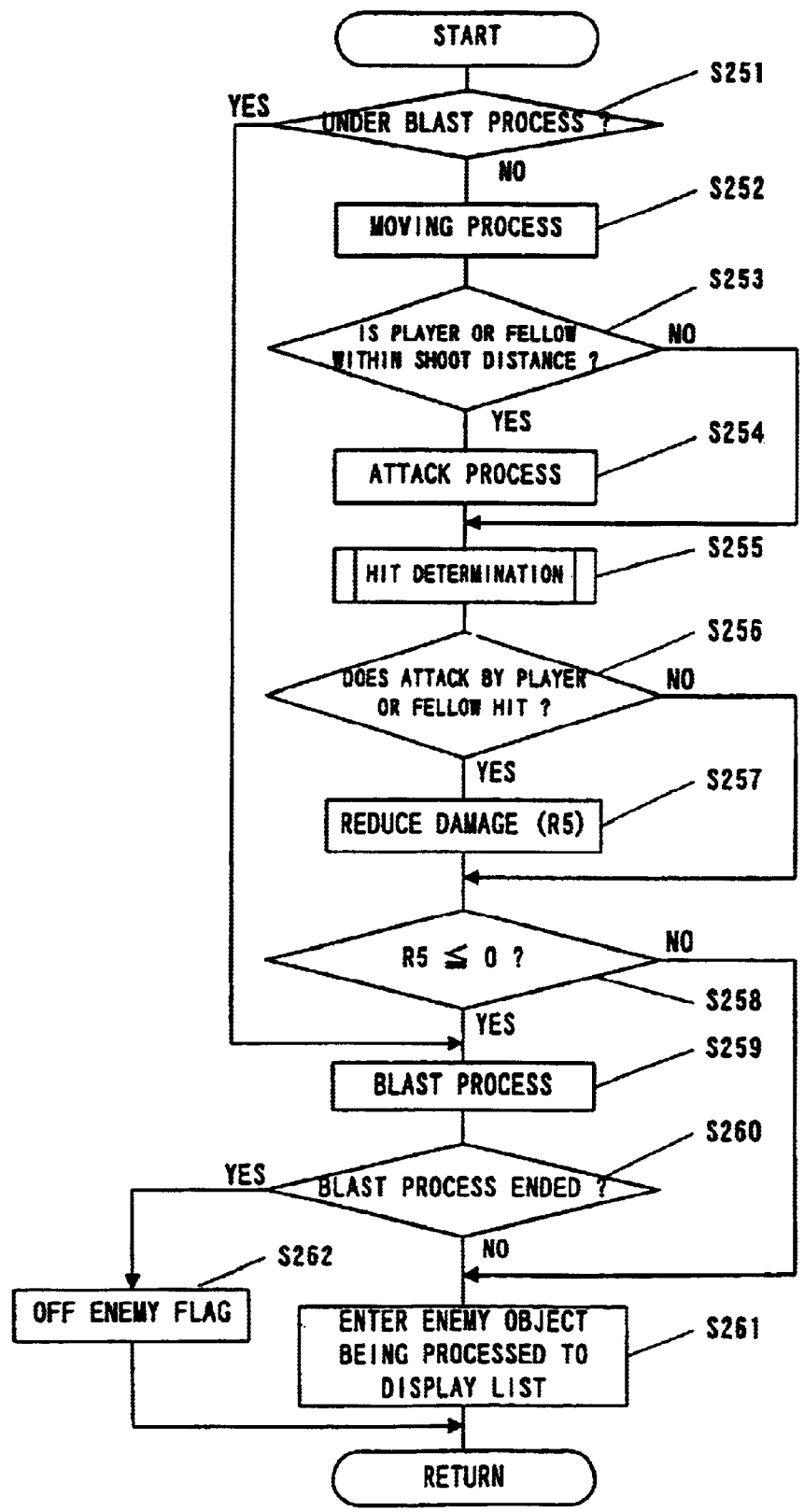
FIG. 28 is an operation of a part step included in the enemy object process of FIG. 27.

Referring to FIG. 28, explanations will be made in detail on a process for one of the enemy objects. At a step 251 it is determined that the enemy object is not under a blasting process. At a step 252 a moving process is made for the enemy object of the number memorized by the register (E). It is determined at a step 253 whether or not the player object or the fellow object is within a range of shoot. If within a shoot range, a process is made at a step 254 for making an attack on the player object or the fellow object that is present within the shoot distance range.

Meanwhile, at a step 255 is made a hit determination for a case where the player object or the comrade object makes an attack on the enemy object. It is determined at a step 256 whether or not the beam bomb fired by the player object or the fellow object hits the enemy object. If hit is detected, a process is made for reducing a damage amount (subtracting 1 from the register R5) of the enemy object thus hit and providing points to the player (process of adding the points determined depending upon the defeated enemy to the register R10 value). It is determined at a step 258 whether or not the damage amount becomes zero or the below (R5≦0). If not below (R5>0), the enemy object under processing is entered to the display list at a step 261. Conversely, when below (R5≦0), a process is made at a step 259f or blasting and vanishing the enemy object. If it is determined at a step 260 that the blast process is ended, turning off is made at a step 262 for a flag of the enemy object that has been attacked by the player object, and then the process returns to the main routine.

FIG. 48 shows a flowchart representing in detail the step 255 for processing the enemy object of FIG. 28.

In the conventional game machine, the range in determining about hitting the enemy is given fixed. Accordingly, when the player attacks an enemy, the enemy present distant is too small to attack and hit. This makes the game improperly difficult, resulting in dampening of player's will. In contrast to this, the enemy hit determination of the present invention has an enemy object hit determining range broadened in proportion to a distance between the enemy object and the player object 60. This enables a player to attack and hit an enemy object existing even distant. The present invention, therefore, prevents a game from becoming excessively difficult, and enables the player to play with appropriate relative difficulty. The player can play a game with willingness.

At a step 600, the CPU 11 makes computation on the following.

$$RAD = (sqrt((OBJ2x-OBJ1x)^2+(OBJ2y-OBJ1y)^2+(OBJ2z-OBJ1z)^2))/50$$

RAD is a numeral that increases in proportion to a distance between two objects to be determined of hitting. Sqrt( ) is a function representative of a square root of one given within ( ). The symbol "^" is a symbol to raise a first-described numeral to a next described numeral power. Accordingly, "^2" represents a square. The symbol "/" is indicative of division. OBJ1 is an object to be determined of hitting, and refers herein to an enemy object. OBJ2 is an object coming toward OBJ1, and refers herein to an assaulting object such as a laser object launched by the player object 60. Where OBJ2 is a player object 60, a fellow object, a stationary object, or an assaulting object launched by a fellow object, hit determination is similarly performed to that of FIG. 37.

At a step 601, the CPU 11 determines whether RAD>200 or not. If not RAD>200, the process proceeds to a step 602.

At the step 602, the CPU 11 determines whether or not ABS (OBJ2x−OBJ1x)≦OBJ1r+RAD. If ABS (OBJ2x−OBJ1x)≦OBJ1r+RAD, then the process advances to a step 603.

At the step 603, the CPU 11 determines whether or not ABS (OBJ2y−OBJ1x)≦OBJ1r+RAD or not. If standing ABS (OBJ2y−OBJ1y)≦OBJ1r+RAD, the process proceeds to a step 604.

At the step 604, the CPU 11 determines whether or not ABS (OBJ2z−OBJ1z)≦OBJ1r+RAD. If ABS (OBJ2z−OBJ1z)≦OBJ1r+RAD, the process proceeds to a step 605.

At the step 605, the CPU 11 determines of a hit between OBJ2 and OBJ1, and sets a hit determination flag in the flag area of the RAM 15.

The process then returns to the former routine.

On the other hand, if ABS (OBJ2x−OBJ1x)≦OBJ1r+RAD does not stand at the step 602, the process returns to the former routine.

On the other hand, if ABS (OBJ2y−OBJ1y)≦OBJ1r+RAD does not stand at the step 603, the process returns to the former routine.

On the other hand, if ABS (OBJ2z−OBJ1z)≦OBJ1r+RAD does not stand at the step 604, the process returns to the former routine.

Meanwhile, if RAD>200 at the step 601, the process proceeds to a step 606. At the step 606, the CPU 11 computes the following.

$$RAD = 200$$

The reason of keeping RAD not exceeding 200 is to avoid determination from becoming improperly easy despite an enemy object exists distant far from the player object 60. If there is no setting of an upper limit to RAD, an assaulting object released by the player object could hit on an enemy object appearing too small to discriminate on the screen, losing reality feeling.

Figure 29:
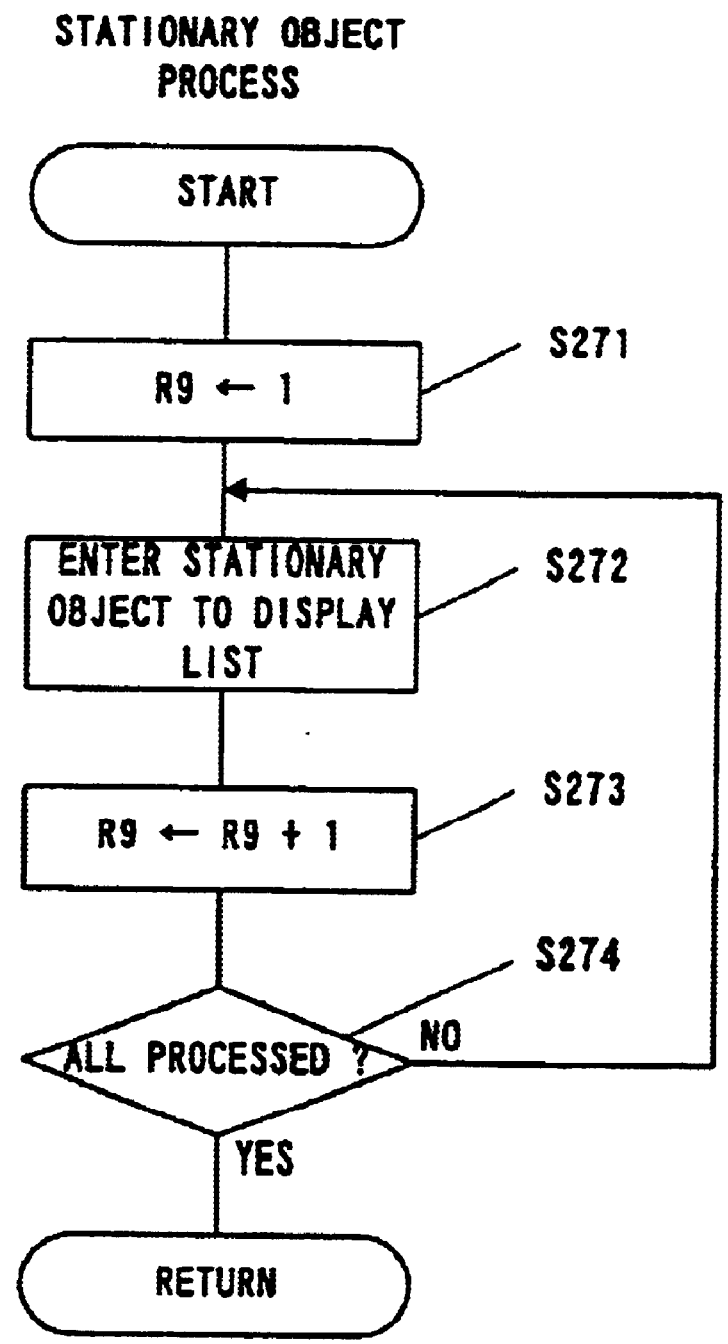
FIG. 29 is a subroutine flowchart of a stationary object process.

Referring to FIG. 29, explanations will be made on the operation of a subroutine for the stationary object process (step 11). At a step 271, a stationary object register (R9) is set at 1. At a step 272 the stationary object specified by the register (R9) is entered into the display list. At a step 273 the register R9 is added by 1. It is determined at a step 274 whether or not ended is a process for displaying all the stationary objects in the number set by the program. If all the processes are not ended, the process returns to the step 272 to repeat the processes of the steps 272–274. If all the processes are ended, the process returns to the main routine.

Figure 30:
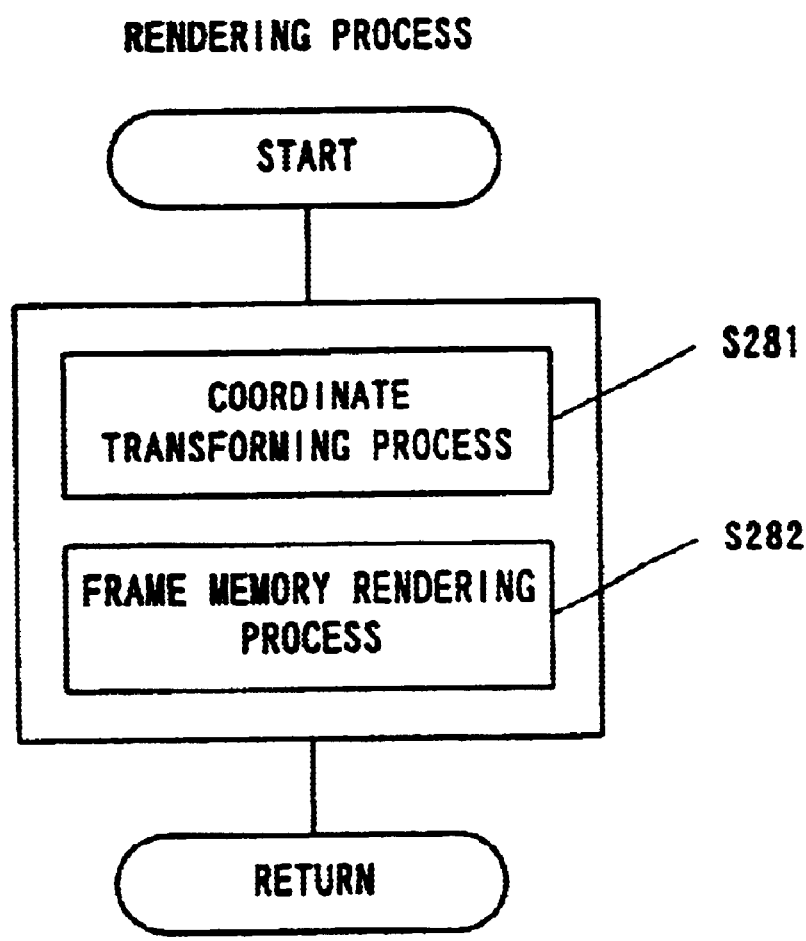
FIG. 30 is a subroutine flowchart of a rendering process.

Referring to FIG. 30, explanations will be made on the operation of a subroutine for the rendering process (step 12). At a step 281 a coordinate transformation process is performed. The coordinate transformation process is made under the control of the RCP 12 by transforming the coordinate data of a plurality of polygons for the movable object such as the enemies, the players, and the fellows and the stationary objects such as the backgrounds memorized in the image data area 154 of the RAM 15, into an observer's eye coordinate of the camera. Specifically, calculations are made for transforming the polygon data constituting the plurality of the movable objects and the stationary objects, from the absolute coordinate into camera coordinate data so that they are turned into images as viewed from the camera. At a step 282 a rendering process is made for the frame memory. This process is performed by writing the chrominance data determined based on the texture data into the image buffer area 152 on a dot-by-dot basis, i.e. at a plane of one triangle constituting the object surrounded by the polygon coordinate after transformed into the camera coordinate. At this time, the chrominance data for a closer object is written so that the object standing toward this (close to this) is preferentially displayed based on depth data for each polygon. In accordance therewith, the depth data corresponding to the dots written by the chrominance data is written to a corresponding address in the Z buffer area 153. Thereafter, the process returns to the main routine.

The operations of the steps 281 and 282 are carried out within a constant time period on each frame. They are, however, processed in order for polygons constituting the plurality of objects to be displayed on one scene, and repeated until the processes are completed for all the objects to be displayed in the one scene.

Figure 31:
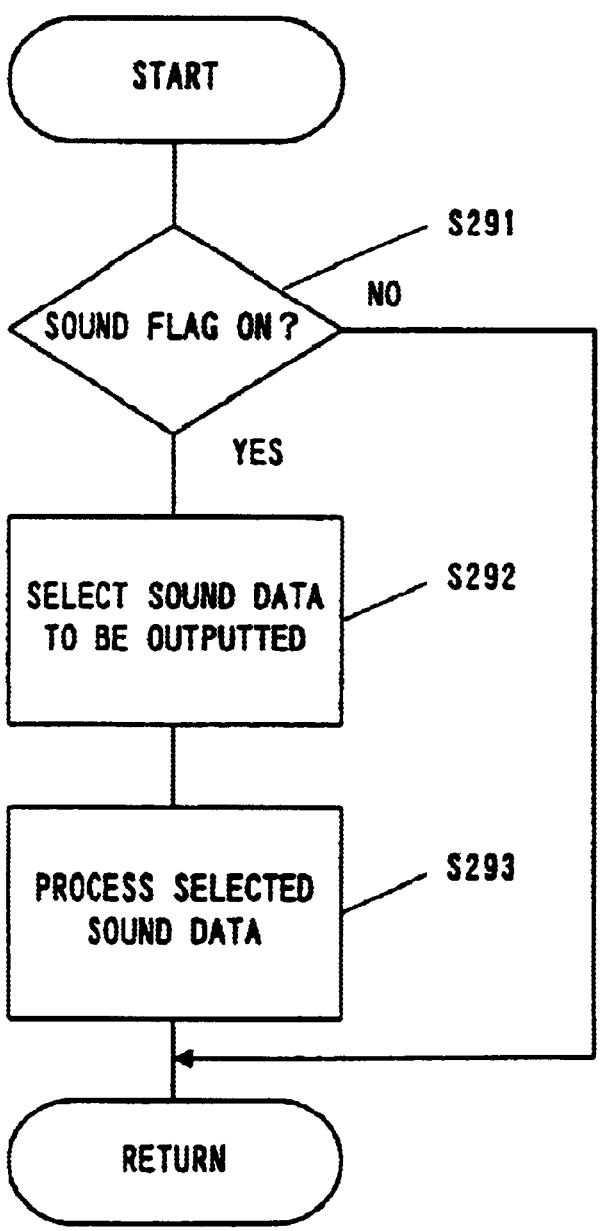
FIG. 31 is a subroutine flowchart of a sound process.

Referring to FIG. 31, explanations will be made on the operation of a subroutine for the sound process (step 13). At a step 291 it is determined whether or not a sound flag is on. If the determination is on, the sound data to be outputted is selected at a step 292. The selected sound data is read-processed at a step 293, and then the process returns to the main routine. Incidentally, the sound data of a message thus read is digital-analog converted by the sound generating circuit 16 to be outputted as sounds.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game system, comprising:

an operating member for use by a player of the video game system, said operating member including a motion designator for enabling the player to designate movement of a player controlled object within a three-dimensional game display image;

an image processing system for supplying three-dimensional image data to a display unit and operable to vary the game display image according to a program and based on operation of the operating member;

wherein the player controlled object is moved on said display in a direction that is opposite to a direction that the player moves the operating member.

2. The video game system of claim 1, wherein a distance between a horizontally centered on-screen position and a position at which the player controlled object is displayed changes depending on a moving speed of the object within the game display image.

3. The video game system of claim 2, wherein said distance between the horizontally centered on-screen position and a position at which the player controlled object is displayed increases as said moving speed increases and decreases as said moving speed decreases.

4. The video game system of claim 2, wherein said video game system includes a one-directional scroll mode and an all-range scroll mode.

5. The video game system of claim 2, wherein said game is a shoot game and a sight for shooting by the player controlled object is positioned substantially at an on-screen center.

6. The video game system of claim 4, including a process for preventing an abrupt change in a background scene of said game display image in response to a change of direction of said player controlled object.

7. The video game system of claim 4, wherein in said one-directional scroll mode a single XYZ coordinate system is defined and a player viewing angle is defined to be parallel with respect to a −Z-axis direction of said XYZ coordinate system regardless of the movement of the player controlled object, wherein the XZ coordinate defines a planar coordinate system when the player controlled object is viewed from above, and the YZ coordinate defines a planar coordinate system when the player controlled object is viewed from a left toward a right.

8. The video game system of claim 7, wherein in said all-range scroll mode a first XYZ coordinate system and a second XYZ coordinate system are defined, and further wherein said first XYZ coordinate system defines a game space coordinate system and is fixed during said game and is used for representing a three dimensional space wherein a plurality of objects exist, and said second XYZ coordinate system defines a player coordinate system and varies based on movement of the player controlled object, wherein a player viewing angle is defined to be parallel with a −Z-axis of said second XYZ coordinate system.

9. The video game system of claim 8, wherein said video game operates in accordance with the following equations:

$$\theta x1 = C_1 * Xj$$

$$\theta y1 = C_2 * Yj$$

$$\theta x2 = C_3 * \theta x1 + \theta x2 (C_3 * \theta x1 \text{ increased per 1 frame})$$

$$Xs = -As * \sin(\theta x1 + \theta x2)$$

$$Zs = -As * \cos(\theta x1 + \theta x2)$$

$$Ys = -As * \sin \theta y1$$

wherein $X_j$ and $Y_j$ are joystick data; $C_1$, $C_2$, and $C_3$ are constants; $\theta x1$ is an angle of an As directional vector of the player controlled object with respect to a −Z2-axis direction on an XZ coordinate of said player coordinate system as the player controlled object is viewed from above, and has a value that increases in a positive direction when said motion designator is moved leftward and decreases in a negative direction when said motion designator is moved rightward;

$\theta y1$ is an angle of the As directional vector of the player controller object with respect to the −Z2-axis direction on a YZ coordinate of said player coordinate system as the player controlled object is viewed from left to right, and has a value that increases in a positive direction when the motion designator is moved forward and decreases in a negative direction when said motion designator is moved rearward;

$\theta x2$ is an angle between a −Z1 axis direction of said game space coordinate system and the −Z2-axis direction of the player object on said XZ coordinate of said player coordinate system as the player controlled object is viewed from above, and has a value that increases and decreases in proportion to $\theta x1$ each frame; and Xs, Zs and Ys are respectively an X-axis component, a Y-axis component and a Z-axis component of the As directional vector in the game space coordinate system.

10. The video game system of claim 8, wherein a filtering process is provided for preventing abrupt movement of a background scene observed by said player upon movement of said player controlled object.

11. The video game system of claim 9, wherein a filtering process is provided for preventing abrupt movement of a background scene observed by said player upon movement of said player controlled object.

12. The video game system of claim 11, wherein said filtering process is performed during deducing $\theta x1$ from $C_1 * X_j$ and during deducing $\theta y1$ from $C_2 * Y_j$.

13. The video game system of claim 12, wherein said filtering process causes $\theta x1$ to gradually approximate to $C_1 * X_j$ over on a plurality of frames so as to obtain $\theta x1 = C_1 * X_j$ at a time that the frames have been processed, without making the $C_1 * X_j$ immediately become $\theta x1$ on one frame, and causes $\theta y1$ to gradually approximate to $C_2 * Y_j$ over on a plurality of frames so as to obtain $\theta y1 = C_2 * Y_j$ at a time that the frames have been processed, without making $C_2 * Y_j$ immediately become $\theta y1$ on one frame.

14. The video game system of claim 4, wherein in said all-range scroll mode a first XYZ coordinate system and a second XYZ coordinate system are defined, wherein said first XYZ coordinate system defines a game space coordinate system and is fixed during said game and is used for representing a three dimensional space wherein a plurality of objects exist, and said second XYZ coordinate system defines a player coordinate system and varies based on movement of the player controlled object, wherein a player viewing angle is defined to be parallel with a −Z-axis of said second XYZ coordinate system.

15. The video game system of claim 14, wherein said video game operates in accordance with the following equations:

$$\theta x1 = C_1 * X_j$$

$$\theta y1 = C_2 * Y_j$$

$$\theta x2 = C_3 * \theta x1 + \theta x2 (C_3 * \theta x1 \text{ increased per 1 frame})$$

$$Xs = -As * \sin(\theta x1 + \theta x2)$$

$$Zs = -As * \cos(\theta x1 + \theta x2)$$

$$Ys = -As * \sin \theta y1$$

wherein $X_j$ and $Y_j$ are joystick data; $C_1$, $C_2$, and $C_3$ are constants; $\theta x1$ is an angle of an As directional vector of the player controlled object with respect to a $-Z2$-axis direction on an XZ coordinate of said player coordinate system as the player object is viewed from above, and has a value that increases in a positive direction when said motion designator is moved leftward and decreases in a negative direction when the motion designator is moved rightward;

$\theta y1$ is an angle of the As directional vector of the player controlled object with respect to the $-Z2$-axis direction on a YZ coordinate of said player coordinate system as the player controlled object is viewed from left to right, and has a value that increases in a positive direction when the motion designator is moved forward and decreases in a negative direction when the motion designator is moved rearward;

$\theta x2$ is an angle between a $-Z1$ axis direction of said game space coordinate system and the $-Z2$-axis direction of the player object on said XZ coordinate of said player coordinate system as the player controlled object is viewed from above, and has a value that increases and decreases in proportion to $\theta x1$ each frame; and Xs, Zs and Ys are respectively an X-axis component, a Y-axis component and a Z-axis component of the As directional vector in the game space coordinate system.

16. The video game system of claim 14, wherein a filtering process is provided for preventing abrupt movement of a background scene observed by said player upon movement of said player controlled object.

17. The video game system of claim 15, wherein a filtering process is provided for preventing abrupt movement of a background scene observed by said player upon movement of said player controlled object.

18. The video game system of claim 17, wherein said filtering process is performed during deducing $\theta x1$ from $C_1 * X_j$ and during deducing $\theta y1$ from $C_2 * Y$.

19. The video game system of claim 18, wherein said filtering process causes the $\theta x1$ value to gradually approximate to $C_1 * X_j$ over on a plurality of frames so as to obtain $\theta x1 = C_1 * X_j$ at a time that the frames have been processed, without making the value $C_1 * X_j$ immediately become $\theta x1$ on one 1 frame, and causes the $\theta y1$ value to gradually approximate to $C_2 * Y_j$ over on a plurality of frames so as to obtain $\theta y1 = C_2 * Y_j$ at a time that the frames have been processed, without making the value $C_2 * Y_j$ immediately become $\theta y1$ on one frame.

* * * * *